United States Patent [19]
Parke et al.

[11] 3,858,208
[45] Dec. 31, 1974

[54] AUTOMATIC PRF SELECTION TO OPTIMIZE RANGE AND DOPPLER VISIBILITY IN RADAR TRACKING

[75] Inventors: Donald P. Parke, Anaheim; Willis M. Priester, Garden Grove; Stuart P. Scheidler, Anaheim; Gerald M. Goldberg, Placentia, all of Calif.

[73] Assignee: Hughes Aircraft Company, Culver City, Calif.

[22] Filed: Feb. 5, 1973

[21] Appl. No.: 329,763

[52] U.S. Cl. ............ 343/7.5, 343/5 DP, 343/7.7, 343/17.1 PF
[51] Int. Cl. ............................................. G01s 9/10
[58] Field of Search...... 343/5 DP, 7.5, 7.7, 17.1 PF

[56] References Cited
UNITED STATES PATENTS

| | | | |
|---|---|---|---|
| 3,066,289 | 11/1962 | Elbinger | 343/7.7 |
| 3,258,769 | 6/1966 | Forestier | 343/7.5 |
| 3,588,898 | 6/1971 | Watters et al. | 343/7.7 |
| 3,787,851 | 1/1974 | Hughes | 343/7.7 |

*Primary Examiner*—T. H. Tubbesing
*Attorney, Agent, or Firm*—W. H. MacAllister; Walter J. Adam

[57] ABSTRACT

A radar system is disclosed which uses an established track predicted range, $R_p$, and radial velocity, $\dot{R}_p$, of a target to select a frequency, F, and PRF for optimum range and doppler visibility in tracking. The procedure is to tentatively select a frequency not subject to interference; determine the highest possible band of PRF's allowable between adjacent velocity blind regions computed from the equation $$(PRF) = 2\dot{R}_p F/cn \pm \Delta(PRF)$$

where $\Delta(PRF)$ is a known half width of velocity blind regions from their centers, c is the speed of light, and $n = 1,2,3 \ldots$; determine the highest PRF within the allowable band which places the target outside of range blind zones between $R_n$ and $R_n + \delta$, where $\delta$ is the width of blind zones and $R_n$ for the $n$th blind zone is determined from the equation $$R_n = cn/2(PRF)$$

where $n = 1,2,3 \ldots$ . A preliminary check determines whether the predicted range of the target is in a known range blind zone $\delta'$ at the origin. If a PRF with range visibility is not found in an allowable band, another lower allowable band of PRF's is found, if any, and checked for range visibility until a useful PRF is found or all possibilities have been checked. In the latter case, another frequency is selected and the process is repeated until a useful PRF is found or all frequencies have been checked.

12 Claims, 21 Drawing Figures

SECTION I

SECTION II (CONTINUED)

SECTION III (CONTINUED)

RADAR DATA BUFFER

Fig. 15b.

|   | 0 | 1 | 2 | 3 | 4 | 5 | 6 | 7 | 8 | 9 | 10 | 11 | 12 | 13 | 14 | 15 | 16 | 17 |
|---|---|---|---|---|---|---|---|---|---|---|----|----|----|----|----|----|----|----|
| 0 | // | ID | | M | | | ± | | | | Az | | | | | | | |
| 1 | // | F | | | | | ± | | | | EL | | | | | | | |
| 2 | // | T | | | | | ± | | | | $\Delta F_G$ | | | | | | | |
| 3 | //// | | | B | | | R start | | | | | | | | | | | |
| 4 | //////// | | | | | | R stop | | | | | | | | | | | |
| 5 | // | FP | | | | | PRF | | | | | | | | | | | |

|  |  |  |  | Bits |
|---|---|---|---|---|
| ID | (array ID) | 00 = Fore<br>01 = Strbd | 10 = Aft<br>11 = Port | 2 |
| M | (mode) | 0 = Search<br>1 = Verify<br>2 = Track | 4 = Test<br>5 = Sea State<br>3, 6 and 7 not defined | 3 |
| Az | (sine of Az angle) | sin .088° | ± sin 55° | 12 |
| EL | (sine of EL angle) | sin .088° | ± sin 9.8° | 12 |
| T | (threshold) | .5 db | 7 - 20 db | 6 |
| F | (frequency) |  | 0 - 31 | 5 |
| $\Delta F_G$ | (gnd doppler offset) | 3 Hz | ± 4000 Hz | 12 |
| PRF | (pulse repetition freq) | IPPS | 1562-3125 | 12 |
| FP | (fill pulses) | 1 pulse | 8 - 13 | 4 |
| B | (no. of bursts) | 1 burst | 0 - 3 (N-1) | 2 |
| R start | (range cell start) | 1 RC | 0 - 5000 | 13 |
| R stop | (range cell stop) | 1 RC | 0 - 5000 | 13 |

RADAR CONTROL COMMAND FORMAT

| | 0 | 1 | 2 | 3 | 4 | 5 | 6 | 7 | 8 | 9 | 10 | 11 | 12 | 13 | 14 | 15 | 16 | 17 | |
|---|---|---|---|---|---|---|---|---|---|---|---|---|---|---|---|---|---|---|---|
| 0 | | F | | | | | ± | | Az | | | | | | | | | | ⎫ |
| 1 | | CL | | | | | ± | | EL | | | | | | | | | | |
| 2 | | | | | | | | ID | | $S_{RCT}$ | | | | | | M | | | |
| 3 | $J_{F0}$ | | $J_{F1}$ | | . | | . | | . | | . | | . | | . | | . | | |
| 4 | . | | . | | . | | . | | . | | . | | . | | . | | . | | Header |
| 5 | . | | . | | . | | . | | . | | . | | . | | . | | . | | |
| 6 | . | | . | | . | | . | | . | | . | | . | | . | | . | | |
| 7 | . | | . | | . | | . | | . | | . | | . | | . | | . | | |
| 8 | $J_{F30}$ | | $J_{F31}$ | | PRF | | | | | | | | | | | | | | ⎭ |
| 0 | | | | | | | R | | | | | | | | | | | | ⎫ Report |
| 1 | | S | | | | | A | | | | | | | | $F_L$ | | | | ⎭ |

Header (one per dwell)

| F | (frequency) | | 0 - 31 | 5 |
|---|---|---|---|---|
| Az | (sine of Az angle) | sin .088° | ± sin 55° | 12 |
| EL | (sine of EL angle) | sin .088° | ± sin 9.8° | 12 |
| CL | (clutter level) | | 0 - 31 | 5 |
| ID | (array ID)  00 = Fore  10 = Aft  01 = Strbd  11 = Port | | | 2 |
| SRCT | (sub-report count) | | 0 - 63 | 6 |
| M | (mode)  0 = Search  4 = Test  1 = Verify  5 = Sea State  2 = Track  3, 6 and 7 not defined | | | 3 |
| $J_{F0-31}$ | (jam level/frequency) | | 0 - 7 | 3 |
| PRF | (pulse repetition frequency) | IPPS | 1562-3125 | 12 |

Report ("N" per dwell)

| R | (ambiguous range) | IRC | 0 - 5000 | 13 |
|---|---|---|---|---|
| S | (signal/clutter + noise) | 2 db | 8 - 40 db | 4 |
| A | (amplitude) | 3/8 db | 0    db | 9 |
| $F_L$ | (filter number) | | 0 - 15 | 4 |

Fig. 15c.

BEAM RETURN REPORT FORMAT

Fig. 16b.
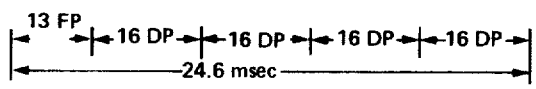
Search beam
Dwell no. 1
Pulses = 77
PRF = 3125
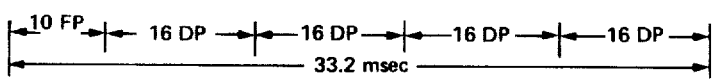
Dwell no. 2
Pulses = 74
PRF = 2232
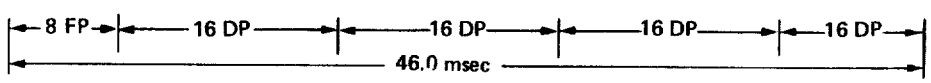
Dwell no. 3
Pulses = 72
PRF = 1562
Track beam
Dwell no. 1
Pulses = 60
PRF = 2700
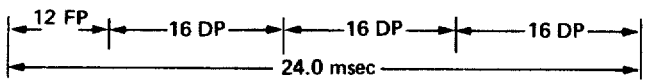
Dwell no. 2
Pulses = 60
PRF = 2700
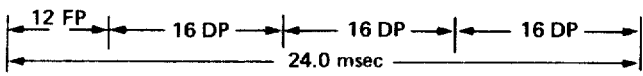
Fig. 16c.
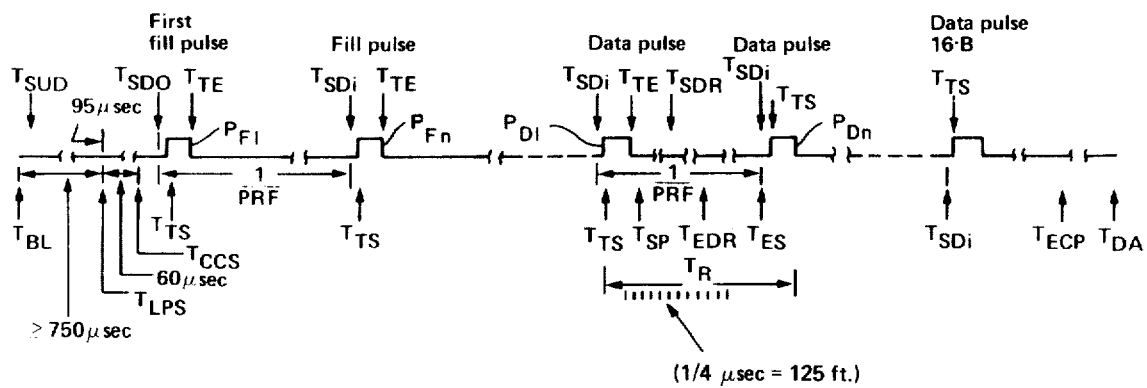

AUTOMATIC PRF SELECTION TO OPTIMIZE RANGE AND DOPPLER VISIBILITY IN RADAR TRACKING

BACKGROUND OF THE INVENTION

This invention relates to moving-target-indication (MTI) radar, and more particularly to the selection of frequency and PRF in pulsed MTI radar for optimum range and doppler visibility in tracking airborne targets.

Ambiguities in range and doppler occur in MTI radar operating at medium and high PRF's. That is to say, the range track data can repeat itself at range multiples equal to $cn/2(PRF)$ which is approximately equal to $81(10)^3/(PRF)$ when range is in nautical miles, (PRF) is in pulses per second and the speed of light (electromagnetic wave propagation), $c$, is in nautical miles per second.

Because there is a significant time concurrent with and immediately following radar transmission that the receiver is shut off, known as receiver dead time, there is a blind zone for a range $\delta'$ from the receiver, and since there is ambiguity in range, a series of range blind zones $\delta_1, \delta_2, \delta_3 \ldots \delta_n$ will be present at range multiples approximately equal to $81(10)^3/(PRF)$ nautical miles. The width (duration), $\delta$, of each blind zone in the series is the same, and slightly less than the blind zone at the origin. The greater width, $\delta'$, at the origin is due to time delays in switching from the transmitter to the receiver.

When the PRF's used are less than the maximum target doppler frequencies expected, multiple velocity blind regions also appear at intervals of the PRF's. These blind regions result from MTI rejection of signals in the frequency spectrum near the PRF lines. That is to say, for a given transmit frequency and PRF, the velocity data can repeat itself in the doppler frequency spectrum at frequency intervals equal to $2\dot{R}_p/cn$ which is approximately equal to $\dot{R}_p/2.94(10)^8$ when the predicted radial velocity of the target, $\dot{R}_p$, is in knots, the speed of light, $c$, is in knots, the transmit frequency, $F$, is in cycles per second, and the PRF is in pulses per second. Consequently, the centers of velocity blind regions created by the MTI filters will repeat themselves at regular intervals in the doppler frequency spectrum. The half width, $\Delta(PRF)$ of each blind region depends upon the composite transfer function of the cascaded MTI and pulse doppler filters, and upon the system detection threshold settings. For a given system, the half width, $\Delta(PRF)$, will remain constant. It is possible to avoid both range blind zones and velocity blind regions in pulsed MTI radar by employing two or more staggered PRF's, but this requires being on target longer. Consequently, for tracking it would be desirable to illuminate the target at its predicted range and radial velocity with a single PRF which does not have a range blind zone or velocity blind region spanning the target.

SUMMARY OF THE INVENTION

Both range and doppler visibility in tracking a target are optimized by tentatively selecting a clear channel frequency, $F$, at which to transmit pulses with a selected pulse repetition frequency, (PRF), for a target at a predicted range, $R_p$, and a predicted radial velocity, $\dot{R}_p$. After determining that the target is not within a range blind zone at the origin of known width (duration), $\delta'$, due to radar dead time, and that the predicted radial velocity is greater than a predetermined minimum for reliable doppler visiblity, the first step is to determine the highest allowable band of PRF's not having a velocity blind region calculated for a series of velocity blind regions from the equation $$(PRF) = 2\dot{R}_p F/cn \pm \Delta(PRF) \approx \dot{R}_p F/[2.94(10)^8 \pm \Delta F]n \quad (1)$$

where $n$ is an integer $1, 2, 3 \ldots$, and $\Delta F$ is a factor, such as 10 percent, to allow for the half width, $\Delta(PRF)$, of each velocity blind region used to define the upper and lower bounds of forbidden PRF's. The next step is to determine the highest PRF within that band of PRF's which places the target between range blind zones from the equation $$R_n = cn/2(PRF) \approx 81(10)^3 n/(PRF) \quad (2)$$

where $n$ is an integer $1,2,3, \ldots$ The constants $2.94(10)^8$ and $81(10)^3$ are computed from the general forms of Equations (1) and (2) when the units for $c$, PRF, $F$, $R_n$ and $\dot{R}_p$ are selected to be as set forth hereinbefore. The allowable bands of PRF's are determined by calculating upper and lower PRF's bounding velocity blind regions for $n=1,2,3. \ldots$ Allowable PRF bands are those bands between forbidden PRF bands found to be within the limits of PRF's available to the system. The PRF to be used for the target track is then selected from the highest allowable PRF band possible by iteratively calculating range blind zones for each PRF starting with the highest in the allowable band, and for each range blind zone, determining whether or not the predicted range $R_p$ of the target is within that zone, until a PRF is found that does not have a blind zone spanning the predicted range $R_p$. If none is found, the next lower allowable PRF band is checked, until all allowable bands for the selected frequency have been checked. If none is found to have a PRF with range visiblity, another clear channel frequency, $F$, is selected for the transmitter, and the entire process is repeated with each selected frequency until a PRF is found having range and doppler visibility for the selected frequency, or until all possible frequencies have been used. A PRF and frequency combination found to have range and doppler visibility is then used in a radar synchronizer and exciter to transmit the next target track beam.

The novel features that are considered characteristic of this invention are set forth with particularity in the appended claims. The invention will best be understood from the following description when read in connection with the accompanying drawings.

BRIEF DESCRIPTION OF THE DRAWINGS

FIG. 2a is a block diagram of clear channel sensing circuits in the signal processor of FIG. 1.

FIG. 2b is a schematic diagram of voltage as a function of time for further explaining the operation of FIG. 2a.

FIGS. 15b and 15c illustrate the respective formats of a typical radar control command beam return report showing the field assignments of the information items listed in FIG. 15a.

FIGS. 16b and 16c are timing diagrams for operation of the radar synchronizer.

DESCRIPTION OF THE PREFERRED EMBODIMENTS

The preferred embodiment of the present invention will now be described with reference to an airborne, early-warning radar system by way of example, and not by way of limitation, since obviously the principles of the invention are not so limited. Other systems, such as a ground-based early-warning radar system, may use the invention to equal advantage, particularly adaptive systems capable of tracking more than one target by selectively switching the radar beam to the various targets individually for updating target data, thereby permitting closer attention to be directed to particular targets while still devoting time not essential for tracking to be used to continue searching for new targets.

A typical airborne surveillance system of which this radar system is a part includes equipments which are generally essential for communication, navigation, auto-pilot and identification functions. Some of these equipments assist with radar associated coordinate transformations and provide communications facilities adapted especially to the airborne surveillance mission. The surveillance system also includes equipments uniquely designed to perform the airborne surveillance mission such as the radar and radar controller, a data processing system and display units.

Figure 1:
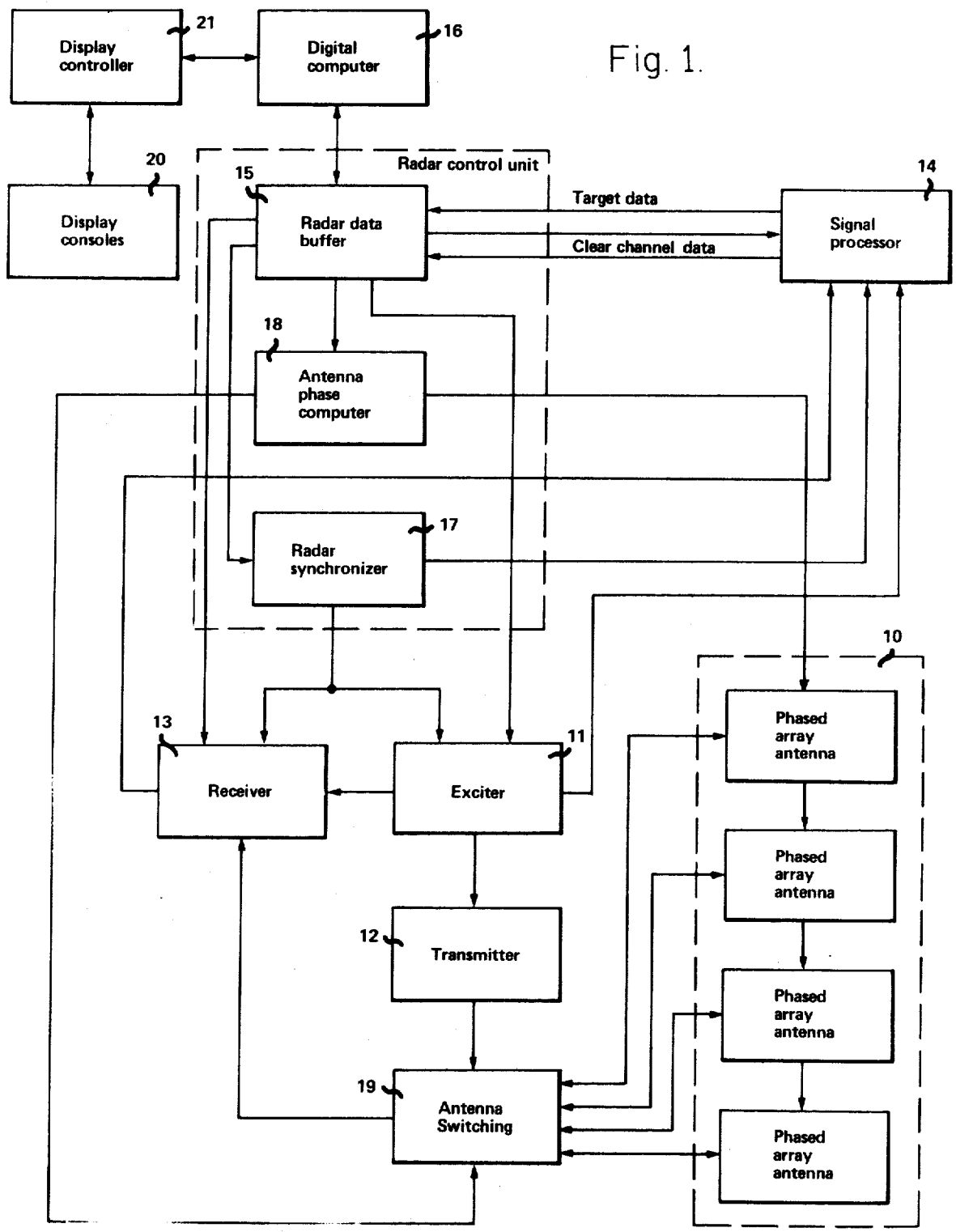
FIG. 1 is a block diagram of a radar system embodying the present invention.

As shown in FIG. 1, the radar system uses a plurality of fixed phase-scanned array antennas 10 to provide 360° coverage for search and track. An exciter 11, transmitter 12, receiver 13, and signal processor 14 are time shared between the antennas. The signal processor incorporates an all-digital clutter processing technique employing medium PRF (1,562 to 3,125 Hz) and a double MTI cancellor cascaded with coherent and non-coherent integration to provide sub-clutter visibility in simultaneous sea, rain and ground clutter. A radar data buffer 15 couples the signal processor 14 to a computer 16 for storing and further processing of target data.

A radar synchronizer 17 receives commands from the computer 16 for necessary control of the radar system, such as to put into effect the frequency and PRF selected for a particular track or search sweep.

The computer 16 also directs an antenna phase computer 18 for the purpose of controlling radar beam steering and array selection during the track and search modes.

Since fixed arrays are employed, and 360° coverage is desired, it is necessary to switch from one array to another when a search or track dwell is selected from another sector. For example, four fixed arrays may be employed, two identical and symmetrical arrays providing 100° coverage on both sides of the aircraft, and two fixed arrays fore and aft, providing 80° coverage ahead of and behind the aircraft. Consequently, the antennas 10 are selectively connected to the transmitter 12 and receiver 13 through an antenna switching unit 19 which is controlled by the unit 18 in accordance with commands received from the computer 16.

It is contemplated that the radar system to be described will use the time difference between direct and reflected (multipath) returns from a target to measure the target height. However, other height determining techniques could be used equally well. The range, R, and radial velocity, $\dot{R}$, data for each target being tracked is derived by the signal processor 14 from radar returns in a conventional manner. It is also contemplated that sequential lobing will be used to determine target azimuth based on return amplitudes of two sequential and overlapping tracking beam lobes. That is conventional technique. Other known azimuth determining techniques could be used equally well.

The computer 16 is a general purpose programmable digital computer of extremely lightweight design and construction with a high processing capability. Multifunction display consoles 20 are coupled to the computer 16 through a display controller 21 to provide a wide variety of specialized displays and controls to assist mission operators.

A program comprised of several subroutines stored in the computer 16 provides whatever system control and data processing is necessary to achieve mission objectives. One task performed by a subroutine of the program is the selection of transmit frequency, F, and PRF to optimize range and doppler visibility in the radar tracking mode in accordance with the present invention. A control routine (program) also provides efficient energy management through independent optimization of search and track data rates, as well as tapering of transmit burst length (dwell time) with track range and signal quality. However, these other functions performed by the computer 16 are not essential to the present invention. They are referred to here only for the purpose of placing the present invention in an exemplary environment.

The signal processor 14 is preferably implemented to provide consistent and reliable detection of targets in an intense clutter environment. Analog phase detected video returns are quantized into binary numbers at the input stage of the processor. This binary format is maintained throughout the entire processing of return signals. The analog-to-digital conversion is made for each of a series of consecutive range resolution cells beginning at a minimum radar range determined by the effective receiver dead time which is concurrent with and immediately following radar transmission. Resolution of the cells is limited in implementation only by the speed of the analog-to-digital conversion. Once the information is converted to digital form, stringent stability requirements of coherent systems no longer apply as data need only be time coherent to the extent of the range resolution cells.

The signal processor provides only those functions which are best suited for hard-wire logic networks. Other functions such as azimuth beam-splitting and height finding required on an intermittant basis are delegated to the computer 16.

The signal processor 14 may also include clear channel sensing circuits for detecting the presence of one or more noise jammers and/or interference sources for each of 32 transmit frequencies in the range from 1,225 to 1,375 MHz. Prior to the transmission of each track beam, the network passively searches across the entire 150 MHz operating bandwidth, and for each of 32 channels equally spaced in the operating bandwidth, quantizes the amplitude of noise and jamming signals present into a 3-bit binary number. The smaller the number, the clearer the channel. Selection of a transmit frequency can then be made from 32 available frequencies, each centered in one of the sampled and graded channels, in the order of the resulting 3-bit numbers.

Figure 2:
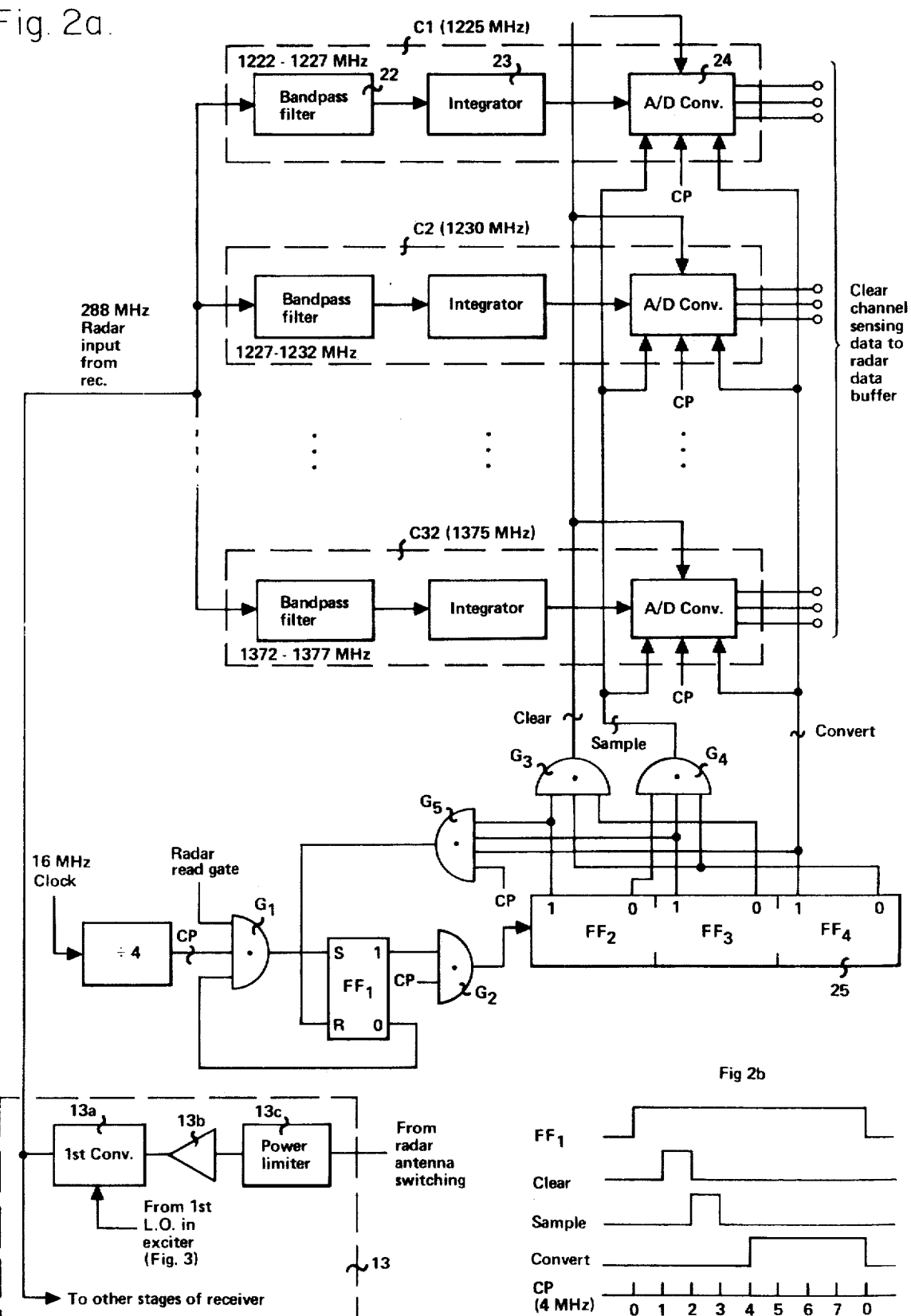

FIG. 2a illustrates an exemplary embodiment for the clear channel sensing circuits. 32 channels C1 through C32 are connected to the receiver 13 at the output of its first converter 13a which follows a single transistor RF amplifier 13b at the output of a receiver power limiter 13c as shown. Each of the channels C1 through C32 consists of a 5 MHz bandpass filter 22 centered on one of 32 transmit frequencies, a lossy integrator 23, and an analog-to-digital converter 24. Each computer controlled sequence for a new dwell includes a read command which initiates a RADAR READ GATE after the antenna switching and beam steering commands have been excuted, and before a command to transmit is initiated. the RADAR READ GATE is clocked an AND gate $G_1$ to set a flip-flop, $FF_1$, which enables a timing signal generator comprised of a binary counter 25 to receive clock pulses an AND gate $G_2$. As the counter steps through seven steps, it transmits CLEAR and SAMPLE pulses to the converters via AND gates $G_3$ and $G_4$. Each converter includes a sample-and-hold stage at its input which is cleared by the CLEAR pulse and then driven to the level of the signal at its input during the SAMPLE pulse. A CONVERT signal derived directly from flip-flop $FF_4$ (most significant bit) of the counter enables the next four clock pulses (CP) to sequence the conversion of the sample signal to a 3-bit form using the "successive approximation" technique. The eighth clock pulse resets the counter and, via an AND gate $G_5$, the flip-flop $FF_1$. The digital outputs of the converters are then available to the computer via the data buffer 15 until cleared by a CLEAR pulse generated in response to the next RADAR READ GATE. FIG. 2b shows the relative timing of the CLEAR, SAMPLE and CONVERT pulses.

In the present invention, the clear channel frequency selection made for a track is tentative in that, if a stored subroutine in the computer determines from the predicted target range, $R_p$, and raidal velocity, $\dot{R}_p$, that visibility in both range and doppler is not possible, another equally clear (or a next most clear) channel frequency is selected for the next track dwell.

The exciter 11 provides local oscillator signals for the receiver as well as low level coded drive waveforms and clock reference signals to the transmitter. The transmitter drive signal is initiated at 32 MHz, mixed to a center frequency (second IF) of 288 MHz, frequency converted to L-band by mixing with the first local oscillator signal, and amplified to a sufficient power level to drive the transmitter.

Passive "chirp" generation (time-frequency dispersion of a short IF pulse by an ultrasonic delay line) rather than active "chirp" generation (producing the expanded pulse by modulating a voltage tunable oscillator) is used to obtain the coded drive waveforms. This provides a coherent reference signal for a clutter tracker that is independent of selected PRF.

Figure 3:
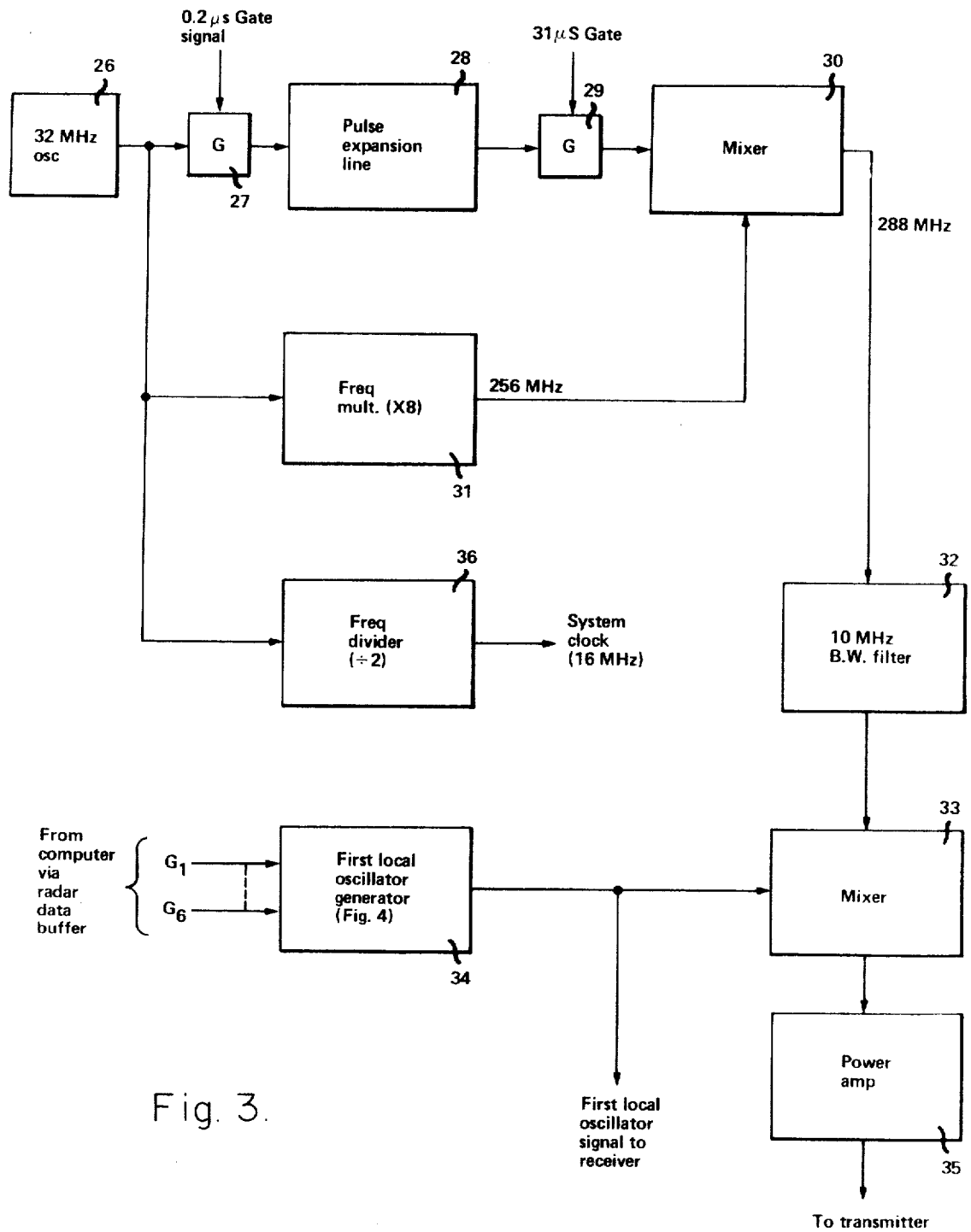
FIG. 3 is a block diagram illustrating a preferred organization for an exciter in the radar system of FIG. 1.

FIG. 3 shows the preferred implementation of waveform generation and frequency conversion in the exciter. In order to obtain the "chirped" waveform, the output of a stable 32 "oscillator 26 is gated on for 0.2 $\mu$s through a gate 27. An ultrasonic line 28 disperses the short pulse and expands it to greater than 31 $\mu$s in length. A gate 29 following the compression line selects the desired output spectrum so that a 31 $\mu$s signal is then mixed through a mixer 30 with 256 MHz from a frequency multiplier 31 to frequency convert the pulse to a center frequency of 288 MHz.

A 10 MHz bandpass filter 32 at 288 MHz is used to remove undesired mixing products and to reduce the spectrum width of the "chirped" signal. The 288 MHz signal is then mixed in a mixer 33 with the output of a first local oscillator 34 centering the selected waveform at the transmit frequency. The signal is then amplified to a level of approximately 5 milliwatts in an amplifier 35 and routed to the transmitter.

This method of frequency conversion (sharing the first local oscillator for up-converting the transmit waveform and down-converting the received signal) simplifies the design of the exciter since only one frequency generator is required (the output of the first local oscillator 34 is routed to the receiver 13) and concern for pulse-to-pulse frequency stability is restricted to one first local oscillator source rather than two.

The output of the oscillator 26 was selected to be 32 MHz, instead of 30 MHz, to be compatible with the digital clock timing. Using 32 MHz allows all the digital clock frequencies to be an integral sub-multiple of 32 MHz derived from a 16 MHz clock reference routed to the signal processor 14 through a frequency divider 36. Consequently, any digital clock noise that inadvertently is picked up in the receiver is coherent and will be cancelled in the MTI processor.

Figure 4:
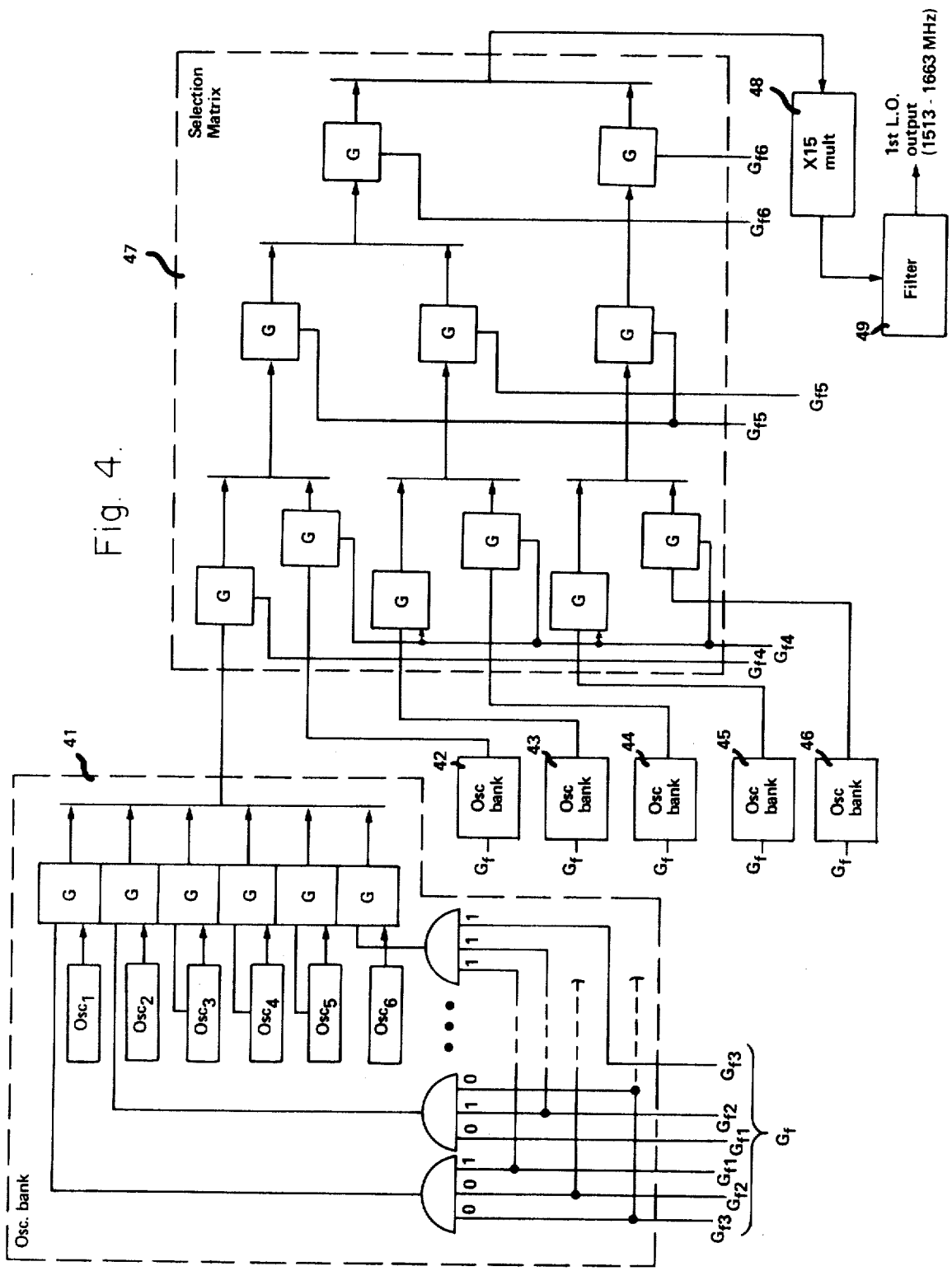
FIG. 4 is a block diagram illustrating a preferred organization for generating a selected one of 32 transmit frequencies.

The first local oscillator generator 34 produces one of 32 frequencies centered on the 32 channels monitored for clear channel sensing by selecting one of 32 gated oscillators, and frequency multiplying the selected frequency by 15 to achieve the L-band output frequency as shown in FIG. 4. This technique requires the same amount of hardware as other techniques, but it provides greater frequency stability.

Referring to FIG. 4, the first local oscillator 34 of FIG. 3 consists of six banks of gated oscillators 41–46. A 3-bit code, $G_{f1}$-$G_{f3}$ applied to each bank selects one oscillator for each of six binary codes 001 through 111, and a 3-bit code $G_{f4}$-$G_{f6}$ applied to a selection matrix 47 routes the output of only one bank of oscillators to a multiplier 48 where it is multiplied by 15 and filtered in a suitable passband (1,513–1,663 MHz) filter 49. Four of the oscillator banks have only five oscillators instead of six because only 32 frequencies are required, not 36.

Decoding the $G_f$ code may be accomplished in a conventional manner using diodes or transistors for logic gates (as shown) to enable only one oscillator to be gated to the selection matrix through buffer circuits at the outputs of the oscillator gates (G). The selection matrix 47 may be implemented as a three-stage, two-branch selecting tree in the manner described in Chapter 13 in The Design of Switching Circuits, D. Van Nostrand Co., Inc. (1951) by William Keister, et al., but implemented with MOS field effect transistors in the gates (G) for high speed selection.

As noted hereinbefore, the computer 16 is a stored program, general purpose computer adapted for real-time processing applications. It is conventional in organization, but adapted to its mission through the energy management (radar beam control) program, and other programs. All of the instructions necessary to implement the frequency, F, and PRF selection subroutine are conventional in general purpose computers. This is so because, once called by the energy management routine when it is time to transmit a track beam at an established target, all the data required by the subroutine is available for processing.

In general, the computer is comprised of a Processor module, an Input/Output module, and one or more Memory modules. The Processor module consists of a program control unit and an arithmetic unit. The program control unit directs the operation of the computer in accordance with the computer program and external controls. The arithmetic unit performs arithmetic operations such as add, subtract, multiply and divide, plus certain logic operations, all under control of the program control unit.

The Input/Output module is the communication link between the computer and the remainder of the system. It is designed for the very high input/output transfer rate of 2,000,000 words per second total over as many as eight bidirectional channels. Each channel operates independently and communicates with such external devices as the radar data buffer 15 or the display controller 21, FIG. 1.

The Memory module is a conincident current, random access memory which provides an orderly storage medium for data presented to it or requested from it by either the Processor or the Input/Output module.

The present invention, which relates to automatic PRF and transmit frequency, F, selection to optimize range and doppler visibility in tracking, will now be described with reference to a system flow chart of a stored subroutine.

The system of symbols employed in the flow is as follows. Operations are represented by rectangles, logical tests and branching operations are represented by triangles, and connecters used to connect remote portions of the flow chart with one another are designated by small circles. A number outside the circle is used to indicate the figure number of the corresponding entry or exit.

Figure 5:
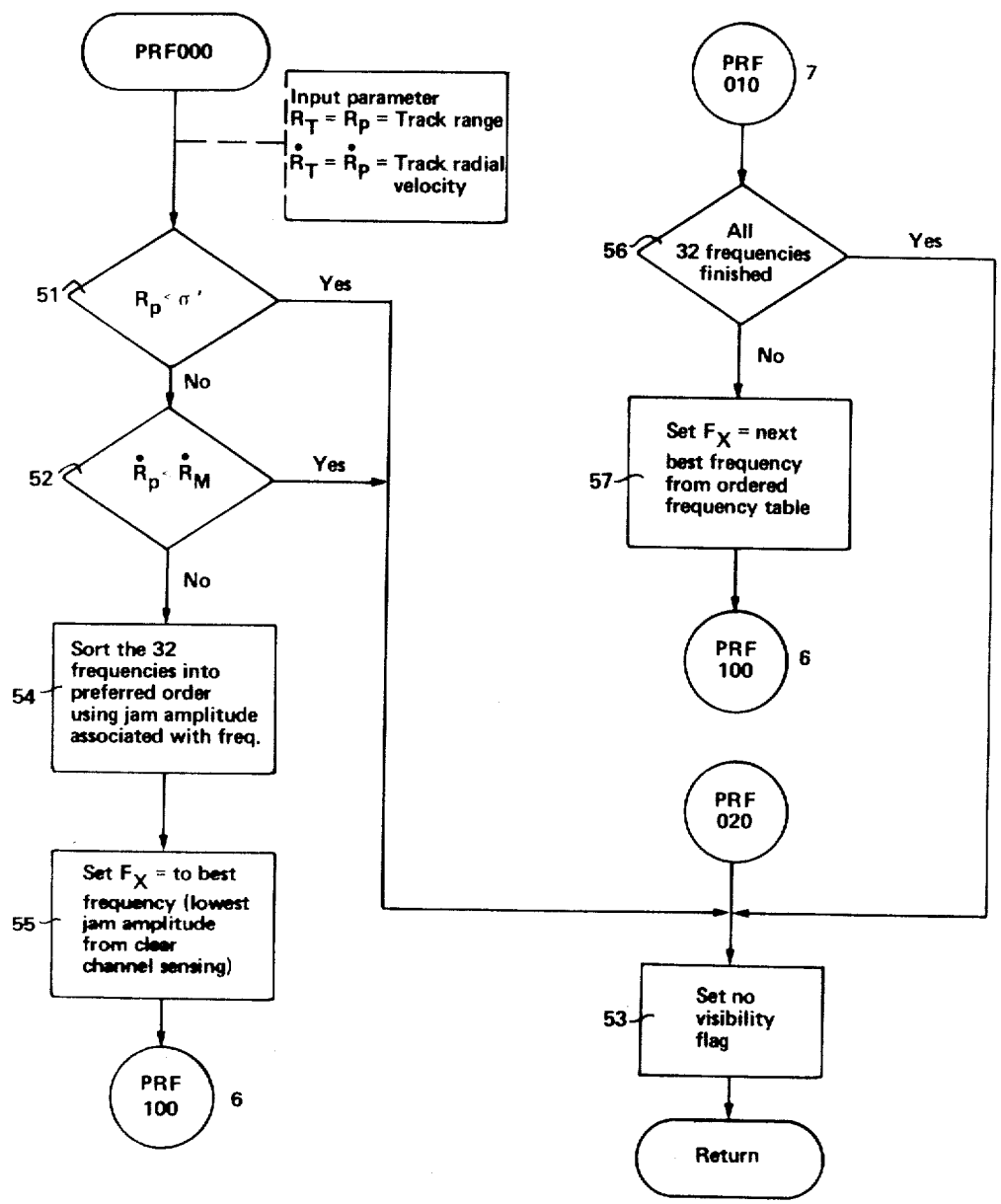
FIGS. 5, 6, 7 and 8 show a flow chart in three sections I, II and III for a programmed digital computer implementation of the present invention.
Figure 6:
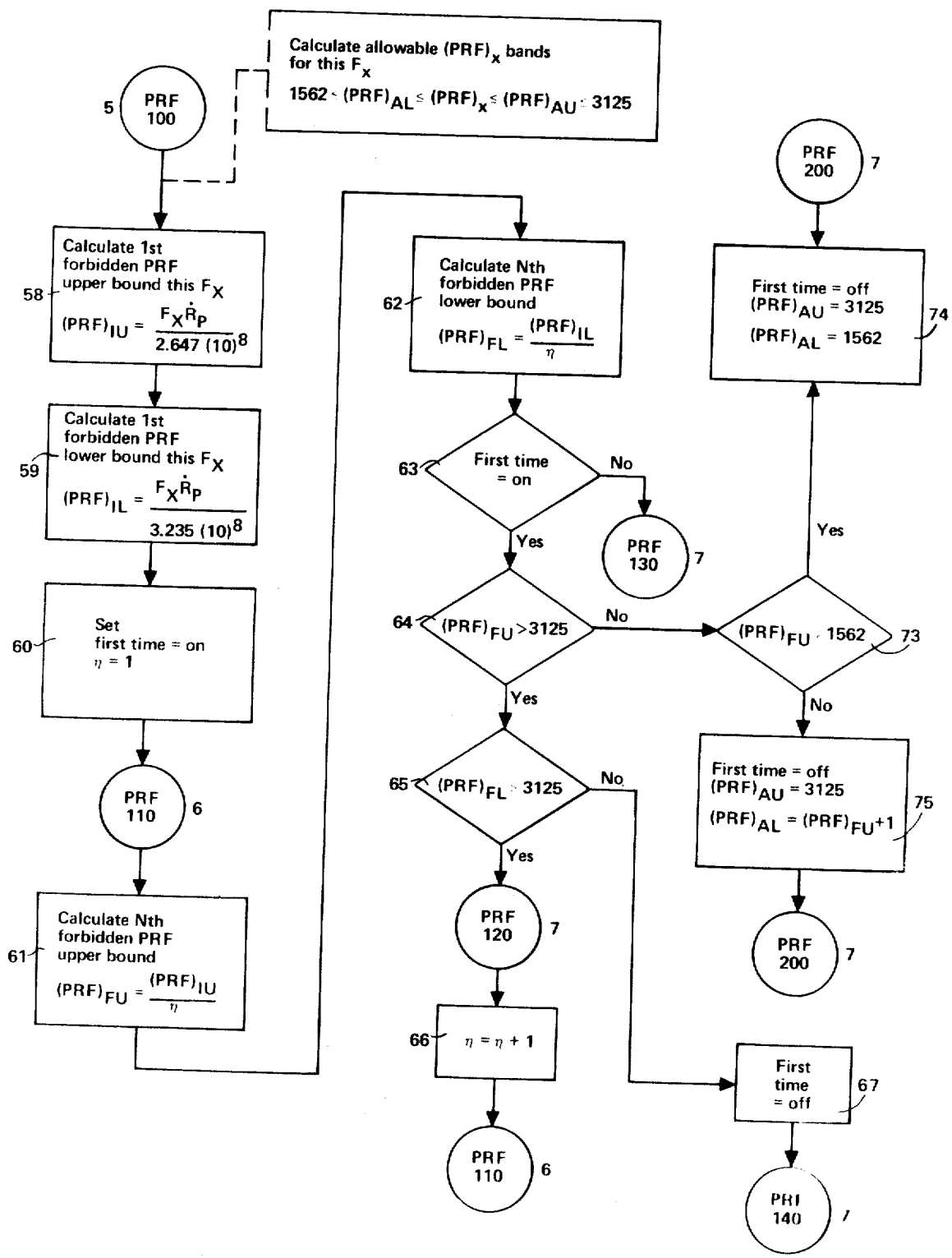
Figure 7:
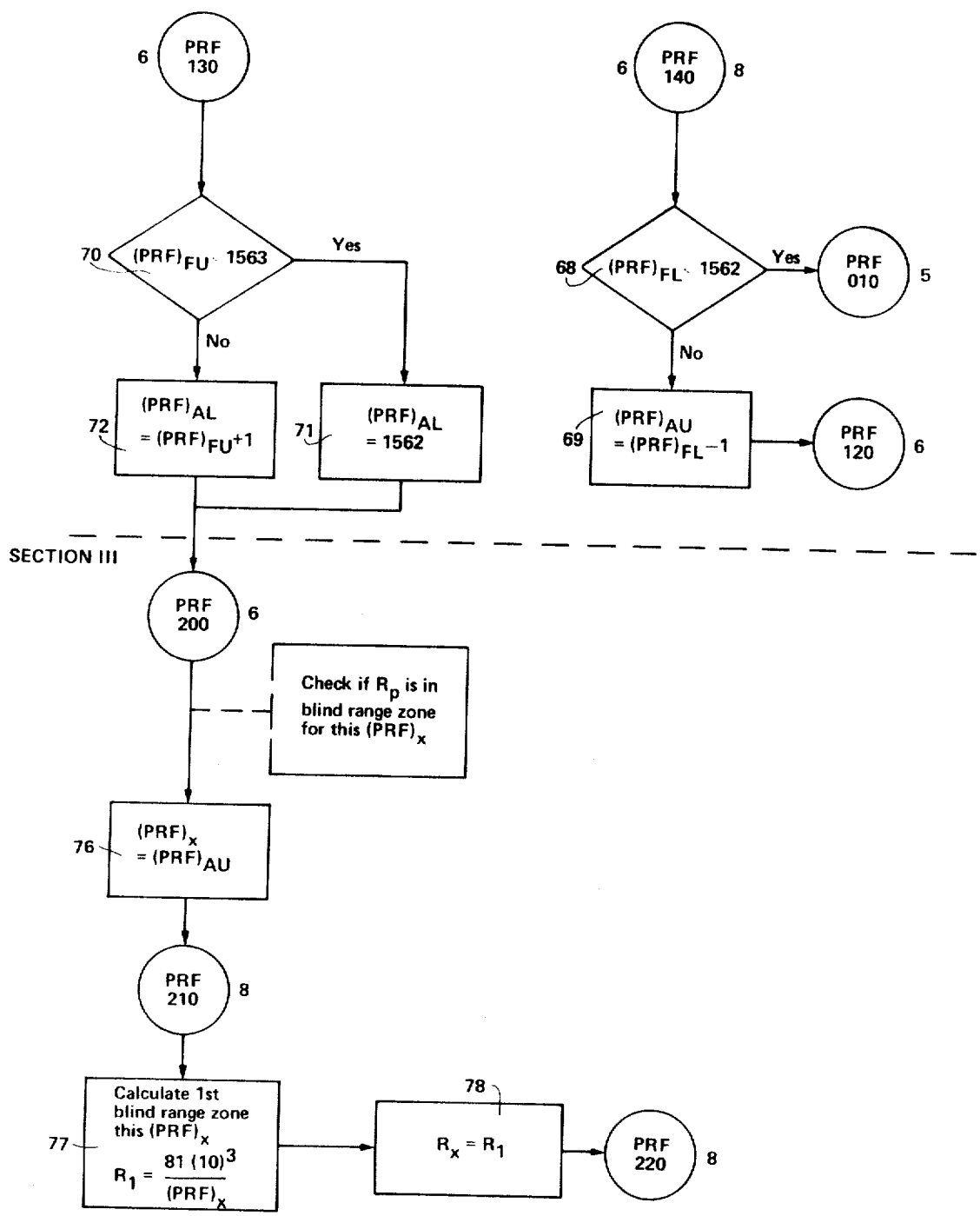
Figure 8:
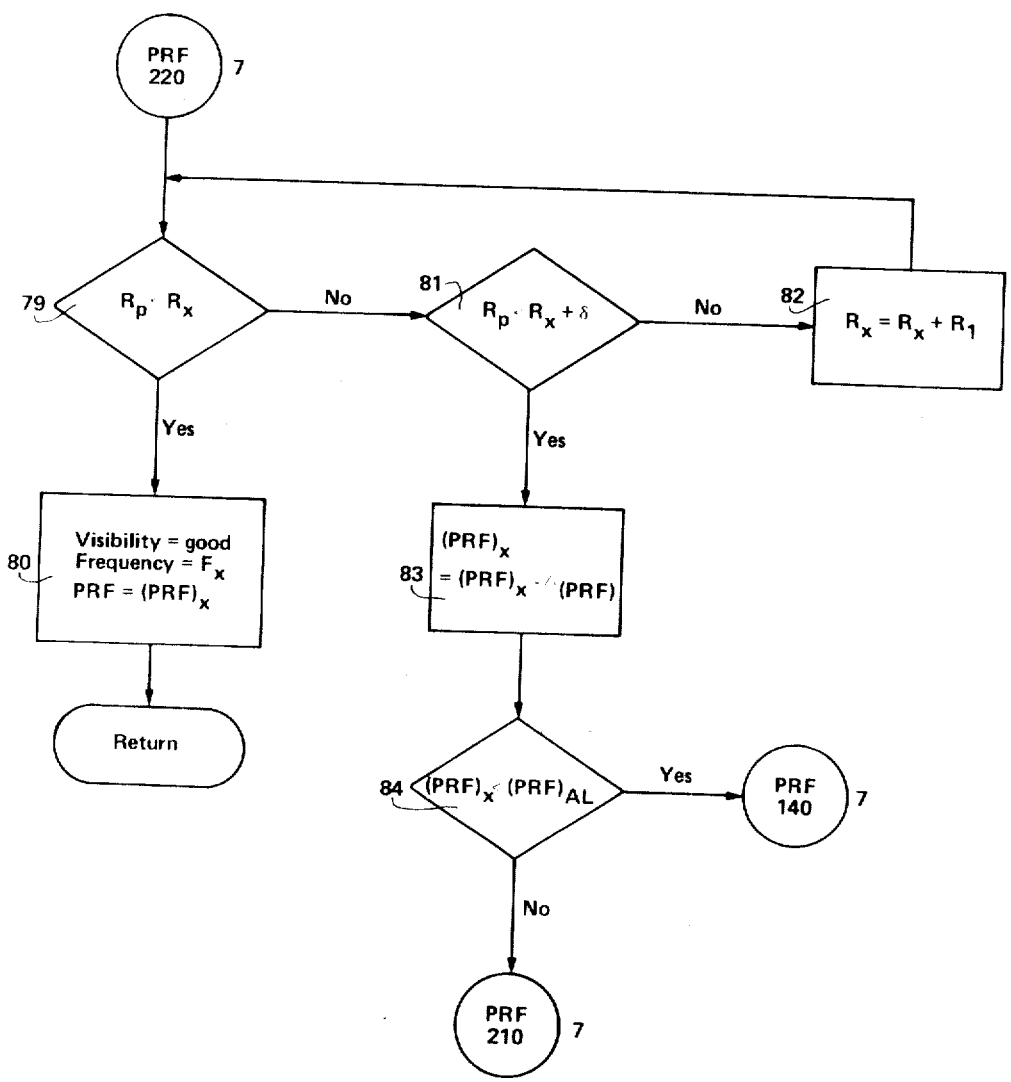

For convenience, the flow chart has been divided into three sections. Section I, shown in FIG. 5, is devoted primarily to checking to determine whether the predicted range of the target to be tracked is within a predetermined minimum range determined by the effective receiver dead time associated with each radar transmission, and to tentative selection of a clear channel frequency. Section II shown in FIGS. 6 and 7 is devoted to determining the highest band of PRF's available between adjacent velocity blind regions. Section III shown in FIGS. 7 and 8 is devoted to checking each PRF in the band selected by the second section, starting with the highest PRF, to determine whether the predicted range of the target is within a range blind zone. If so, the next lower PRF is tentatively selected and checked until a PRF is found which provides range visibility of the target at the predicted range.

The predicted range, $R_p$, and predicted radial velocity, $\dot{R}_p$, of the target are provided by the computer as known inputs to this PRF selection subroutine. Other values required by the subroutine are also known and provided as inputs by the computer, such as the width (duration), $\delta$ and $\delta'$, of blind zones, which are simply a function of receiver dead time initiated concurrently with each radar transmission, and the half width, $\Delta F$, of the velocity blind regions which is established by the composite transfer function of the cascaded MTI and pulse doppler filters in the signal processor 14, and upon the system detection threshold settings.

32 frequencies are associated with the channels that were sensed. The object is to select for the next track a clear channel frequency. If no frequency is absolutely clear, the one having the lowest 3-bit code from its clear channel sensing circuit is selected. Consequently, Section I of the subroutine PRF000 called out by the radar beam control program for PRF selection is devoted to selection of a tentative transmit frequency. However, before doing that, two preliminary tests are made on the visibility of the target.

Referring to FIG. 5, the first test of Section I in box 51 is a check to determine whether the predicted range, $R_p$, of the target is less than or equal to the width (duration), $\delta'$, of the blind zone of the origin due to receiver dead time concurrent with and immediately following radar transmission. If so, the subroutine branches to tag PRF020. The next test in box 52, made if the answer to the first test is "no," is a check to determine whether the predicted radial velocity, $\dot{R}_p$, is less than a minimum radial velocity, $\dot{R}_M$, which can be detected by doppler shift in the radar return anticipated from the target. If so, the subroutine branches to tag PRF020 where, in box 53, a "no visibility" flag is set to indicate to the program that there is no visibility of the target. When the control program detects that the no-visibility flag is set, it calls for another track or search dwell. In that manner the program sequence returns from the current track subroutine to the control program.

If both preliminary tests are successful, the next operation is one of sorting the 32 frequencies into a preferred order using the 3-bit number associated with the noise and jamming levels of the 32 channels. The smaller the 3-bit number, the clearer the channel. Consequently, box 54 sorts the frequencies in inverse order of associated 3-bit numbers, entering all those having a number 000, then those having a number 001, etc., until all have been ordered in a table. Box 55 then makes a tentative selection of a transmit frequency $F_x$. The table makes it possible to proceed in an orderly manner to another equally good or the next best frequency if appropriate tests in Sections II and III fail. Reentry to Section I is through tag PRF010. Box 55 checks to see if all 32 frequencies have been investigated. If so, there is a branch to tag PRF020, and if not box 57 selects the next frequency to be investigated. After each tentative frequency selection, the subroutine branches to tag PRF100 (from box 55 for the first, and from box 57 for each subsequent selection).

The radar transmit frequency, $F$, and PRF can be related to the target radial velocity, $\dot{R}$, at the center of velocity blind regions by Equation (1). Once a range of PRF's has been selected from this relationship between frequency, PRF and radial velocity, a PRF is selected from the relationship between the distance of multiple range blind zones and PRF given by Equation (2). Section II of the subroutine, which will now be described, implements Equation (1) to find an allowable band of PRF's, while Section III implements Equation (2) to find an acceptable PRF within the allowable band.

Tag PRF 100 in FIG. 6 is an entry to Section II within this subroutine. The object of Section II is, as stated previously, to select allowable bands of PRF for the frequency $F_x$ currently under investigation. The subscript $x$ is used throughout to designate a particular item (frequency or PRF) under investigation. All PRF bands must be between selected upper and lower limits of the radar system which are 3,125 Hz and 1,562 Hz, respectively. Consequently, allowable upper (AU) and allowable lower (AL) PRF's must satisfy the condition $1562 < (PRF)_{AL} < (PRF)_x < (PRF)_{AU} < 3125$. The approach taken is to use Equation (1) to calculate forbidden bands $(PRF)_{FL} < (PRF)_x < (PRF)_{FU}$ of PRF (forbidden because velocity blind regions would result in descending order of frequency as $n$ is incremented during each iteration of the PRF selection loop), and to select during each iteration a tentative allowable band between a forbidden band lower limit, $(PRF)_{FL}$, that falls between 1,562 and 3,125 Hz as determined in one iteration of Section II, and the upper limit, $(PRF)_{FU}$, of the next forbidden band determined in the next iteration. If the upper limit, $(PRF)_{FU}$, of that next forbidden band is less than 1,562 Hz, the lower limit, $(PRF)_{AL}$, of an allowable band of PRF's is selected to be 1562 Hz, i.e., the allowable lower limit, $(PRF)_{AL}$, is set equal to the determined forbidden upper limit, $(PRF)_{FU}$, or 1,562 Hz, whichever is greater. Similarly, if the lower limit of a forbidden band determined in the one iteration is greater than 3,125 Hz, the upper limit, $(PRF)_{FU}$, of an allowable band of PRF's is selected to be 3,125 Hz.

Figure 9:
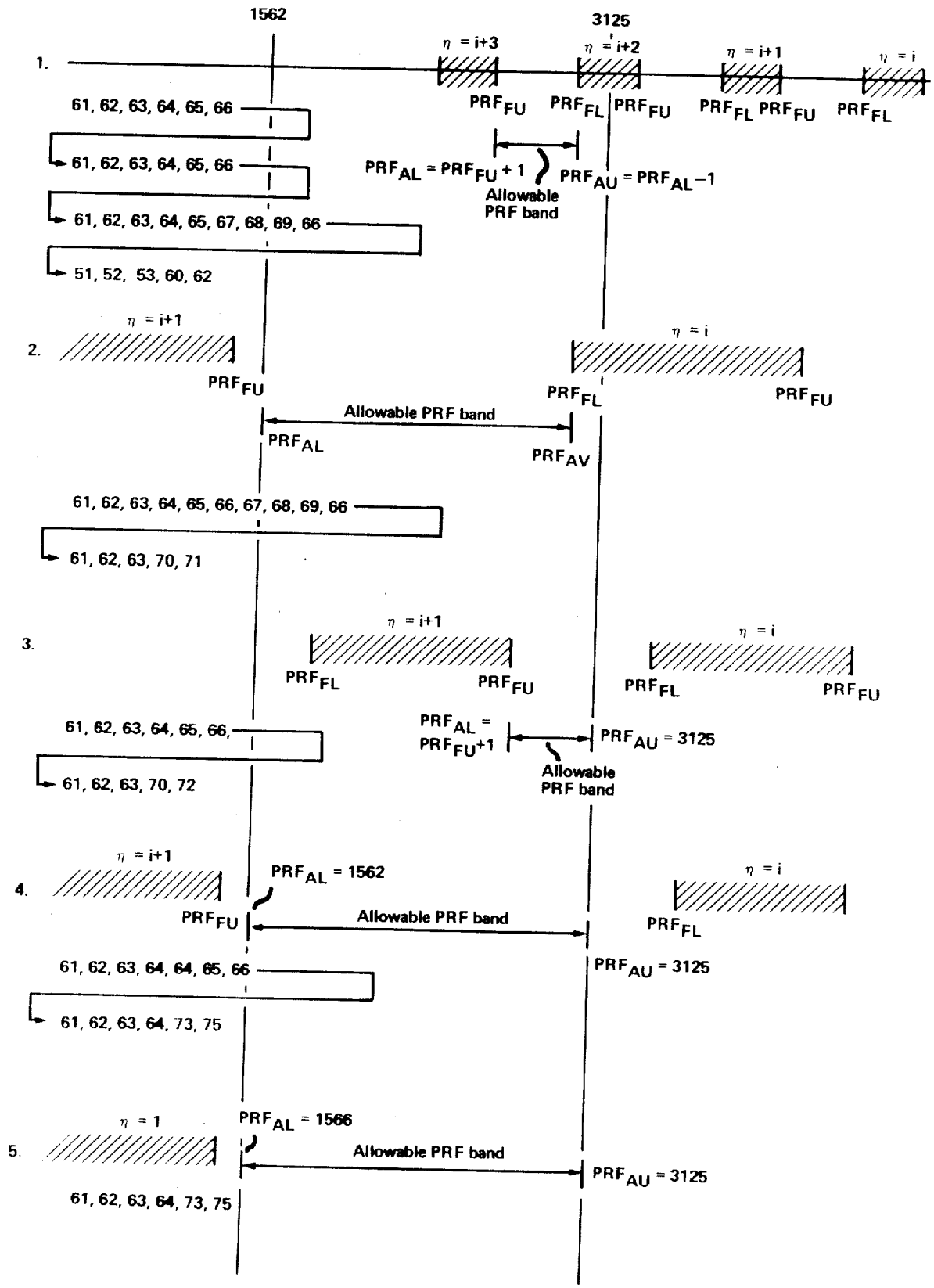
FIG. 9 is a diagram of examples illustrating the manner in which forbidden PRF bands are used to determine the limits of an allowable PRF band.

Some examples shown in FIG. 9 will clarify this section of the subroutine. A first example is a condition in which successive forbidden bands for $\eta=i$ and for $\eta=i+1$ are both above the upper PRF limit of 3,125 Hz. Since the one iteration, $\eta=i$, does not produce a lower limit $(PRF)_{FL}$ of a forbidden band below 3,125 Hz, the sequence of determining a forbidden band of PRF's is repeated for $\eta=i+1$, and again for $\eta=i+2$, when a $(PRF)_{FL}$ below 3,125 is found. That $[(PRF)_{FL} - 1]$ is then stored as the upper bound, $(PRF)_{AU}$, of an allowable PRF band. The forbidden band for the next iteration, $\eta=i+3$, is then used to find an upper bound $(PRF)_{FU}$ greater than 1,562 Hz. When found, the allowable lower bound, $(PRF)_{AL}$, is set equal to that forbidden upper bound $[(PRF)_{FU} + 1]$.

The sequence of numbers shown in FIG. 9 for Example 1, and the following examples, indicate the flow through boxes of the flow chart necessary to reach the end result of Section II, namely a determination of limits for an allowable band of PRF's for the frequency under investigation.

If, after an allowable upper bound is found, the upper bound of the next lower forbidden band is below 1,562 Hz, the allowable lower bound, $(PRF)_{AL}$, is set equal to 1,562 Hz. That situation is illustrated in Example 2. Another situation illustrated in Example 3 is when the first forbidden band having any part within the limits of 1,562 and 3,125 Hz has a forbidden upper bound, $(PRF)_{FU}$, less than 3,125 Hz, but greater than 1,562 Hz. In that case the allowable band is from $(PRF)_{AL} = (PRF)_{FU} + 1$ to $(PRF)_{AU} = 3,125$.

In Example 4, a forbidden band entirely above 3,125 Hz for $n=i$ is followed by a forbidden band entirely below 1,562 Hz for $n=i+1$. Consequently, the allowable band is set to be from 1,562 to 3,125 Hz. Example 5 is a special case of Example 4. If the upper limit of the first forbidden band for $n=1$ is below 1,562, it is known that the entire range from 1,562 to 3,125 Hz is allowable.

The flow chart of Section II, FIGS. 6 and 7, will now be described in detail. The first operation in box 58 is to calculate the first forbidden PRF upper bound for the currently selected frequency, $F_x$, using Equation (1) with $n=1$ and $+\Delta F = 10$ percent of $2.94(10)^8$. The next operation, in box 59, is to calculate the first forbidden PRF lower bound for the currently selected frequency, $F_x$, using Equation (1) with $n=1$ and $-\Delta F = 10$ percent of $2.94(10)^8$. Then in box 60 the flag "first time" is turned on and $\eta$ is set equal to 1. In the next two operations, boxes 61 and 62, the initial values $(PRF)_{1U}$ and $(PRF)_{1L}$ are used to compute the upper and lower bounds of forbidden PRF bands for successive values of $\eta$, starting with $\eta=1$. The first time through, operations 61 and 62 will not yield upper and lower bounds which differ from those initially calculated in operations 58 and 59 since the operations 61 and 62 call for simply dividing by $\eta$ which is equal to one. However, as $\eta$ is incremented, time is saved because upper and lower bounds for a new band of PRF's can be calculated from the initial values $(PRF)_{1U}$ and $(PRF)_{1L}$ by simply dividing by the new value of n each time Section II is reentered through tag PRF110.

Once upper and lower bounds for a forbidden band of PRF's have been calculated in operations 61 and 62, the next stop is to check for "first time" on in box 63. The first time through boxes 61 and 62, and for possibly sometime thereafter, "first time" will be on, and the next step is to determine whether the upper bound $(PRF)_{FU}$ of the nth band is greater than 3,125 Hz. If so, the next check is to determine whether the lower bound $(PRF)_{FL}$ is also greater than 3,125 Hz. These two checks are made in boxes 64 and 65. If both checks are positive, we know that the entire forbidden band is outside the limits of 1,562 to 3,125 Hz. Consequently, neither the upper nor the lower bound of that forbidden band will be useful to us in finding an allowable band of PRF's. Under those conditions, the next step in box 66 is to increment $n$ by 1 and return to operations 61 and 62 pointed to by the tag PRF110. In that manner, a search for the next lower forbidden band of PRF's is made.

If only the test in box 64 is positive, we know that the lower bound of the current forbidden band of PRF's is straddling 3,125 Hz, the specified upper limit of allowable PRF's. Consequently, it is possible to now set the upper bound $(PRF)_{AU}$ of an allowable band. Before doing that, the "first time" flag is turned off in box 67 and a check is made in box 68 (FIG. 7) to determine whether the lower bound $(PRF)_{FL}$ of the current forbidden band is equal to or less than the lower limit 1,562 Hz of allowable PRF's. IF so, it is known that there is no allowable PRF band for the frequency $F_x$ currently under investigation, and the subroutine returns to box 56 (FIG. 5) pointed to by the tag PRF010.

If the current $(PRF)_{FL}$ is not equal to or less than 1,562 Hz, that PRF (less 1 Hz) is accepted as the upper bound $(PRF)_{AU}$ for an allowable band of PRF's. That is accomplished in the operation indicated by box 69, which is to set $(PRF)_{AU} = (PRF)_{FL} -1$ in a designated memory location. The subroutine then returns to box 66 (FIG. 6) pointed to by the tag PRF120. There $\eta$ is incremented by 1 to find the next lower forbidden band, the upper bound of which will become the lower bound of an allowable band, unless that upper bound of the forbidden band is less than 1,562 Hz, in which case 1,562 Hz is accepted as the lower bound $(PRF)_{AL}$ of the allowable band of PRF's for the frequency $F_x$ under investigation. To reach that point, the subroutine proceeds through the operations of boxes 61 and 62 and branches in response to the test in box 63 to a box 70 (FIG. 7) pointed to by the tag PRF130 since the operation of box 69 (selecting the upper bound of an allowable band) is reached through box 67 which turns the "first time" switch off. In box 70, the current upper bound $(PRF)_{FU}$ is checked to determine whether it is less than 1562. If so, box 71 sets the lower bound $(PRF)_{AL}$ of the allowable band of PRF's equal to 1,562 Hz. If not, the current upper bound $(PRF)_{FU}$ of a forbidden band of PRF's is used to set the lower bound $(PRF)_{AL}$ of the allowable band of PRF's to be investigated next by Section III of the subroutine. That is done by setting $(PRF)_{AL} = (PRF)_{FU} +1$ in box 72.

Upon investigating any forbidden band of PRF's prior to finding the upper bound of an allowable band of PRF's, i.e., each time the subroutine passes through boxes 61 and 62 prior to the "first time" flag being turned off in box 67, a check is made to determine whether the upper bound $(PRF)_{FU}$ is greater than 3,125. If so, the lower bound $(PRF)_{FL}$ is checked to determine whether it is also greater than 3,125 Hz, as noted hereinbefore. If $(PRF)_{FU}$ is not greater than 3,125 Hz, the subroutine branches at box 64 to box 73 in FIG. 6 to determine whether or not the upper bound $(PRF)_{FU}$ is less than 1,562 Hz. If so, it is known that the forbidden band is completely below the lower limit of allowable PRF's for the radar system and that the allowable band of PRF's is from 1,562 to 3,125 Hz. Consequently, the next step is box 74 where $(PRF)_{AU}$ is set equal to 3,125, $(PRF)_{AL}$ is set equal to 1,562 and the "first time" flag is turned off. The subroutine then branches to Section III in FIG. 7 pointed to by the tag PRF200.

If the upper bound $(PRF)_{FU}$ of a forbidden band is found in box 73 to be not less than 1562, it is known that the entire range of PRF's from the upper system limit of 3,125 Hz down to but not including the $(PRF)_{FU}$ is allowable. Consequently, the next operation indicated by box 75 is to set the "first time" flag off and to set the upper and lower bounds of the acceptable band to respectively 3,125 Hz and $(PRF)_{FU}+1$. The subroutine then branches to Section III in FIG. 7.

Referring now to FIG. 7, the tag PRF200 enters to Section III for automatic PRF selection. The object of this section is to check the band of allowable PRF's found in Section II for a PRF which does not have a blind range zone at the predicted range of the target. This is accomplished by calculating the start of the first blind zone using Equation (2) and setting $n=1$ for a particular PRF in the allowable band, which for the first time through is set in box 76 equal to the upper bound $(PRF)_{AU}$. The calculation is made in box 77. The value $R_1$ computed for $n=1$ in Equation (2) is retained in order that the start of successive blind range zones can be calculated by simply adding $R_1$ to the start of the previous blind range zone $R_x$, instead of recalculating from Equation (2) each time as for the first blind zone when $n=1$. This technique of calculating $R_n$ for $n=1$ and adding it to the value of $R_1$ to get $R_2$, and adding it again to the value of $R_2$ to get $R_3$, and so on, saves computation time.

Once $R_x$ has been set equal to $R_1$ in box 78, the next operation pointed to by a tag PRF220 is a check in box 79 (FIG. 8) to determine if the predicted range $R_p$ of the target is less than $R_x$. If so, the target is visible in both range and radial velocity for the selected frequency and PRF. Consequently, the last operation in box 80 before returning to the control program is to set a flag indicating that visibility is good, thereby signalling to the control program that it may proceed with the proposed track, and set frequency and PRF to $F_x$ and $(PRF)_x$, respectively, in specified memory locations. Those locations are addressed by the control program in setting up the exciter 11 and radar synchronizer 17 for transmitting with a frequency of $F_x$ and a PRF of $(PRF)_x$.

If the predicted range $R_p$ of the target is not less than $R_x$, the operation in box 79 is a branch to box 81 where a test is made to determine whether the predicted range $R_p$ is equal to or less than $R_x$ plus the width, $\delta$, of the blind zone. If not, the next blind zone is checked by simply adding $R_1$ to $R_x$, as called for by box 82 and returning to box 79. This sequence is repeated until all range zones of interest have been checked, i.e., until $R_x$ is greater than $R_p$ or $R_p$ is found to be in a blind zone $R_x+\delta$. When $R_p$ is found to be in a blind zone $R_x+\delta$, the subroutine branches, as indicated by box 81, to decrease the PRF presently under investigation by some predetermined amount $\Delta_{(PRF)}$ as indicated by box 83. This is for the reason that once the predicted range $R_p$ is found to lie within a blind zone it is necessary to select another PRF.

The choice of PRF's starts from a maximum, where $(PRF)_x$ is equal to $(PRF)_{AU}$ because it is desirable to obtain target data in as short a time as possible. As a lower and lower PRF is checked for range blind zones at the predicted range of the target, it is possible for the lower bound of the allowable band of PRF's to be reached before a suitable PRF is found. Consequently, the next operation after subtracting $\Delta_{(PRF)}$ is to check in box 84 to see whether or not the new PRF is less than the lower bound $(PRF)_{AL}$ of the allowable band. If so, there is no suitable PRF within the allowable band and the subroutine returns to box 68 of Section II, FIG. 7, to calculate another allowable band, if any, for this frequency $F_x$ as indicated by the tag PRF140. If not, box 84 branches back to box 77 as indicated by the tag PRF210 to calculate the first blind range zone for this new value $(PRF)_x$. The balance of the sequence called for by Section III is then repeated.

The entire process is repeated until the subroutine returns to the control program from box 80 when good visibility is found for a particular combination of frequency and PRF or, having checked all frequencies available, the subroutine returns to the control program from box 53 (FIG. 5).

Virtually, any PRF specified within the limits of 1,562 and 3,125 can be accommodated by the radar synchronizer 17 by, for example, simply providing an appropriate preset for a timing counter driven by clock pulses to meter periods between radar transmissions. Each time the radar transmits, the counter is preset, and when it counts to zero, another pulse transmission is initiated.

The clear-channel method of frequency-investigation ordering described in the preferred embodiment has the advantage of forcing the subroutine to chose the best frequency (i.e., least amount of jamming/interference) in which a $(PRF)_x$ can be found to give doppler and range visibility. This method also ensures that the subroutine will always remain sensitive to the changing jamming/interference air picture.

In applications where the clear channel information described above does not exist, a pseudo-random method of frequency-investigation ordering may be implemented. Such an alternative method would provide some counter measures against hostile aircraft jamming.

The pseudo-random method could be implemented by storing the 32 frequencies in a table in pseudo-random order. Each tentative frequency selected for investigation would be made by cycling through the table from top to bottom. When a frequency is selected to fire a radar track beam, the pointer is saved so that investigation for the next radar track beam would start with the next frequency in the table. When the bottom of the table is reached, the pointer is set to the top of the table.

From the foregoing descriptions of FIGS. 5-8, it is evident that the entire subroutine can be programmed with simple instructions available in virtually any programmed digital computer. The specific instructions required are simply addition, subtraction, multiplication, division, conditional branch, and the like. Accordingly, the following description of a typical computer illustrated in FIGS. 10 and 11 is by way of example and not by way of limitation.

Figure 10:
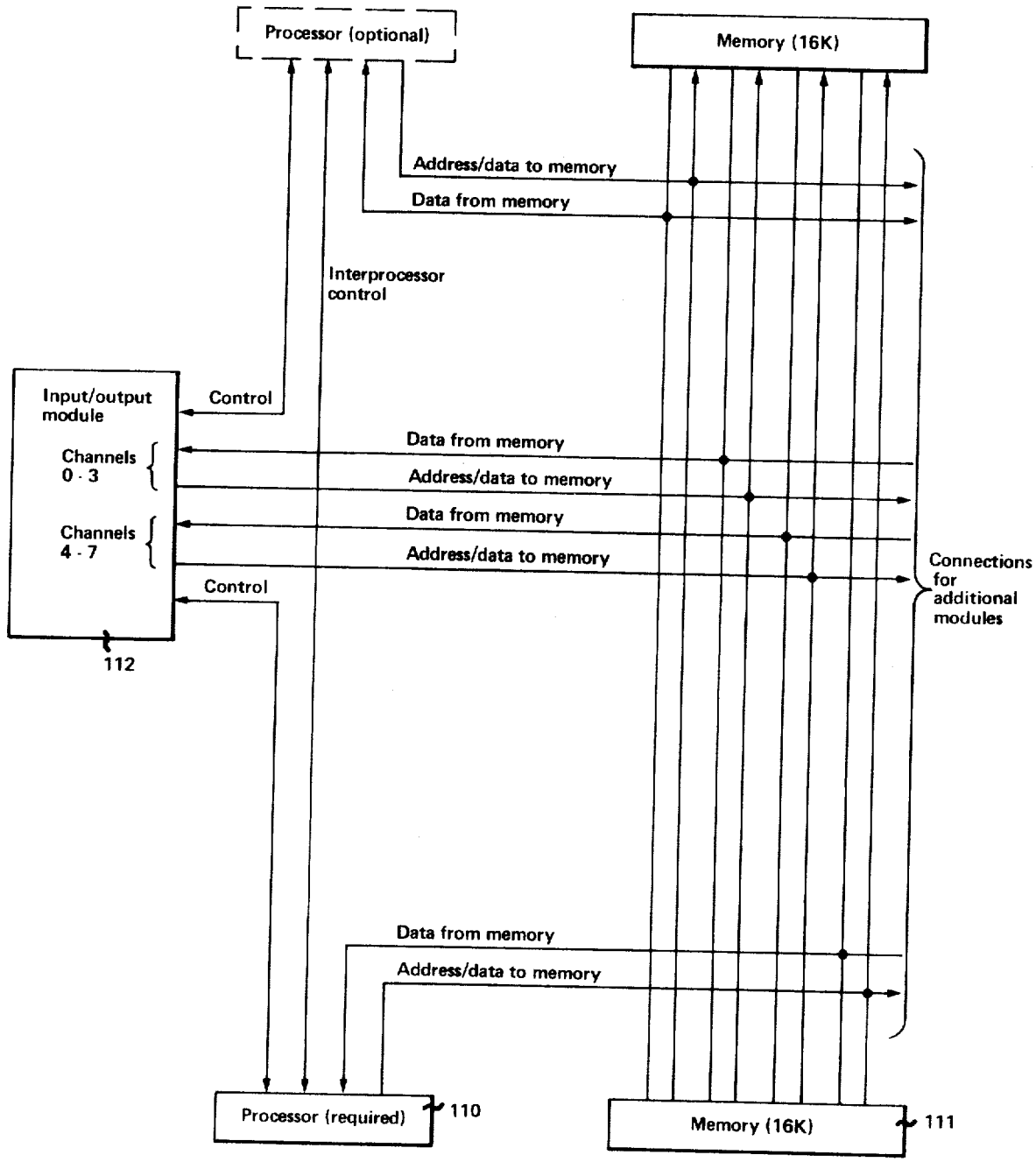
FIG. 10 is a block diagram of the digital computer in FIG. 1.
Figure 11:
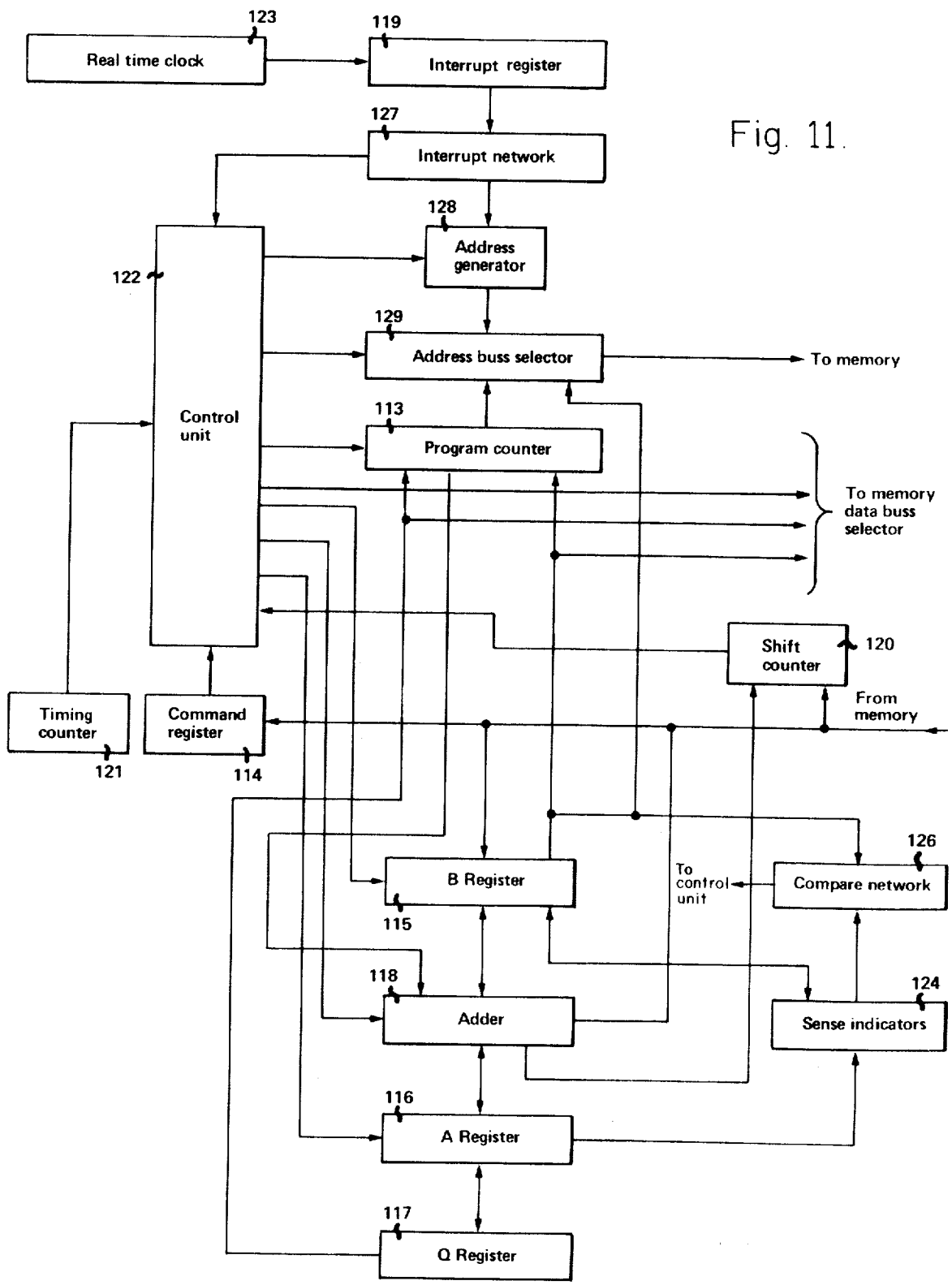
FIG. 11 is a block diagram of the processor of the digital computer of FIG. 10.

The computer shown in FIG. 10 is a Hughes Aircraft Company high speed, general purpose, digital computer system model HM-4118 which can communicate with all parts of a real time system. A minimum computer system consists of one arithmetic-logic processor 110, one module of core memory 111, and four buffered input/output channels 112. The system can be expanded to 16,384 words of core memory through the expansion of the memory module in increments of 4,096, and to 131,072 words through the addition of seven other fully expanded memory modules. The system can also be expanded to a maximum configuration including two processors, and eight buffered input/output channels. Each processor and input/output channel may have direct access to all memory modules. The two processors of a fully expanded system can be connected together to form a multi-processor configuration. While in the multi-processor configuration, each processor can operate with memory concurrently provided different memory modules are addressed by them. If the same memory module is addressed by both simultaneously, a prearranged priority system services one processor ahead of the other. The preassigned memory locations exist in only one memory module. The modes of operation available to the user include multi-processor operation, dual computer with common memory, or dual or single operation with no common memory. However, for the present invention, one processor and one input/output channel is adequate with one or more memory modules and other input/output channels as required to meet other mission objectives.

The processor 110 is the program control unit of the computer system. It receives data words and instructions from the memory, executes the instructions, performs arithmetic and logic operations on the data, and sends the data to the memory for storage. System control of the processor is exercised with interrupt signals sent from the peripheral equipment via the buffered I/O to the processor to initiate program branching. The processor controls the peripheral equipment with external-function command words. The execution of an external function instruction causes a coded command word to be transmitted from the memory to the selected peripheral device where the word is decoded and the specified function performed. The following is a summary of the computer operational characteristics.

| | | |
|---|---|---|
| | Operation | Parallel arithmetic |
| | Logic | Synchronous, 4 MHz clock |
| | Word Length | 18 bits |
| | Instructions | 60 |
| General Characteristics | Memory | 18-bit word modules, 1 $\mu s$ cycle time; maximum capacity 131,072 words |

|  |  |  |
| --- | --- | --- |
|  |  | —Continued |
|  | Input/Output | Parallel transfers over up to 8 channels of 2,000,000 words/second total |
|  | Number Representation | Sign and absolute magnitude |
|  | Arithmetic Organization | All computation assumes fixed-point binary arithmetic |
| Instruction Operation Times | Add, Subtract | 2 µs |
|  | Double Precision Add | 3.25 or 3.5 µs |
|  | Multiply | 3.5 µs |
|  | Divide | 6.25 µs |
|  | Square Root | 9 µs |
|  | Gray Code Conversion | 6 µs |
| Real-time Control | Elapsed Time Clock | Over 2 minutes (1 ms resolution decreasing time) |
|  | Time of Day Clock | Over 4772 hours in 2 consecutive memory cells (1-ms resolution increasing time) |
|  | Sense Swtiches | 10 |
|  | Indicators | 10 general purpose (7 have pre-assigned functions) plus 3 Special overflow, compare high, compare low) |
|  | Memory Protect | Memory protected on any AC line transient, automatic recovery to cell zero |
| Addressing Features | Type of Address | Single address, direct or relative addressing with or without index and/or indirect addressing |
|  | Index Registers | 48 (4 sets of 12) |
|  | Indirect Addressing | Yes |

The input/output module 112 provides interface control of data input/output operations between a variety of peripheral devices and the computer. For real-time data processing applications, data input to the computer may be received from a wide range of peripheral devices such as radar, digital data links, and analog-to-digital equipment. Data output may be transmitted to a variety of devices such as displays, consoles, and data links. For normal data processing applications, devices such as a magnetic tape unit, a line printer, a card reader, a card punch, and a disc file may be used for input/output operations and secondary storage. The input/output module provides interface control of data input/output operations between the peripheral equipment and the computer, consists of one or two identical sets of bidirectional, 4-channel buffers. These buffers, designated as buffer A and buffer B, are identical and independent of each other. Each buffer contains control logic for input/output data and provides routing for address and data lines between the peripheral equipment and the computer memory.

Each channel carries two kinds of information flow between the computer and the peripheral equipment; incoming data, sent through 18 input lines, and outgoing data sent through 18 output lines. These same lines are time-shared for the transfer of control information; the output lines carry I/O commands to the peripheral equipment, and the input lines carry status information to the computer. Each channel has 17 address lines that identify the memory locations in the computer to be used for the input/output operations. There are control lines provided for interrupt, data requests, data acknowledge, and external function.

Each buffered input/output (I/O) channel operation is a control loop that transmits signals between the peripheral equipment and the computer. The computer or the peripheral equipment perform the specified function and the computer transmits a control signal to terminate the operation.

The exchange of data between the computer and the peripheral equipment takes place over data lines. Input data is received from input data lines, and outgoing data is transmitted over output data lines. Address lines are provided for selecting the memory address of input or output data for each channel.

An input data transfer operation transfers one word of data from a peripheral device through the buffered I/O to a specified address in the computer memory. To accomplish the operation, the peripheral device places a data word on the input data lines and a memory address on the address lines, and activates the input request line. The buffer terminates the input data transfer operation by sending a data acknowledge signal to the peripheral device.

An output data transfer operation transfers one word of data from the computer memory through the buffered I/O on the output data lines to a peripheral device. This type of output data transfer is initiated by a peripheral device when it places a memory address on the address lines and activates the output request line. The output data transfer operation is terminated when the peripheral device receives a data acknowledge signal from the buffer indicating that the output data lines contain valid information.

To store a program, a peripheral device initiates a program-load operation by activating both a program load request line and an input request line to the buffered I/O. Functionally, the program load and the input data transfer operations are identical except that program load can be performed while buffer lockout has been established in the buffer. Each channel has provisions for a program load request line.

A channel interrupt operation transfers one word from a peripheral device to memory, interrupts the normal computer program sequence, and signals the peripheral device to inhibit further interrupt requests until the program is ready for the next interrupt operation. The peripheral device initiates an interrupt word transfer by setting the interrupt request line after it has placed an address on the address lines and an interrupt word on the input data lines. After sampling the input data lines, the computer terminates the interrupt word transfer by sending a data acknowledge signal to the peripheral device, setting an interrupt indicator in the processor, and resetting an interrupt enable line to the device. When execution of an interrupt subroutine for the device has been completed, the computer terminates the channel interrupt operation by setting the interrupt enable line. This line represents computer program readiness for interrupts and does not inhibit interrupt word transfers if requested. Use of the line to inhibit interrupt requests is a function of the peripheral device.

An external-function operation is the means of processor communication through the buffered I/O with peripheral equipment. This operation is initiated by the computer program with an external function instruction. This instruction causes the transfer of one word from computer memory through the buffered I/O on the output data lines to a peripheral device. The buffer notifies the peripheral device of the external function operation with an acknowledge signal. Normally, the output communication is a control word which instructs a peripheral device to perform an operation.

The functional units within the processor 110 shown in block diagram in FIG. 11 are as follows:

Program Counter 113 — The Program Counter 113 is an 18-bit counter holding the address of the next instruction of the program to be executed. The Program Counter is incremented by one after an instruction is fetched from memory, except for skip instructions when it is incremented by two. For transfer instructions, the contents of the Program Counter are changed to the effective address of the instruction. At the start of a double precision add (DPA) instruction the contents of the B register are transferred to the Program Counter for incrementing by one to gain access to the second part of the DPA operand. The Program Counter also provides the base for the operand address when the relative addressing option is employed. The Program Counter has a range of 131,072 words.

Command Register 114 — The Command 114 register is an 8-bit holding register for the instruction and augmentor codes of the instruction currently being executed. These instructions and augmentor codes are decoded and establish the proper logic controls to perform the specified operation.

Buffer Register 115 — The 18-bit Buffer Register 115 is primarily a buffer register for temporary storage of data transferred to and from memory. When the contents of index registers or clock words are modified, their new values are stored in the B register pending return storage in memory. The B register contains the effective address for all addressing operations and functions as a buffer between the memory and the other arithmetic ciruits for instructions requiring an operand. The B register manipulates data for execution of some of the arithmetic instructions. A complement control is provided for gating the B register when a subtraction is to occur.

Accumulator Register 116 — The A register is used for execution of all arithmetic instructions (with the exception of the right rotate Q register (RRQ) instruction) and for the execution of the PIA and PAI instructions. The A register may hold an augend, minuend, an operand to be compared (either logically or algebraically) to the contents of a memory location, a multiplier, or the most significant bits of a dividend. At the conclusion of an arithmetic operation, it may hold a sum, a difference, a quotient, the most significant bits of a product, or the result of a square root operation. In general, the contents of the A register must be interpreted in terms of the program operation which has just been performed or is about to be performed.

Quotient Register 117 — The Q register functions as an extension of the A register for those instructions which require words of a length greater than 18 bits. These arithmetic operations are the DPA, MLY, DIV, and SQR instructions. The Q register is also connected as a shift register and may be used by itself or in conjunction with the A register during shift operations. During shift operations, the contents of the Q register, A register, or both are shifted at a rate of one bit per clock pulse (0.25 $\mu$s) for the number of bits specified by the instructions. The input data supplied to the Q register is from the A register or the adder. Output data from the Q register is sent to the B register, A register, or memory via the interrupt and addressing circuits. Circuits are also provided for use of the Q register during console input/output operations.

Adder Network 118 — The Adder network is a full 18-bit parallel, binary adder. The network adds the selected input data to the B register data. The Adder is required during arithmetic operations, during relative addressing and indexed operations, and during updating the Program Counter, clock words, and index registers. The Adder network includes the various controls and matrices used to accomplish the required operations. Included in the Adder are the sum and carry networks. A complete 18-bit addition is performed in one clock time (0.25 microsecond).

Interrupt Register 119 — The Interrupt Register 119 is an 18-bit register which controls the interrupt operation. This interrupt function occurs whenever an outside source of data desires to change the normal program sequence.

Shift Counter 120 — The Shift Counter 120 has three major functions. In shift operations it counts down the number of places to be shifted. Its initial value is obtained from the K field in a shift instruction. In multiply, divide, square root, and convert grey code operations it is used to count the number of iterations involved. During address modification it stores the R-field of the instruction.

Timing Counter 121 — The Timing Counter is a 4-bit ring-type counter whose outputs control timing of all operations in the computer. The normal count sequence is advanced to the next count at each clock pulse. However, the timing counter can enter a null state before recycling when new memory data is not available. For some arithmetic operations the timing counter will deviate from the regular count sequence.

Control Unit 122 — The Control Unit decodes instructions and sequences the operations necessary to carry out each instruction command. A series of microcommands are generated which direct the transfer between registers, memory access, and other fundamental tasks to complete the execution of each instruction. This Control Unit includes a 4-bit register (level counter) that identifies and specifies the type of word being fetched or stored in memory. The outputs of the "level counter" establish initial logic conditions to perform an instruction or complete an operation cycle.

Real Time Clock 123 — The Real Time Clock provides a means for programming the computer system through use of an interrupt instruction for operation with respect to real time.

Sense Indicators 124 — The Sense Indicators comprise a group of 13 flip-flops which indcate the results of previous operations and the current status of the processor. As such, the contents of the Sense Indicators can provide a means of program branch control. When a flip-flop is set, the condition is detected by an appropriate branch instruction. When the flip-flop is reset, the branch instruction is ineffective in branching the program routine being executed. The functions of the Sense Indicators are reflected in the following table.

SENSE INDICATOR FUNCTIONS

| Indicator | Function |
|---|---|
| Flag | Show the result of comparison instructions as follows: |
| FL | FL  FH  Comparison<br>0   1   High<br>1   0   Low |
| FH | 1   1   Equal |
| Sense Indicators | Serve as program flags or branch controls |
| F 1 | Indicates the processing of an interrupt and locks out further interrupt processing. |
| F 2 | Indicates an illegal divisor, an illegal radicand during a Square Root operation, or indicates the parity of bits shifted during a Right Rotate Both instruction. |
| F 3 | Indicates that a console device is not being used. When F3 is not lit, a console input/output operation is in progress. |
| F 4 | Indicates parity error during console input/output operations. |
| F 5 | Indicate the designated index register bank (0 through 3) as follows: |
| F 6 | F5  F6  Bank<br>0   0   0<br>0   1   1<br>1   0   2<br>1   1   3 |
| F 7 | Indicates that this processor has executive control of computer operations in a dual-processor system. Always lit in a single-processor computer. |
| F 8 | Programmer controlled. |
| F 9 | Programmer controlled. |
| F 10 | Programmer controlled. |
| Overflow FV | Indicates that an overflow occurred during the execution of an arithmetic instruction. |

In addition to the assigned functions, four instructions affect the states of the sense indicators. The reset indicators (REI) instruction resets those bits of the sense indicators specified by the N-field of the instruction word. The REI instruction affects, F 1, F 2, F 4 through F 6, F 8 through F 10, and F 7 in a multiprocessor mode. The set indicators (SEI) instruction sets the bits of the sense indicators specified by the N-field of the instruction word. The SEI instruction affects the same flip-flops as the REI instruction. The place accumulator in indicators (PAI) instruction places the least significant bits of the A register in the sense indicators. The PAI instruction controls all sense indicators except F 1, F 3, and F 7. Indicators F 1 through F 10 may be sensed by the skip on indicators (SKI) instruction. All thirteen indicators may be stored in the accumulator by the place indicators in accumulator (PIA) instruction. The transfer on overflow (TOF) instruction tests FV, and resets it if FV has been set by a previous arithmetic operation. A master clear operation will reset FV, F 2, F 4 through F 6, F 8 through F 10 and F 7 (in a Multiprocessor mode). The master clear operation sets F 1, and F 3 and does not affect FL and FH. The processor also is equipped with a group of 10 sense switches which control program branches for manual operator control.

The configuration of these switches may be sensed by the skip on switches (SKW) instruction.

Compare Network 126 — The Compare Network permits the state of sense indicators and switches to be determined in response to an instruction "Skip on Indicators" (SKI). If indicators specified by the instruction in the buffer register 115 are on (1), one instruction is skipped. Otherwise the next instruction in sequence is taken, thus permitting a conditional branch. Set Indicator (SEI) and Reset Indicator (REI) instructions permit the indicators to be set as required. Place Indicators in Accumulator (PAI) and Place Accumulator in Indicators (PAI are further instructions which enable the programmer to use the sense indicators referred to hereinbefore as "flags" in the flow chart.

Interrupt Network 127 — The Interrupt Network provides the logic and control functions for priority interrupt. The interrupt register 119 provides an indicator for each of eighteen interrupt conditions. Each indicator is set when the corresponding condition is detected and remains set until the normal program sequence is interrupted for that condition. If more than one indicator is on, the one with highest priority will be serviced first. When the normal program sequence is interrupted, a lockout indicator (a sense indicator) is set to prevent further interruption. A Reset Indicator (REI) resets the lockout indicator after the interrupting sequence is completed.

Address Buss Selector 129 — The Address Buss Selector 129 is an AND/OR network which selects the address from the program counter or the operand address as generated in the B register or the interrupt network 127 in response to a control signal provided by the control unit 122.

Address Generator 128 — The Address Generator cooperates with the interrupt network to generate an address in a manner similar to the program counter 113 and buffer register 115 with the generate addresses used through an Address Buss Selector 129 for absolute addressing, relative addressing and indirect addressing. If absolute addressing is specified, the primary address is the value specified by a particular field (Y) of the instruction plus the content of an index register specified by another field (R) of the instruction, if any is specified. If relative address is specified by the R field of the instruction, the primary address is equal to the sum of the program counter 113 plus the number specified by the Y field. Unless indirect addressing is specified by the R field, the effective address is the primary address. When indirect addressing is specified, the effective address is obtained from the word in memory specified by the primary address. If the operation code of the instruction so specifies, that effective address is modified by the contents of a predetermined index register. All the index registers and necessary logic networks for addressing are contained in the memory modules.

Processor operation is initiated when instructions, stored in sequential locations in memory, are accessed. The memory location of an instruction to be accessed is contained in the Program Counter. The contents of the Program Counter are incremented by one after each instruction access from memory, except when the instruction is a transfer. When a transfer instruction is executed, the next instruction may be accessed from any designated memory location. If a skip operation is executed, the program counter is incremented a second time when skip conditions are met. The transfer and skip operations may be generated by branch controls such as arithmetic Overflow and Divide Check.

An additional facility provided in the processor for producing program branches is the interrupt function. When interrupts are activated by either internal or external sources via the register 119, the normal program sequencing is inhibited. When an interrupt occurs, the contents of the Program Counter are stored temporarily and the program branches to the preassigned interrupt cell associated with the source of the interrupt.

Attached as Appendix A is a listing of a source program for the exemplary computer just described to implement the flow chart of FIGS. 5–8. All of the instructions of the HM-4118 computer system, from which the instructions in the source program were selected, are described in Appendix B. The source program follows the flow chart and is therefore self explanatory, i.e., there is a correspondence between the flow chart and the program written in a recognized programming language for an existing computer. That source program can be entered into the HM-4118 computer system with an assembly program to obtain an object program. The manner in which that is done is described in an Appendix C titled Assembly Program.

What has been described is a radar system for tracking a target with a transmit frequency, F, and pulse repetition frequency, (PRF), automatically selected for optimum visibility in both range and doppler shift (radial velocity) for a given target at a range and radial velocity predicted in a conventional manner on the basis of target data obtained on previous tracking dwells. The frequency, F, is selected from a number (32) of available frequencies, as described hereinbefore, on the basis of clear channel data. The transmit frequency selected is generated by mixing in the exciter described with reference to FIG. 3 a 1st local oscillator signal gated out as described with reference to FIG. 4. The pulse repetition rate selected in the manner described is then used in the radar synchronizer 17 referred to with reference to FIG. 1.

The radar synchronizer controls the 0.2 $\mu$s gate pulse applied to the gate 27 to produce a short burst expanded and gated for 31 $\mu$s by the gate 29. The radar synchronizer produces both the 0.2 $\mu$s and the 31 $\mu$s gate to time the radar transmissions at the selected PRF. In addition, the radar synchronizer controls the receiver and transmitter through duplexers, again in a conventional manner. It also provides timing for the signal processor 14. Collectively, the radar data buffer 15, antenna phase computer 18 and radar synchronizer 17 function as a radar control unit which responds to commands from the computer 16 for track dwells as well as search dwells and for verify dwells when a new target is to be acquired after a search dwell. A particular radar control unit will now be described to complete a description of a preferred environment for the present invention. However, this particular control unit is not to be construed as a limitation on the use of the present invention.

As noted hereinbefore, each antenna array is able to fire a beam at any azimuth angle within its sector of operation. The angle of firing can be controlled by controlling the phase of signals fed to dipole elements (slots) of the array. This is referred to as beam steering and has been widely discussed in the literature; see Introduction to Radar Systems, McGraw Hill (1962) by Merrill I. Skolnik at page 298.

In the preferred environment, the digital computer will cause the arrays to fire successive search beams (dwells) at different azimuth to cover the full 360°; e.g., beams at 92 different azimuth positions within the 360°. Interleaved in time with the "search" beams are "verify" and "track" beams. As will be discussed hereinafter, the digital computer operates in accordance with a stored program which determines priorites and computes the parameters of each beam to be fired. A "beam" is comprised of multiple "dwells" with each dwell including many pulses at the designated PRF. Therefore, a dwell refers to a sequence of pulses fired at a given azimuth and elevation, at a given frequency, F, and at a given pulse repetition frequency, (PRF). For tracking, each beam consists of two dwells, and each dwell consists of 60 pulses at the PRF and frequency determined in accordance with this invention to yield maximum visibility in range and doppler. In the search mode, a beam is comprised of three dwells, each dwell at a predetermined PRF. The different PRF's are selected for each dwell to cover blind zones of one dwell with pulses from at least one other dwell.

The digital computer operates in conjunction with the radar control unit to optimumly allocate the time between search and track functions, and more particularly between tracking different targets while searching for new targets. The digital computer develops radar control commands which define beam parameters and which are supplied to the radar control unit to control the characteristics of the beam fired thereby. The digital computer subsystem develops the radar control commands in response to beam return reports supplied thereto from the signal processor.

In response to a radar control command, the radar control unit controls beam steering and antenna switching. The beam steering and antenna switching functions select which of the arrays is to be used and further controls the angle at which the array is to be used.

The radar control unit additionally controls the exciter 11 which provides coded drive waveforms to the transmitter 12 and local oscillator signals to the receiver 13. The exciter in turn supplies a control signal to the transmitter which applies a signal of appropriate frequency, duration, etc., to the selected array through antenna switching unit 19. The echo beam from the target is thereafter supplied by the selected array to the receiver 13 which in turn supplies the information, in analog form, to the signal processor 14. The signal processor converts the applied analog information to digital form and then operates upon it to select the desired signal information out of the noise and clutter. The operation of the signal processor is in part determined by control signals provided from the radar control unit in response to the radar control command supplied by the digital computer. The signal processor develops information which enables the radar data buffer to assemble a beam return report which is subsequently supplied to the digital computer system.

The receiver 13 is preferably of the coherent double-conversion type utilizing a first IF stage at a high RF and appropriage filtering to eliminate noise and other interference at the image frequency. After preamplification, energy applied to the receiver is coupled into a first converter where the L-band signals are converted to a first IF frequency, (288 MHz). After amplification and filtering, the first IF signals are sent to both the clear channel sensor as described with reference to FIG. 2a and a second converter. In the second converter, the signals are heterodyned to 32 MHz. This latter signal is then preferably applied to a pulse compression line filter to improve signal-to-noise ratio. The output of the receiver to the signal processor is a pair of MTI bipolar inphase (I) and quadrature (Q) video signals. Suitable receiver designs are discussed in Chapter 5 of the aforementioned "Radar Handbook."

The exciter 11 provides the transmitter drive waveforms and clock reference signals as well as the local oscillator signals for the receiver, thus providing fully coherent operation as noted hereinbefore.

Figure 12:
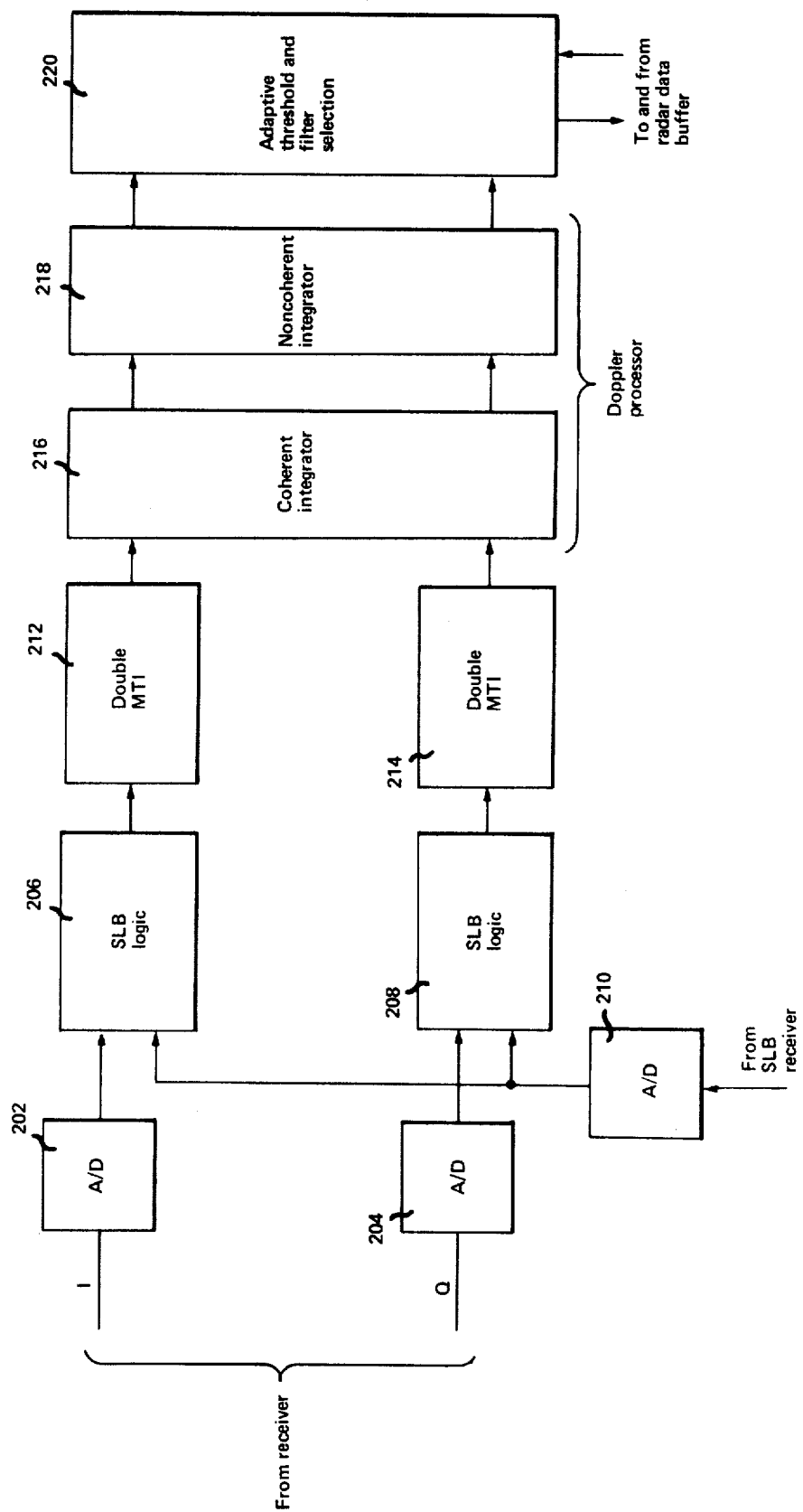
FIG. 12 is a block diagram of the signal processor utilized in the radar system of FIG. 1.

The output of the receiver is coupled to the previously mentioned signal processor 14 shown in greater detail in FIG. 12. The signal processor additionally receives information from a sidelobe receiver (not shown) which is responsive to signal energy received by four sidelobe antennas (also not shown). The sidelobe antennas are utilized for sidelobe blanking, as will be discussed hereinafter in connection with the description of the signal processor, although other sidelobe blanking techniques may be used. Each sidelobe blanking antenna preferably comprises a horizontal halfwave dipole in front of a ground plane facing in the direction of an associated one of the array antennas. Since the sidelobe antenna is used only on receive and blanks only the azimuth sidelobes, it requires very little gain. Each of the four sidelobe antennas is located immediately adjacent to one of the four primary radar antennas. The sidelobe receiver is preferably designed quite similarly to the primary radar receiver.

The signal processor will now be described with reference to FIG. 12. It includes the clear channel sensor described hereinbefore with reference to FIG. 2a and a pair of analog-to-digital converters 202 and 204 which quantize the analog phase detected video returns I and Q into digital words (10 bits + sign). It is pointed out that this digital form is maintained throughout the signal processor, the advantage being that once the information is converted to digital form, stringent stability requirements no longer apply, since data need only be time coherent to the extent of the range resolution cell. The converters 202 and 204 convert the respective inphase (I) and quadrature (Q) input signals to digital form with a dynamic range of 50 dB at a 4 MHz clock rate.

Subsequent to conversion, the inphase and quadrature digital signals are respectively applied to sidelobe blanking (SLB) logic circuits 206 and 208. The output of the previously mentioned sidelobe blanking receiver is applied to the SLB logic circuits 206 and 208 via an analog-to-digital converter 210. The blanking logic circuits 206 and 208 function to compare a sidelobe video signal with that of the main video signal from the receiver 13. Noise effects will appear in both the sidelobe and main video signals, and can therefore be eliminated by blanking the main video signal when the ratio of the sidelobe signal to the main video signal exceeds a given threshold. Consequently, the function of the blanking circuits 206 and 208 is to compare the ratio of the sidelobe and main video signals, and to blank the main video signal when the ratio therebetween exceeds a predetermined threshold.

The digital output signals from the SLB logic circuits 206 and 208 are applied to digital, double MTI cancellors 212 and 214, respectively, to provide "whitening" of the signals. These elements will be discussed in greater detail hereinafter in connection with FIG. 13. Suffice it to say at this time that the cancellors function to "whiten" the spectrum and reduce the dynamic range by cancelling main lobe clutter. The outputs of the cancellors 212 and 214 are applied to a doppler processor which provides further signal to clutter enhancement and signal-to-noise improvement. The doppler processor is comprised of a coherent integrator 216 including a bank of 13 digital doppler filters and a noncoherent integrator 218 which performs up to four summations. The doppler processor will be discussed in greater detail in connection with FIG. 14.

The output of the doppler processor is applied to an adaptive threshold and filter selection network 220. Briefly, the function of the network 220 is to compare each of the thirteen digital signals applied thereto from the doppler processor against thirteen digital threshold values supplied to the network 220 by computer 16 via the radar data buffer. The network 220 indicates those of the thirteen digital inputs that exceed their corresponding threshold value and, in addition, which of the thirteen inputs is largest. This data is assembled by the radar data buffer to form a target report in a form to be described more fully hereinafter.

Figure 13:
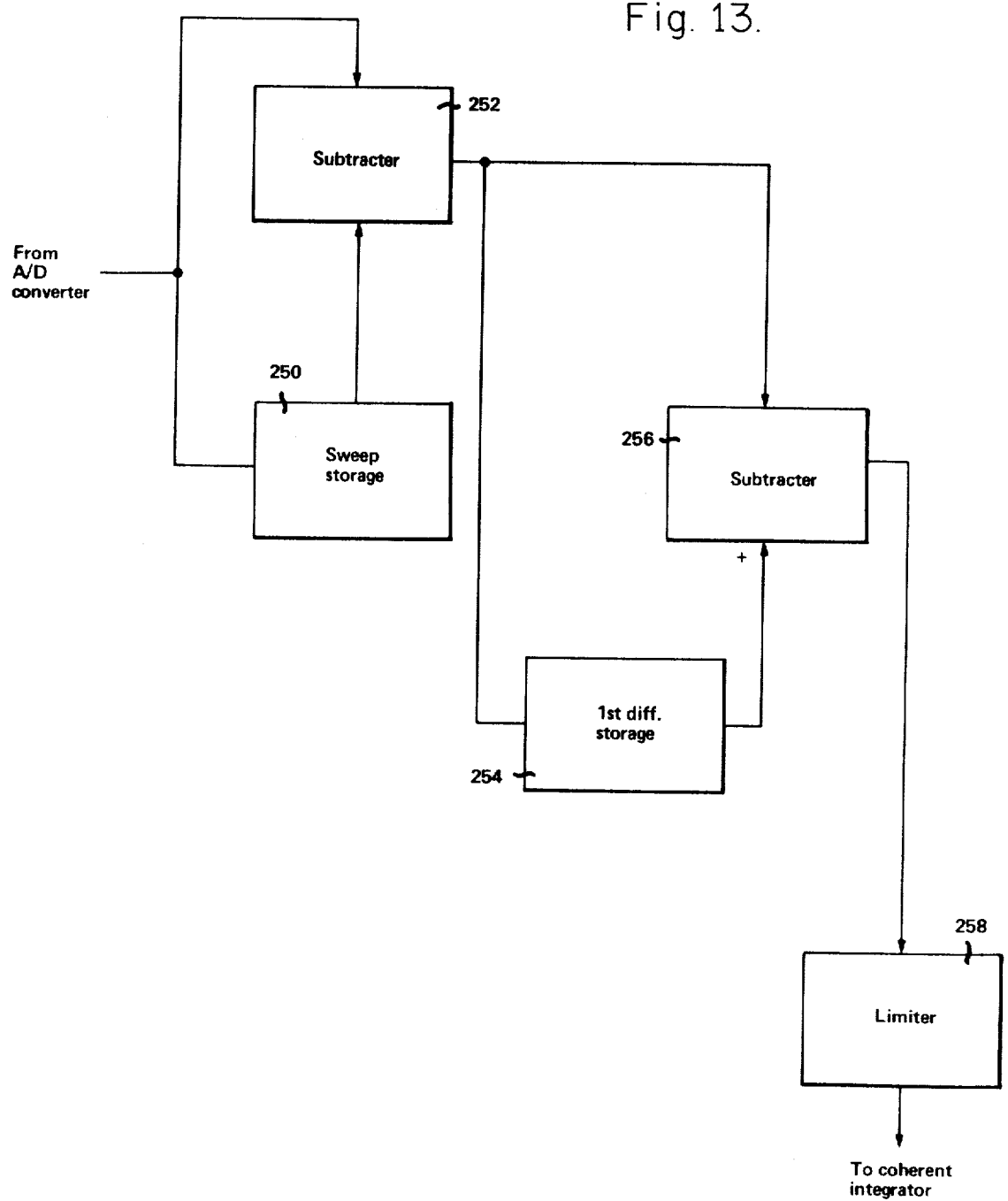
FIG. 13 is a block diagram of a digital double MTI processor utilized in the signal processor of FIG. 12.

Attention is now directed to FIG. 13 which illustrates the details of one of the double MTI cancellors 212 or 214, previously discussed in connection with FIG. 12. Each double MTI cancellor solves the equation $(A_n-B_n) - (B_n-C_n)$, where A, B and C are correlated returns during successive range sweeps ($n$ is the corresponding range cell within a range sweep indicating correlation). In order to solve the foregoing equation, storage devices are required to accumulate data from previous range sweeps. Since access to the parallel amplitude word is required only serially, shift registers are preferably used for storage.

The input to the double MTI cancellor shown in FIG. 13 is an 11 bit word consisting of 10 amplitude bits plus a sign bit. The operation of the double cancellation process is as follows. The sequential range cell data words from sweep A are clocked through a first sequential shift register memory 250 at a rate such at $A_1$ (range cell 1, transmission A) is at the output of the memory at the same time $B_1$ data is available at the input. The difference $A_n-B_n$ is formed at the output of subtracter 252 and shifted through a second memory 254, while the $B_n$ data is being shifted through the first memory 250 and subtracted from the $C_n$ data, providing the difference $B_n-C_n$ at the output of the first subtracter 252 to be subtracted in 256 from the difference $A_n-B_n$ being shifted through the second memory 254. The double cancelled MTI output is limited to 8 bits plus sign by a limiter 258. Limiting is desirable since a large dynamic range is not required after clutter cancellation.

Figure 14:
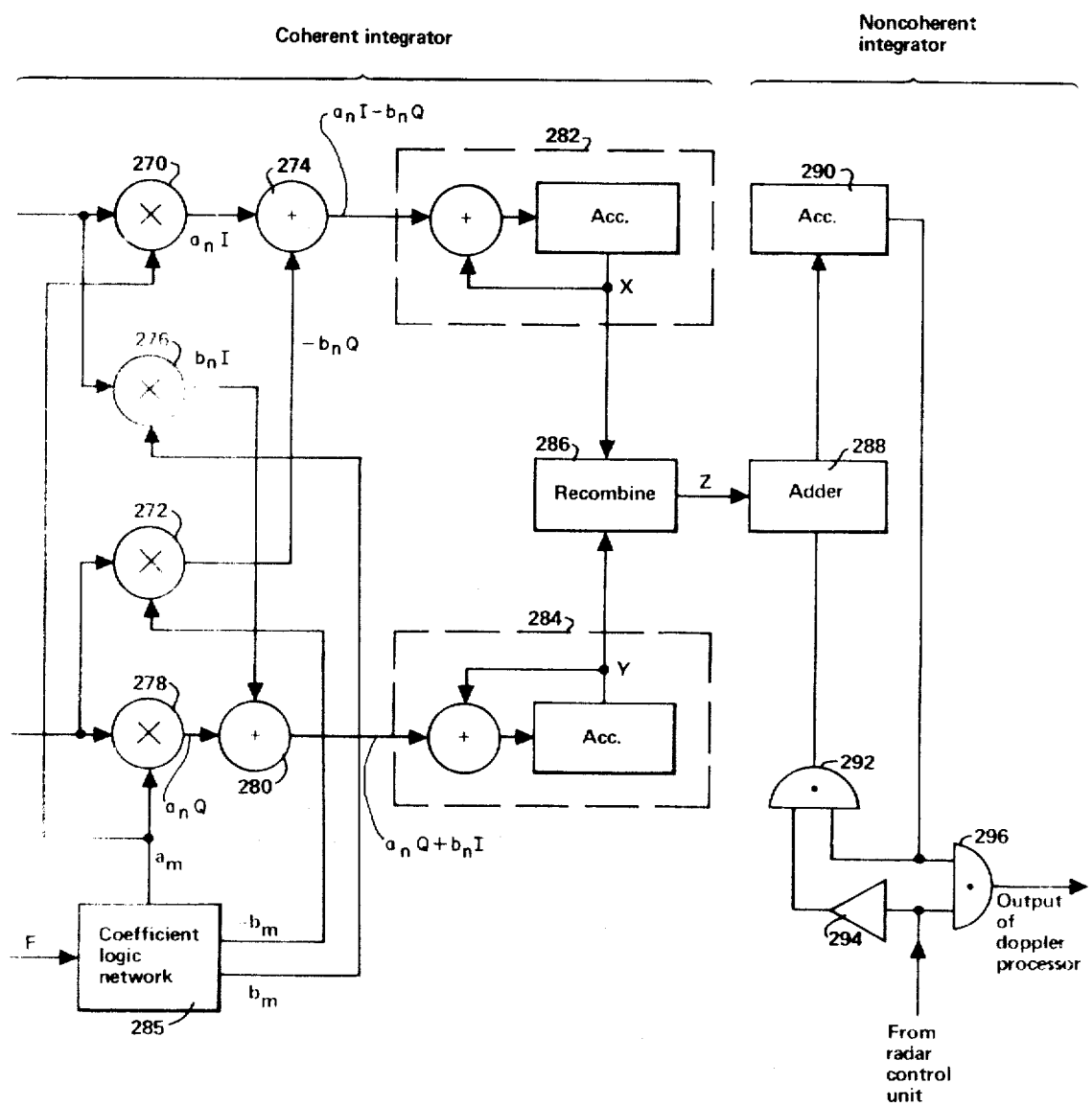
FIG. 14 is a block diagram of a doppler processor including the coherent integrator and noncoherent integrator utilized in the signal processor of FIG. 12.

Attention is now directed to FIG. 14 which illustrates more detailed block diagram of the doppler processor mentioned in FIG. 13 as including a digital coherent integrator 216 and noncoherent integrator 218. The function of the coherent and noncoherent integrators 216 and 218 is of course to isolate the doppler information associated with moving targets.

The coherent integrator 216 shown in FIG. 14 is comprised of a bank of complex digital filters each of which is supplied with the inphase and quadrature digital outputs of the double MTI cancellors 212 and 214, respectively. The filters of the coherent integrator 216 are respectively centered at N (PRF)/16, where N is an integer, and each filter has a bandwidth of PRF/16. It then follows that the coherent integrator 216 would be comprised of 16 bandpass filters. However, only the center 14 of the 16 filters need be implemented since the edge filters are not useful because they would yeild a relatively low signal-to-noise (S/N) enhancement ratio because of the main lobe clutter and low MTI gain at the extremities of the PRF interval. A further one of the 14 filters, that located at the zero doppler position, can also be deleted because a ground doppler offset value $\Delta F_{GDO}$ provided by the computer as part of the radar control command is used by the receiver local oscillator to effectively always null what would be the output of that deleted filter.

Each of the thirteen complex filters uses both inphase (I) and quadrature (Q) components of the received signal and operates by multiplying each of the 5,000 successive orthogonal input samples of a given sweep (PRF interval) at a 4 MHz rate by the projected components of a rotating unit vector, $a_n$ and $b_n$ on the real and imaginary axes. The coefficients $a_n$, $b_n$ change from filter to filter and sweep to sweep. The quantity $a_n I$ developed by multiplier 270 is summed with the quantity $-b_n Q$ developed by multiplier 272 in summing network 274. Similarly, the quantity $b_n I$ developed by multiplier 276 and the quantity $a_n Q$ developed by multiplier 278 is summed by network 280. The outputs $a_n I - b_n Q$ and $a_n Q + b_n I$ constitute orthogonal components X and Y of a complex bandpass filter output. Each of these components is summed and stored in shift registers, 282 and 284, respectively, with samples of previous sweeps until the completion of 16 sweeps. In that manner, the radar signal received is filtered and integrated in each of 13 different bandpass channels to develop, when recombined into a vector signal Z in digital form, a signal proportional to the frequency content of the doppler shifted radar signal received in a particular frequency band.

After 16 sweeps, corresponding to the doppler waveform dwell, the accumulated orthogonal waveform components X and Y are recombined into a signal channel by a recombination network 286 hard-wired to form the sum Z = X+KY. The output Z represents an approximation of the signal vector which is then submitted to noncoherent integration. At this point, the filter registers in the coherent integrator 216 are cleared for the first sweep of the next waveform dwell.

Since the input signal to the filter registers in the coherent integrator has a dynamic range of 8 bits, the shift registers within the filters should be designed for a dynamic range of 12 bits in order to accommodate signal gain through the filters. While truncation of the signals by dropping least significant bits may be implemented at various stages in the doppler processor to minimize hardware, a minimum of three levels per RMS noise voltage should be maintained in order to prevent adverse effects on noise statistics. A nearly exact representation of the filter coefficients $a_n$ and $b_n$ is possible by the use of read only memories. Consequently, for each filter implementation is extremely flexible and can readily provide for a variety of filter characteristics by means of different sets of coefficients $a_n$, $b_n$. These coefficients are stored in a coefficient logic network 285 including a look-up table addressed by the sequence number of the pulse in the burst since the coefficients are dependent upon whether the pulse is the 1st, 2nd, ... or 16th in the burst sequence.

The operation of the noncoherent integrator 218 is essentially that of a summer (adder 288 and accumulated storage registers 290). Each of the thirteen register 290 in the noncoherent integrator 218 contains 5,000 range cells. In operation, the data is acquired by the noncoherent integrator from the coherent integrator 216, and added range cell by range cell to existing data which arrives via the feedback data gate 292. When the predetermined number of integrations have been performed (up to 4) as defined by the radar control unit, the radar control unit inhibits the feedback data gate 292 via the logic inverter gate 294 and enables the output data gate 296 which interfaces with the adaptive threshold circuits 220 of FIG. 12. During this time the feedback data gate yields zero output and allows entry of the first group of data pulses of the next dwell. Because of the sixteen pulse integrations performed by the coherent integrator, the operating speed of the noncoherent integrator is only 250 KHz.

Reference was previously made in connection with FIG. 12 to the radar data buffer 15 which constitutes part of the radar control unit. The radar data buffer comprises a digital memory capable of storing radar control commands supplied thereto from the digital computer 16 and beam return reports supplied thereto by the signal processor 14 for subsequent transmittal to the digital computer 16.

Figure 15A:
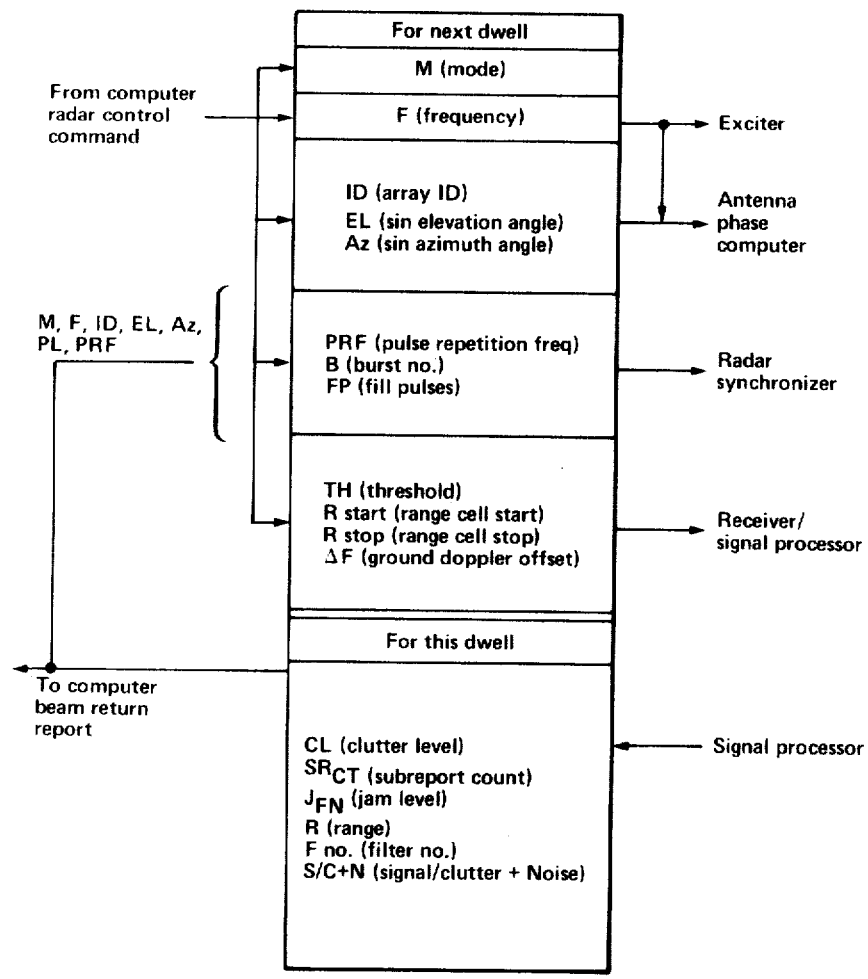
FIG. 15a is a representative diagram of a storage page in the radar data buffer of FIG. 1 listing the items of information contained within a radar control command and a beam return report.

The radar data buffer contains two "pages" of storage, each page having the capacity to store the information illustrated in FIG. 15a. Radar control commands are loaded into the two pages alternately from the digital computer. While one page is being loaded, the control command in the other page is controlling the beam being fired with that other page also acting to store the beam return report being assembled.

Considering first the radar control command, attention is called to FIGS. 15a and 15b. As noted, FIG. 15a illustrates the information contained within a typical data buffer page. FIG. 15b illustrates the format of a radar control command, assuming an 18 bit word length, characteristic of the preferred computer system embodiment to be discussed hereinafter.

As shown in FIG. 15b, a typical radar control command is comprised of six 18 bit words. In accordance with the exemplary bit allocation represented in FIG. 15b, the respective fields have the following significance:

word 0: bits 1 and 2 are used to identify a particular one of the four antenna arrays;

word 0: bits 3–5 are used to identify a beam mode, i.e., whether the beam to be fired is being used for search or track purposes, for example;

word 0: bits 6–17 are used to define the sine of the azimuth angle relative to broadside, at which a beam is to be fired;

word 1: bits 1–5 are used to define the frequency of the pulses to be fired;

word 1: bits 6–17 are used to identify the sine of the elevation angle with respect to broadside, at which a beam is to be fired;

word 2: bits 0–5 are used to define a threshold value which is used by the radar control unit to set the threshold of the adaptive threshold network 220 of FIG. 12;

word 2: bits 6–17 are used to define the value $\Delta F_{GDO}$ which represents the ground doppler offset and is effectively that value which compensates for the motion of the airborne platform relative to the ground;

word 3: bits 3–4 are used to define a burst number, which as will be seen hereinafter, is employed by the radar control unit to control the number of data pulse groups fired during each dwell;

word 3: bits 5–17 are used to define a range start cell;

word 4: bits 5–17 are used to define a range stop cell, the range start and stop cells defining a range window or time interval during which the radar is responsive to return beams;

word 5: bits 2–5 are used to define the number of fill pulses in the beam to be fired; and word 5: bits 6–17 are used to define the PRF (pulse repetition frequency) of the beam to be fired.

FIG. 15a illustrates a typical page of the radar data buffer and shows where each of the fields of the radar control command is routed. Thus, the frequency field of the radar control command (word 1, bits 1–5) is used by the exciter 11 (FIG. 1) and the antenna phase computer 18 (FIG. 1) and the signal processor 14 (FIG. 1). The array ID, the elevation, and the azimuth information fields are all routed to the antenna phase computer. The PRF, burst number, and fill-pulse fields are all routed to the radar synchronizer 18 (FIG. 1) to be discussed in greater detail hereinafter in connection with FIG. 16a. The threshold, R-start, R-stop and $\Delta F_{GDO}$ fields are all routed to the receiver 13 and signal processor 14 (FIG 1). The information so routed to the various elements of the radar system determine the characteristics of the beam to be fired and in addition set up the receiver and signal processor to enable them to interpret the return beam.

Attention is now called to FIG. 15c which illustrates the format of a typical beam return report communicated from the radar control unit to the digital computer 16 (FIG. 1). Again, the format in FIG. 15c assumes an 18 bit digital word. As shown, each report is comprised of a header portion which includes nine words and a report portion which includes two words for each target reported. That is, only one nine word header is reported back to the digital computer per beam dwell. For each target return corresponding to that dwell, and meeting certain criteria entered into the receiver and signal processor as a consequence of the radar control command, a two word subreport is assembled that is part of the beam return report.

The beam return report header includes several items of information supplied to the radar data buffer 15 by the radar control command. With respect to these items, the radar data buffer is merely returning to the computer that which the computer defined in the radar control command. These items of information and their field location in the beam return report header as shown in FIG. 15c are as follows:

word 0: bits 1–5 are used to define frequency;

word 0: bits 6–17 are used to define the sine of the azimuth angle;

word 1: bits 6–17 are used to define the sine of the elevation angle;

word 2: bits 7 and 8 are used to identify the array;

word 2: bits 15–17 are used to define the mode; and word 8: bits 6–17 are used to define PRF.

In addition to the foregoing items of information entered into the radar data buffer 15 in response to a radar control command, and thereafter merely returned to the computer as part of a beam return report, the header contains the following items of information:

word 1: bits 1–5 are used to define clutter level;

word 2: bits 9–14 are used to identify the number of subreports, i.e., the number of detected targets, which are being reported following the particular header, it being recalled that each of the subreports contains two 18-bit words;

words 3–7: bits 0–17; and word 8: bits 0–5 are used to define a 3 bit (8 level) jam number with respect to each of the 32 transmit frequencies.

Each two word subreport contains the following information fields:

word 0: bits 5–17 are used to define a range which may be ambiguous;

word 1: bits 1–4 are used to represent the signal to clutter plus noise ratio;

word 1: bits 5–13 are used to define the amplitude of the returned signal; and word 1: bits 14–17 are utilized to define the filter number of the largest return signal which of course indicates the doppler frequency, where the filters are numbered successively in order of increasing doppler frequency. As shown in FIG. 15a, this information is entered into the radar data buffer from the signal processor.

In addition to the radar control command supplied from the computer to the radar data buffer and the beam return report supplied from the radar data buffer to the computer, timing signals are also communicated therebetween. Thus, a timing signal $T_{BL}$ is communicated from the computer to the radar data buffer to signal completion of the loading of a radar control command into the buffer. On the other hand, timing signals in the form of an interrupt to the computer are provided by the radar data buffer as follows:

$T_{LPS}$ which advises the computer that the data buffer can accept new data from the computer; and $T_{DA}$ which signals the computer that data is available in the radar data buffer for communication to the computer.

These timing signals will be discussed in greater detail hereinafter with reference to FIG. 16a.

Figure 16A:
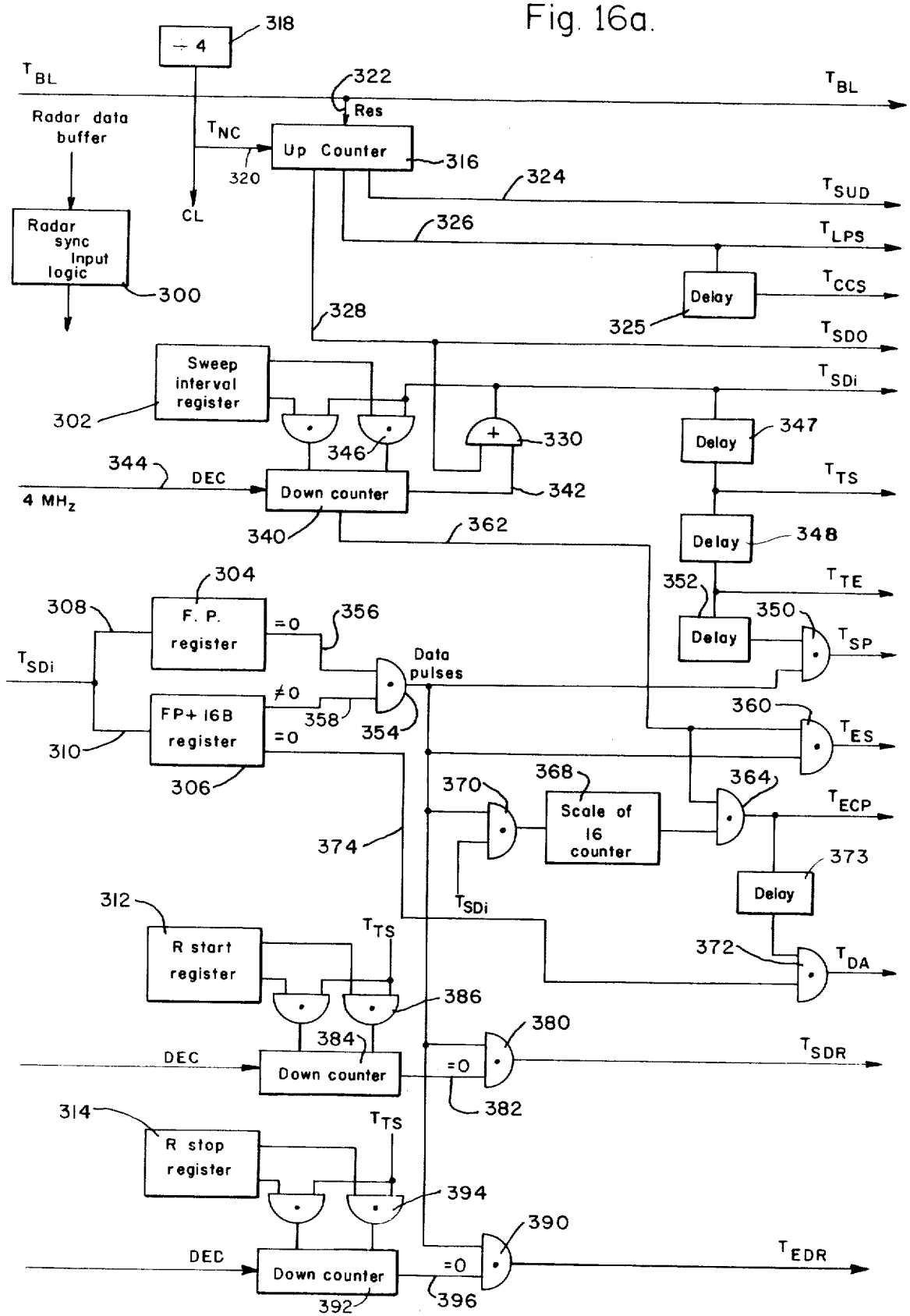
FIG. 16a is a block diagram of the radar synchronizer of FIG. 1 and showing its input and output signals.

Attention is now called to FIG. 16a which illustrates a block diagram of the radar synchronizer 17 previously referred to in connection with FIG. 1. The radar synchronizer comprises registers, counters, and simple logic circuits which operate in response to applied input information to produce output timing signals, as will be discussed in greater detail hereinafter. The items of input information applied to the radar synchronizer input logic 300 from the radar data buffer consist of the pulse repetition frequency, (PRF), burst number, B, and fill pulse number, F.P. In addition, a timing signal $T_{BL}$ generated by the computer to represent that the buffer has been loaded is also applied to the radar synchronizer 17. In response to these input signals, the radar synchronizer 17 gates out the output timing signals illustrated in FIG. 16a which are then routed throughout the system as will be discussed hereinafter. Prior to considering the various timing signals, however, attention is called to FIG. 16b which illustrates the beam and timing format of a typical search beam and a typical track beam.

In the search mode, search beams are fired from the four antenna arrays at a plurality of different azimuth angles. It has previously been assumed herein that there exists 92 azimuth positions throughout the 360° at which search beams are to be fired. The typical search beam fired at any of these 92 positions is represented in FIG. 16b and can be seen to consist of three distinct dwells. A first dwell is indicated as consisting of 77 pulses at a pulse repetition frequency of 3,125 pulses per second. The second dwell is illustrated as consisting of 74 pulses at a PRF of 2,232 pulses per second. The third dwell in the typical search beam illustrated is shown to consist of 72 pulses at a PRF of 1,562 pulses per second. Multiple PRF's are employed in the search beam in order to maximize doppler and range visibility. The use of multiple PRF's is discussed at page 129 of Introduction to Radar Systems cited hereinbefore.

Each search beam dwell consists of a number of fill pulses followed by four groups of 16 data pulses each. Fill pulses are fired prior to the data pulses in order to assure that the sme clutter pattern is seen for each data pulse. That is, in order to better enable the signal processor 14 to isolate a return pulse from the clutter, it is advantageous that all of the return pulses be superimposed on the same clutter pattern. This is assured by generating a sufficient number of fill pulses prior to the data pulses. The number of fill pulses required is dependent on the system range and the pulse repetition frequency being used and can be determined by the computer 16 by use of a simple table look-up routine. The number of fill pulses for each dwell is indicated as part of the radar control command. As shown in FIG. 16b, the higher the pulse repetition frequency, the greater the number of fill pulses required. Thus, for PRF's of 3,125, 2,232 and 1,562 pulses per second, 13, 10, and 8 fill pulses are acquired, respectively. The total duration of each of the search beam dwells is approximately 24.6 m sec, 33.2 m sec, and 46.0 m sec, respectively.

Also shown in FIG. 16b is a typical track beam consisting of two identical dwells (identical as to pulse configuration and PRF). As will be discussed hereinafter, they differ only in that they are offset from a defined azimuth angle Z so that the first track beam dwell is fired at an azimuth angle $Z - \Delta Z$ and the second track beam dwell is fired at an azimuth angle $Z + \Delta Z$. This technique is referred to as sequential lobing and is referred to on page 165 of Introduction to Radar Systems, supra. Each of the track beam dwells consists of a group of 12 fill pulses plus three groups of 16 target data pulses. The number of groups of data pulses is defined by the burst number (B) field of a radar control command and, as represented in FIG. 15b, can comprise anywhere from 1 to 4 groups in accordance with the preferred embodiments of the invention.

Attention is now called to FIG. 16c which illustrates the timing signals generated in association with the fill and data pulses of a dwell, regardless of whether the dwell is part of a search or a track beam. The timing signals and their significance are as follows:

$T_{BL}$ — As has been previously pointed out, the timing signal $T_{BL}$ is provided to the radar synchronizer 17 from the digital computer 16 to indicate that the buffer 15 has been loaded, and that the information transferred to the buffer can now be used to energize the arrays to fire a beam. $T_{BL}$ occurs only once per dwell, prior to the first fill pulse.

$T_{SUD}$ — A timing signal $T_{SUD}$ occurs in response to and shortly after the timing signal $T_{BL}$ and initiates an interval during which several operations are performed to set up for the ensuing dwell: specifically, azimuth and elevation calculations are performed in the antenna phase computer to point the beam; gate selections within the radar synchronizer are made to set up the appropriate PRF, burst number, number of fill pulses; the exciter 11 is set up in accordance with the frequency specified in the buffer; and a threshold specified by the radar control command is entered into the adaptive threshold network 220 (FIG. 12) of the signal processor 14. $T_{SUD}$ occurs only once per dwell, prior to the first fill pulse, and is coupled to the antenna phase computer 18, exciter 11, receiver 13 and signal processor 14.

$T_{LPS}$ — The timing signal $T_{LPS}$ occurs approximately 250 microseconds after the timing signal $T_{SUD}$ and is coupled to the antenna phase computer 18, exciter 11, receiver 13, and signal processor 14. In response to the timing signal $T_{LPS}$, digital phase shifters in the phased array antennas 10 are loaded and the antenna switching unit 19 is operated, all in accordance with the calculations of the antenna phase computer 18. Additionally, the buffer 15 is cleared for new data and the logic for PRF, burst number, and fill pulse number within the radar synchronizer, frequency within the exciter, and threshold within the adaptive threshold network 220 (FIG. 12), are enabled in accordance with the calculations performed during the interval initiated by the timing signal $T_{SUD}$. Approximately 100 microseconds after the generation of the timing signal $T_{LPS}$, the first fill pulse $P_{F1}$ (FIG. 16c) is generated. It will be assumed herein that the duration of each fill pulse and each data pulse is 31 microseconds. However, the rate at which these pulses are generated, i.e., the space between successive fill pulses and data pulses, is determined by the PRF specified.

$T_{CCS}$ — The timing signal $T_{CCS}$ occurs approximately 60 microseconds after the timing signal $T_{LPS}$. This signal is used to initiate the RADAR READ GATE for the clear channel sensor (FIG. 2a) in the signal processor. The $T_{SDO}$ signal described hereinafter is used to transfer the clear channel sensor data to the radar data buffer.

The aforementioned timing signals $T_{BL}$, $T_{SUD}$, $T_{LPS}$ are generated only once per dwell, prior to the first fill pulse. The following timing signals are associated with the generation of each and every pulse, regardless of whether the pulse constitutes a fill pulse or a data pulse:

$T_{SDi}$ — The timing signal $T_{SDi}$ for the first fill pulse, i.e., $T_{SD0}$ where i=o, occurs approximately 100 microseconds after the timing signal $T_{LPS}$. For all subsequent pulses, the timing signal $T_{SDi}$ occurs $[(1/PRF)-31]$ microseconds after the timing signal $T_{TE}$. The timing signal $T_{SDi}$ functions to switch the duplexer from receive to transmit, and to stop range counting.

$T_{TS}$ — Each timing signal $T_{TS}$ is generated 5 microseconds after each timing signal $T_{SDi}$ and is coupled to the exciter 11 to initiate the transmission of a pulse.

$T_R$ — Range timing signals $T_R$ are generated at quarter microsecond intervals, each interval representing 125 feet of range, beginning one quarter microsecond after the timing signal $T_{TS}$.

$T_{TE}$ — The timing signal $T_{TE}$ occurs 31 microseconds after the timing signal $T_{TS}$ and functions to end transmission and switch the duplexer from transmit to receive. $T_{TE}$ is coupled to duplexers in the antenna switching unit 19 and to the exciter 11.

The following timing signals also shown in FIG. 16c are uniquely associated with each of the data pulses.

$T_{SP}$ — The timing signal $T_{SP}$ occurs 5 microseconds after a timing signal $T_{TE}$ and is coupled to the signal processor 14 to start data collection in the coherent integrator 216 (FIG. 12).

$T_{SDR}$ — The timing signal $T_{SDR}$ occurs at a time determined by the R-start information contained within the radar control command and is coupled to the signal processor 14 to initiate range gating.

$T_{EDR}$ — The timing signal $T_{EDR}$ occurs at a time defined by the R-stop information in the radar control command and is coupled to the signal processor 14 to end the range data collection interval, i.e., to terminate range gating.

$T_{ES}$ — The timing signal $T_{ES}$ occurs [(1/PRF)-5] microseconds after the timing signal $T_{SDI}$ and is coupled to receiver 13 and signal processor 14 to define the end of a data collection interval for a pulse.

The following timing signal also shown in FIG. 16c is uniquely associated with the last data pulse in each group of sixteen data pulses:

$T_{ECP}$ — A timing signal $T_{ECP}$ occurs at the same time as the previously mentioned timing signal $T_{ES}$, but whereas $T_{ES}$ occurs for each data pulse, $T_{ECP}$ occurs only every 16th data pulse. $T_{ECP}$ is coupled to the signal processor 14 to end coherent processing and shift data from the coherent integrator 216 to the noncoherent integrator 218 and to clear the coherent integrator 216.

The following timing signal, also shown in FIG. 16c is uniquely associated with the sixteenth data pulse in the last data pulse group (B):

$T_{DA}$ — The timing signal $T_{DA}$ occurs a fixed time after $T_{ECP}$ associated with the last data pulse in a dwell. $T_{DA}$ is coupled to the signal processor 14 and the radar data buffer 15 to shift data out of the noncoherent integrator 218 to the radar data buffer and to clear the noncoherent integrator.

From the foregoing discussion of the timing signals, it should be apparent that the entire sequence of timing signals supplied by the radar synchronizer is initiated in response to the timing signal $T_{BL}$ supplied by the computer. Of course, one timing signal $T_{BL}$ is supplied by the computer for each dwell since each dwell requires that the computer supply the radar data buffer with a new radar control command. For a search beam, the timing signal $T_{SDR}$ coincides with $T_{SP}$ and the timing signal $T_{EDR}$ coincides with $T_{ES}$. For track, $T_{SDR}$ and $T_{EDR}$ are set in accordance with the R-start and R-stop fields of the radar control command.

Attention is now again specifically directed to FIG. 16a which illustrates a block diagram of the radar synchronizer 17 for generating each of the timing signals illustrated in FIG. 16c. The radar synchronizer includes the input logic circuit 300 noted hereinbefore, which is responsive to the radar control command (FIG. 15a and 15b) to load various registers contained within the radar synchronizer.

The radar synchronizer contains a sweep interval register 302 which is used to store a count representing the interval (1/PRF) between successive pulses. Register 302 is loaded by the input logic circuit 300 in response to the PRF indicated in the radar control command. The count loaded into the register 302 is preferably expressed in terms of a number of range timing signals $T_R$, i.e., in terms of ¼ microsecond intervals. By way of example, for a PRF equal to 2,500 pulses per second, 1/PRF = 400 microseconds meaning that a count of 1,600 would be stored in the sweep interval register 302.

The radar synchronizer contains a second register 304 which is loaded by the input logic circuit 300 with the number of fill pulses specified by the radar control command. A register 306 is loaded with a count equal to the total number of pulses (i.e., fill pulses plus data pulses = FP+16·B) in the dwell defined by the radar control command. Registers 304 and 306 are implemented as down counters having decrementing input terminals 308 and 310, to be discussed hereinafter.

The radar synchronizer also includes a registerr 312 which is loaded by the input logic circuit 300 with the number of the R-start cell. A register 314 is loaded with the number of the R-stop cell.

In addition to the aforementioned registers, which are loaded by the input logic circuit 300, the radar synchronizer includes an up counter 316 to count 4 MHz clock pulses supplied by a frequency divider 318 from the 16 MHz clock source (FIG. 3). The counter 316 has an incrementing input terminal 320 and a reset input terminal 322. The reset input terminal 322 is connected to receive the timing signal $T_{BL}$ from the computer. Thus, $T_{BL}$ resets the counter 316 to zero and thereafter counter 316 counts the 4 MHz clock pulses throughout the entire dwell. Output terminals of the counter 316 provide signals in response to particular counts via count decoding logic contained therein. Thus, the signal $T_{SUD}$ is provided on counter output terminal 324 a short fixed time interval after the signal $T_{BL}$. The timing signal $T_{LPS}$ is provided on output terminal 326 after an interval of 250 microseconds following the occurrence of the signal $T_{BL}$ and the timing signal $T_{CCS}$ is provided at the output of delay means 325 approximately 60 microseconds after the occurence of timing signal $T_{LPS}$. Output terminal 328 provides the signal $T_{SDO}$ 95 microseconds after the occurence of $T_{LPS}$. The timing signal $T_{SDO}$ is applied to the input of an OR gate 330 whose output is connected to provide the signal $T_{SDI}$. It will be recalled that the timing signal $T_{SDO}$ occurs prior to the first fill pulse in each dwell. Thereafter, the timing signal $T_{SDI}$ occurs prior to each of the other fill and data pulses in the dwell. All $T_{SDI}$ pulses subsequent to $T_{SDO}$ are produced by a down counter 340 on output terminal 342 connected to the input of OR gate 330. More particularly, counter 340 is a decrementing binary counter having a decrementing input terminal 344 connected to receive the 4 MHz clock from the divider 318. Counter 340 is loaded from register 302 by a bank of AND gates 346 enabled by the output of OR gate 330. Thus, upon the occurrence of any timing signal $T_{SDI}$ (including $T_{SDO}$) a binary number representing the duration of a sweep interval will be entered into the counter 340. This number will then be counted down to zero in response to 4 MHz clock pulses, at which time output terminal 342 will become true to enable OR gate 330 and produce a timing signal $T_{SDi}$ which reloads the counter 340 from the register 302.

Timing signal $T_{TS}$ is produced in response to $T_{SDi}$ after a 5 microsecond delay introduced by delay means 347. Timing signal $T_{TE}$ is produced in response to $T_{TS}$ after a 31 microsecond delay introduced by delay means 348. Timing signal $T_{SP}$ is produced by AND gate 350 only during data pulse intervals in response to $T_{TE}$ after a 5 microsecond delay introduced by delay means 352. AND gate 350 is enabled by the output of AND gate 354 only during data pulse intervals.

The register 304 is initially loaded with the number of fill pulses in a dwell and the register 306 is loaded with the total number (i.e., fill plus data) of pulses in a dwell. The number in both registers 304 and 306 are decremented in response to $T_{SDi}$. After the number in register 304 equals zero, the non-zero number in register 306 will indicate data pulse intervals. Register 304 is provided with an output terminal 356 which goes true when the number therein equals zero. Register 306 is provided with an output terminal 358 which is true for so long as the number therein is not zero. Thus, AND gate 354 will be enabled after all of the fill pulse intervals and during the data pulse intervals. As previously mentioned, the output of AND gate 354 enables AND gate 350 to generate the timing signal $T_{SP}$ during data pulse intervals. It similarly enables AND gate 360 during data pulse intervals to generate the timing signal $T_{ES}$ five microseconds prior to the end of a pulse interval as defined by down counter 340 on output terminal 362.

The signal $T_{ECP}$ occurs concurrently with the signal $T_{ES}$ but only on the sixteenth data pulse of each data pulse group. Thus, the output terminal 362 is also connected to an AND gate 364 which is enabled on every 16th data pulse by the output of counter 368 incremented by the output of an AND gate 370 in response to the timing signals $T_{SDi}$ during data pulse intervals.

The timing signal $T_{DA}$ is developed by an AND gate 372 which is enabled during the last data pulse interval of a dwell as indicated by an output terminal 374 of register 306 becoming true upon a number stored therein being counted down to zero. When enabled, gate 372 will output the signal $T_{DA}$ a fixed time delay (introduced by delay means 373) after the signal $T_{ECP}$.

The timing signal $T_{SDR}$ is developed by an AND gate 380 only during data pulse intervals as defined by the output of gate 354. Timing signal $T_{SDR}$ will be generated when the output 382 of a down counter 384 becomes true upon the content of the counter being counted down to zero in response to 4 MHz clock pulses. The counter 384 is loaded via a bank of AND gates 386 from the previously mentioned R-start register 312 during every pulse interval in response to timing signal $T_{TS}$.

Timing signal $T_{EDR}$ is generated in the same manner as timing signal $T_{SDR}$. That is, AND gate 390 is enabled during data pulse intervals by the AND gate 354. A down counter 392 is loaded from the R-stop register 314 via a bank of AND gates 394 during each pulse interval. Counter 392 provides an output pulse on terminal 396 when the count therein reaches zero. This pulse is coupled to AND gate 390 to define the timing signal $T_{EDR}$.

The antenna phase computer 18 previously referred to in connection with FIG. 1 is preferably a wired program analog or digital computer which calculates the phase shift necessary to steer a beam in elevation and azimuth. Assuming equal element spacing with equal signal amplitudes, the phase shifts required for steering in azimuth ($\Phi_{AZ}$) and elevation ($\Phi_{EL}$) are represented by the following expressions:

$$\Phi_{AZ} = 2\pi(dF/c)\sin\theta$$

$$\Phi_{EL} = 2\pi(dF/c)\sin\phi$$

where F equals transmission frequency, $d$ equals spacing between adjacent elements, $c$ equals propagation velocity of electromagnetic radiation, $\theta$ equals the azimuth angle from broadside, and $\phi$ equals the elevation angle from broadside.

The values of $\sin\theta$, $\sin\phi$, and F, which are contained in the radar control command, are supplied from the radar data buffer to the input of the antenna phase computer. The array ID number is also supplied from the radar data buffer to the antenna phase computer. Additionally, the previously mentioned timing signals $T_{SUD}$ and $T_{LPS}$ are applied to the antenna phase computer from the radar synchronizer. In turn, the antenna phase computer calculates the foregoing equations to develop 5 bit digital signals for application to phase shifters in the phase-scanned array antennas 10 to fire a beam from the appropriate array and at the designated azimuth and elevation angles from broadside. Beam steering through the use of variable phase shift elements is discussed in Introduction to Radar Systems at page 298.

APPENDIX A

THE AUTOMATIC PRF SELECTION SUBROUTINE USES AN ESTABLISHED TRACK PREDICTED RANGE AND RADIAL VELOCITY TO PICK A FREQUENCY (1225-1375) AND PRF (1562-3125) TO OPTIMIZE RANGE AND DOPPLER VISIBILITY IN TRACKING.

INPUT PARAMETERS:

THIS SUBROUTINE IS CALLED BY THE ENERGY MANAGEMENT ROUTINE WHEN IT IS TIME TO FIRE A TRACK BEAM AT AN ESTABLISHED TRACK.
THE ENERGY MANAGEMENT ROUTINE PASSES THE ADDRESS OF THE TRACK STORE ENTRY THAT CONTAINS ALL INFORMATION REQUIRED TO PROCESS THIS TRACK. THE ADDRESS IS PASSED TO THE PRF SELECT ROUTINE IN INDEX REGISTER TWO.

INDEX REGISTER ASSIGNMENTS:
N        EQU 7         "N" COUNTER FOR PRF CALCULATIONS
SCRATCH PAD TEMPORARY STORAGE ASSIGNMENTS:

SAVDAT   EQU 200B      START SAVE AREA AT LOCATION 200 OCTAL
SAVE1    EQU SAVDAT    SAVE AREA FOR JAM LEVEL
XCHNGE   EQU SAVE1+1   EXCHANGE FLAG FOR LEVEL SORT
RP       EQU           PREDICTED TRACK RANGE

APPENDIX A—Continued

```
         XCHNGE+1
DOT      EQU RT+1        PREDICTED TRACK RADIAL VELOCITY
FX       EQU DOT+1       BEST FREQUENCY FROM CLEAR CHANNEL
                           SENSING (MC)
FXC      EQU FX+1        CODED FREQUENCY FROM CLEAR CHANNEL
                           SENSING
FIRST    EQU FXC+1       FIRST TIME ON FLAG
                           0 = OFF
                           1 = ON
VISBLE   EQU FIRST+1     VISIBILITY FLAG
                           0 = GOOD
                           1 = NOT VISIBLE
PRF1U    EQU VISBLE+1    FIRST FORBIDDEN PRF UPPER BOUND
PRF1L    EQU PRF1U+1     FIRST FORBIDDEN PRF LOWER BOUND
PRFFU    EQU PRF1L+1     NTH FORBIDDEN PRF UPPER BOUND
PRFFL    EQU PRFFU+1     NTH FORBIDDEN PRF LOWER BOUND
RX       EQU PRFFL+1     CURRENT BLIND RANGE ZONE START
R1       EQU RX+1        FIRST BLIND RANGE ZONE START
PRFX     EQU R1+1        CURRENT PRF UNDER INVESTIGATION
RANGE    EQU 2           DISPLACEMENT OF RANGE WORD IN TABLE
RADVL    EQU 3           DISPLACEMENT OF VELOCITY WORD IN TABLE

ROUTINE CONSTANTS:

DR       DEC 243         BLIND RANGE DELTA
DR1      DEC 486         BLIND RANGE PRIME
DPRF     DEC 5           DELTA PRF
RDOT     DEC 14B14       MINIMUM RADIAL VELOCITY
PRFMN    DEC 264.7B15    CONSTANT FOR FIRST FORBIDDEN PRF (UPPER
                           BOUND) CALCULATION
PRFMX    DEC 323.5B15    CONSTANT FOR FIRST FORBIDDEN PRF (LOWER
                           BOUND) CALCULATION
K1562    DEC 1562        LOWEST ALLOWABLE PRF
K3125    DEC 3125        HIGHEST ALLOWABLE PRF
K81000   DEC 81000       CONSTANT FOR BLIND RANGE DETECTION
I0       DEC 0
I1       DEC 1
I2       DEC 2
I5       DEC 5
I7       DEC 7
I30      DEC 30
I31      DEC 31

ADDRESS CONSTANTS:

RTRB1    GAD TR1         ADDRESS OF TARGET REPORT BUFFER ONE
FRQCAD   GAD FRQC        ADDRESS OF FREQUENCY CODE TABLE
FRQMAD   GAD FRQM        ADDRESS OF FREQUENCY CYCLE TABLE
FRQCND   GAD FRQC+31     END OF FREQUENCY CODE TABLE

TABLE AND BUFFER AREAS:

TR1      BSS 200         RESERVE 200 WORDS FOR REPORT BUFFER 1
TR2      BSS 200         RESERVE 200 WORDS FOR REPORT BUFFER 2
TR3      BSS 200         RESERVE 200 WORDS FOR REPORT BUFFER 3
FRQC     BSS 36          RESERVE 36 WORDS FOR FREQUENCY CODE
                           TABLE
FRQM     BSS 32          RESERVE 32 WORDS FOR FREQUENCY CYCLE
                           TABLE
PRF000   CLA RANGE,2     FETCH TRACK RANGE FROM TRACK STORE TABLE
         STR RP            AND SAVE
         CLA RADVL,2     FETCH TRACK VELOCITY FROM TRACK STORE
         STR DOT           TABLE AND SAVE
         CLA RP
         CMA DR          COMPARE TRACK RANGE TO BLIND RANGE DELTA
         TRL PRF020        IF RANGE IS < OR = BLIND RANGE DELTA
         TRE PRF020        BRANCH TO NO VISIBILITY
         CLA DOT         COMPARE TRACK VELOCITY TO MINIMUM VALUE
         CMA RDOT          IF VELOCITY IS < MINIMUM
         TRL PRF020        BRANCH TO NO VISIBILITY
```

THE FOLLOWING INSTRUCTION STRING UNPACKS THE 32 JAM LEVELS THAT WERE INPUT WITH THE TARGET REPORT HEADER AND MERGESS THEM WITH THEIR RESPECTIVE FREQUENCY CODES. THE COMBINED CODES AND LEVELS ARE THEN STORED IN ORDER TO FREQUENCY CODE.

```
         INX 6,2         BUMP POINTER TO FIRST WORD OF JAM DATA
         CLA I5          SET UP COUNT-1 OF SETS PER COMPUTER WORD
         STR 3             (REGISTER 3)
                         SET UP COUNT-1 OF COMPUTER WORDS
         STR 4             (REGISTER 4)
         CLA FRQCAD      FETCH ADDRESS OF FREQUENCY CODE TABLE
         STR 5             AND SAVE FOR INDEXING (REGISTER 5)
         CLA I0          SET FREQUENCY CODE COUNTER TO FIRST CODE
         STR 6             0 THROUGH 31 (REGISTER 6)
PRF001   LDQ 0,2         LOAD Q-REGISTER WITH SIX SETS OF LEVELS
PRF002   CLA 6           FETCH FREQUENCY CODE FROM REGISTER 6
PRF004   CLA 1,4         FETCH ENTRY+1 FROM FREQUENCY CODE TABLE
         LGM I7            SAVE ONLY LAST 3 BITS AND
         STR SAVE1         STORE FOR LATER USE
         CLA 0,4         FETCH ENTRY+0 FROM FREQUENCY CODE TABLE
         LGM I7            SAVE ONLY LAST 3 BITS AND COMPARE IT
         CMA SAVE1         TO SAVED ENTRY+1
         TRH PRF006      IF ENTRY +0 > ENTRY+1, BRANCH TO EXCHANGE
PRF005   INX 1,4         BUMP POINTER TO NEXT ENTRY AND BRANCH
         TRX PRF004,2      BACK TO CHECK NEXT SET
         CLA XCHNGE      IF AFTER ANY COMPLETED PASS NO EXCHANGES
```

APPENDIX A—Continued

|  | TRZ PRF007 | WERE MADE, BRANCH TO EXIT |
|---|---|---|
|  | CLA I0 | OTHERWISE RESET THE EXCHANGE FLAG |
|  | STR XCHNGE |  |
|  | INX 30,2 | RESET INNER LOOP COUNTER AND LOOP BACK |
|  | TRX PRF003,3 | FOR ANOTHER PASS |
|  | TRU PRF007 | ALL INNER AND OUTER LOOPS COMPLETE SO BRANCH TO EXIT |
| PRF006 | CLA 0,4 | EXCHANGE ENTRY+0 AND ENTRY+1 SO THAT |
|  | LDQ 1,4 | THE LARGEST VALUE IS ALWAYS PUSHED |
|  | STR 1,4 | DOWN TO THE BOTTOM OF THE TABLE |
|  | STQ 0,4 |  |
|  | STR XCHNGE | SET EXCHANGE FLAG NON-ZERO AND |
|  | TRU PRF005 | CONTINUE |
|  | LRB 3 | MERGE CODE WITH RESPECTIVE JAM LEVEL |
|  | STR 0,5 | AND STORE IN FREQUENCY CODE TABLE |
|  | INX 1,5 | INCREMENT TABLE POINTER TO NEXT ENTRY |
|  | INX 1,6 | INCREMENT FREQUENCY CODE COUNTER AND |
|  | TRX PRF002,3 | LOOP FOR 6 SETS |
|  | INX 1,2 | INCREMENT POINTER TO PACKED DATA |
|  | INX 5,3 | RESTORE LOOP COUNTER FOR NUMBER OF SETS |
|  | TRX PRF001,4 | TO UNPACK AND LOOP FOR 6 WORDS |

THE FOLLOWING INSTRUCTION STRING SORTS THE COMBINED CODE AND JAM LEVEL IN ORDER OF LOWEST TO HIGHEST JAM LEVEL. THE "EXCHANGE-SORT" METHOD WAS SELECTED BECAUSE OF IT'S DESIGN SIMPLICITY.

|  | CLA I30 | SET UP COUNT-2 TO COMPARE ENTRY AND ENTRY+1 FOR ALL FREQUENCIES |
|---|---|---|
|  | STR 2 | (REGISTER 2) |
|  | CLA I31 | SET UP COUNT-1 TO LOOP FOR ALL 32 |
|  | STR 3 | FREQUENCIES (REGISTER 3) |
|  | CLA I0 | RESET EXCHANGE FLAG (SET IF DURING ANY |
|  | STR XCHNGE | PASS AN ENTRY MUST BE EXCHANGED) |
| PRF003 | CLA FRQCAD | FETCH ADDRESS OF FREQUENCY CODE TABLE |
|  | STR 4 | AND SAVE FOR INDEXING (REGISTER 4) |
| PRF007 | CLA FRQCAD | RESTORE POINTER TO TOP OF FREQUENCY CODE |
|  | STR 4 | TABLE (REGISTER 4) |
| PRF008 | CLA 0,4 | FETCH CODE AND JAM LEVEL FROM FREQUENCY TABLE |
|  | RSA 3 | ISOLATE FREQUENCY CODE AND SAVE FOR |
|  | STR FXC | LATER USE BY ENERGY MANAGEMENT |
|  | ADD FRQMAD | ADD ADDRESS OF TOP OF FREQUENCY CYCLE TABLE TO COMPUTE ADDRESS OF ENTRY FOR |
|  | STR FX | THIS FREQUENCY AND SAVE TEMPORARILY |
|  | CLA*FX | FETCH FREQUENCY (MC) FROM SAVED ADDRESS |
|  | STR FX | SET FX TO NEXT BEST FREQUENCY FROM |
|  | TRU PRF100 | ORDERED FREQUENCY TABLE |
| PRF010 | INX 1,4 | BUMP POINTER TO NEXT ENTRY IN ORDERED FREQUENCY TABLE |
|  | SXH | HAVE ALL 32 FREQUENCIES BEEN CHECKED ? |
|  | FRQCND,4 |  |
|  | TRU PRF008 | NO, CHECK NEXT FREQUENCY |
| PRF020 | CLA I1 | SET NO VISIBILITY |
|  | STR VISBLE |  |
|  | TRU 1,12 | RETURN TO ENERGY MANAGEMENT |

CALCULATE ALLOWABLE PRF BANDS (PRFX) FOR THIS FREQUENCY (FX)

WHERE 1562 < OR = PRFAL < OR = (PRFX) < OR = PRFAU < OR = 3125

|  |  | CALCULATE FIRST FORBIDDEN PRF UPPER BOUND (PRF1U) THIS FREQUENCY (FX) |
|---|---|---|
| PRF100 | CLA FX | FETCH FREQUENCY AT B17 |
|  | MLY DOT | MULTIPLY BY RADIAL VELOCITY AT B14 |
|  | DIV PRFMN | DIVIDE BY CONSTANT AT B15 |
|  | ADD I1 | ANSWER AT B16, ROUND AND |
|  | RSA 1 |  |
|  | STR PRF1U | SAVE |
|  |  | CALCULATE FIRST FORBIDDEN PRF LOWER BOUND (PRF1L) THIS FREQUENCY (FX) |
|  | CLA FX | FETCH FREQUENCY AT B17 |
|  | MLY DOT | MULTIPLY BY RADIAL VELOCITY AT B14 |
|  | DIV PRFMX | DIVIDE BY CONSTANT AT B15 |
|  | ADD I1 | ANSWER AT B16, ROUND AND |
|  | RSA 1 |  |
|  | STR PRF1L | SAVE |
|  | CLA I1 | SET FIRST TIME ON FLAG = ON |
|  | STR FIRST |  |
|  | STR N | SET N = 1 |
| PRF110 | CLA I0 | COMPUTE NTH FORBIDDEN PRF UPPER BOUND |
|  | LDQ PRF1U |  |
|  | DIV N | PRFFU = PRF1U / N |
|  | STR PRFFU |  |
|  | CLA I0 | COMPUTE NTH FORBIDDEN PRF LOWER BOUND |
|  | LDQ PRF1L |  |
|  | DIV N | PRFFL = PRF1L / N |
|  | STR PRFFL |  |
|  | CLA FIRST | FIRST TIME = ON ? |
|  | TRZ PRF130 | NO |
|  | CLA PRFFU | IS PRF FORBIDDEN UPPER > 3125? |
|  | CMA K3125 |  |
|  | TRH PRF115 | YES, BRANCH |
|  | CMA K1562 | NO, IS PRF FORBIDDEN UPPER < 1562 ? |
|  | TRL PRF113 | YES, BRANCH |
|  | CLA PRFFU | CURRENT ALLOWABLE LOWER = FIRST UPPER+1 |
|  | ADD I1 |  |
|  | PRF112 | STR PRFAL |

APPENDIX A—Continued

```
              CLA 10          NO, SET FIRST TIME = OFF
              STR FIRST
              CLA K3125       CURRENT ALLOWABLE UPPER = 3125
              STR PRFAU
              TRU PRF200
    PRF113    CLA K1562       SET ALLOWABLE LOWER TO MINIMUM
              TRU PRF112
    PRF115    CLA PRFFL       IS PRF FORBIDDEN LOWER > 3125 ?
              CMA K3125
              TRH PRF 120        YES
              CLA 10          SET FIRST TIME = OFF
              STR FIRST
              TRU PRF140
    PRF120    INX 1,N         N = N+1
              TRU PRF110
    PRF130    CLA PRFFU       IS PRF FORBIDDEN UPPER < 1562 ?
              CMA K1562
              TRL *+3         YES, BRANCH
              ADD 11
              TRU *+2
              CLA K1562       ALLOWABLE LOWER = 1562
              STR PRFAL
              TRU PRF200
    PRF140    CLA PRFFL       IS PRF FORBIDDEN LOWER < OR = 1562 ?
              CMA K1562
              TRL PRF010         YES
              TRE PRF010
              SUB 11          NO, PRF ALLOWAL UPPER = PRF FORBIDDEN
              STR PRFAU       LOWER - 1
              TRU PRF120
                              CHECK IF TARGET RANGE IS IN BLIND RANGE
                                ZONE FOR THIS PRF
    PRF200    CLA PRFAU       SET THIS PRF TO FIRST ALLOWABLE
              STR PRFX          UPPER
    PRF210    CLA 10          CALCULATE FIRST BLIND RANGE ZONE
              LDQ K81000        THIS PRF
              DIV PRFX
              STR R1          SAVE FIRST BLIND RANGE ZONE START
              STR RX          SAVE CURRENT BLIND RANGE ZONE START
    PRF220    CLA RP          IS TRACK RANGE LESS THAN CURRENT BLIND
              CMA RX            RANGE ZONE ?
              TRL PRF222         YES, VISIBILITY IS GOOD
              CLA RX
              ADD DR          IS TRACK RANGE < OR = CURRENT BLIND
              CMA RP            RANGE ZONE + BLIND ZONE DELTA?
              TRH PRF221      NO
              CLA PRFX
              SUB DPRF        SET CURRENT PRF TO CURRENT — DELTA PRF
              STR PRFX
              CMA PRFAL       IS NEW PRF < ALLOWABLE LOWER ?
              TRL PRF140         YES
              TRU PRF210
    PRF221    CLA RX
              ADD R1          RX = RX + R 1
              STR RX
              TRU PRF220
    PRF222    CLA 10          SET VISIBILITY = GOOD
              STR VISBLE
              TRU 1,12        RETURN TO ENERGY MANAGEMENT
              END
```

APPENDIX B
Control Operations

| OP Code | R | Y |
|---|---|---|
| 0    4 | 5    8 | 9    17 |

TRU — Transfer Unconditionally (OP CODE 00)—The computer will take the next instruction from the location in memory specified by Y and R.
Operating time:
1 microsecond.

TRN — Transfer on Accumulator Negative (OP CODE 01)—The sign bit of the Accumulator is sensed. If it is negative (1), control is transferred to the memory location specified by Y and R. If the accumulator sign is positive (0), the computer will take the next instruction in sequence.
Operating time:
1 microsecond.

TRZ — Transfer on Accumulator Zero (OP CODE 02)—The contents of the Accumulator are tested for a zero value. The sign bit is not tested. If the contents of the Accumulator are zero, control is transferred to the memory location specified by Y and R. If the contents of the Accumulator are not zero, the computer will take the next sequential instruction.
Operating time:
1 microsecond.

TOF — Transfer on Overflow (OP CODE 03)—If the Overflow Indicator is on, the indicator is turned off and the computer takes the next instruction from the memory location specified by Y and R. If the Overflow Indicator is off, the computer takes the next instruction in sequence.
Operating time:
1 microsecond.

TSX — Transfer and Set Return Address in Index Register 12 (OP CODE 12)—The contents of the program counter plus one are placed in index register 12 of the specified index register bank. The computer will then take its next instruction from the memory location specified by Y and R. The value placed into the index register represents the memory location immediately following the location of this TSX instruction.
The transfer portion of the Transfer and Set Index instruction may utilize all of the Indexing options.
Operating time:
2 microseconds.

```
| OP Code | R | Y |
0       4 5 8 9   17
```

CMA — Compare Algebraic (OP CODE 30)—The contents of the Accumulator are algebraically compared with the contents of the memory word at the location specified by Y and R. Two Compare Indicators, High, and Low, are treated as follows: If the Accumulator is lower, the Low Indicator is turned on and the other off. If the Accumulator is higher, the High Indicator is turned on and the other off. If they are equal, both are turned on. For the purposes of this instruction + zero is greater than − zero, +377777$_8$ is the highest number, and −377777$_8$ is the lowest number.
Only the execution of another CMA or CML instruction or a PAI will alter these indicators.
Operating time:
microseconds.
CML — Compare Logical (OP CODE 31)—The entire contents of the Accumulator, including sign, are logically compared with the contents of the memory word at the location specified by Y and R. Two Compare Indicators, High and Low, are treated as follows: If the Accumulator is lower, the Low Indicator is turned on and the other off. If the Accumulator is higher, the High Indicator is turned on and the other off. If they are equal, both are turned on. For the purposes of this instruction 0 is the lowest number and 777777$_8$ is the highest number,
Only the execution of another CMA, or PAI instruction will alter these indicators.
Operating time:
2 microseconds.
TRE — Transfer Equal (OP CODE 05)—If both Compare Indicators are on, the computer takes the next instruction from the memory location specified by Y and R. If either Compare Indicator is off, the computer takes the next instruction in sequence. The execution of this instruction will not alter the state of the Compare Indicators.
Operating time:
1 microsecond.
TRH — Transfer High (OP CODE 06)—If only the High Compare Indicator is on, the computer takes the next instruction from the memory location specified by Y and R. If the High Compare Indicator is off, the computer takes the next instruction in sequence. The execution of this instruction will not alter the state of the compare Indicators.
Operating time:
1 microsecond.
TRL — Transfer Low (OP CODE 07)—If only the Low Compare Indicator is on, the computer takes the next instruction from the memory location specified by Y and R. If the Low Compare Indicator is off, the computer takes the next instruction in sequence. The execution of this instruction will not alter the state of the Compare Indicators.
Operating time:
1 microsecond.

LCK - Lock

```
| 14 | N | 4 | N |
0    4 5  8 9 11 12  17
```

In a dual processor system, the value N is placed in the Lock Register of processor A. The number is then compared with the contents of the Lock Register of processor B. If equal, the Lock Register of processor A is reset and the computer will take the next instruction in sequence. If unequal, one instruction is skipped. In any case, the Lock Register and instruction sequence of processor B is unchanged. If both processors execute a LCK instruction with the same value at the same time the processor having executive control (Indicator 7 on) at that time completes execution of the LCK instruction 0.25 microseconds before the other processor. If identical instruction loops are used (a LCK instruction followed by a transfer back to the LCK instruction), the processor having executive control will normally set its Lock Register first. Since a clock update cycle, an interrupt, or a memory conflict may lengthen the instruction loop for the processor having executive control, it is possible for the other processor to set its Lock Register first. Operating time: 1.5 microseconds for skip or indicator 7 on, otherwise 1.75 microseconds.

ULK - Unlock

```
| 14 | 0 | 0 | 0 |
0    4 5  8 9 11 12  17
```

The Lock Register of the processor is reset.
Operating time:
1.5 microseconds.

ARITHMETIC OPERATIONS

```
| OP Code | R | Y |
0       4 5 8 9   17
```

ADD — Add (OP CODE 22)—The contents of the memory location specified by Y and R are algebraically added to the contents of the Accumulator. The result is placed in the Accumulator. The Overflow Indicator will be set (turned on) if an overflow occurs. If the result is zero, the sign of the result is the original sign of the Accumulator.
Operating time:
2 microseconds.
SUB — Subtract (OP CODE 23)—The contents of the memory location specified by Y and R are algebraically subtracted from the contents of the Accumulator. The result is placed in the Accumulator. The Overflow Indicator will be turned on if an overflow occurs. If the result is zero, the sign of the result is the original sign of the Accumulator.
Operating time:
2 microseconds.

MLY — Multiply (OP CODE 24)—The contents of the memory location specified by Y and R are multiplied by the content of the Accumulator. The product, which is a double length word, appears in the combined Accumulator and Q Register. The high order bits are in the Accumulator and the low order bits are in the Q Register. The sign of the product is in the sign bits of both the Accumulator and Q Register. Overflow is not possible. The initial value of the Q Register does not affect the result of this instruction.
Operating time:
3.5 microseconds.

DIV — Divide (OP CODE 25)—The double-length dividend in the combined Accumulator and Q Register is divided by the contents of the memory location specified by Y and R. The sign of the dividend is the sign of the Accumulator. The single-length quotient is in the Accumulator with the appropriate sign, and the remainder is the Q Register with the sign of the dividend. The divisor must be greater in magnitude than the higher-order half of the dividend. If it is not, the division does not take place and the Divide Check Indicator is turned on; the Accumulator and Q Register remain unchanged, and the computer takes the next sequential instruction.
Operating time:
6.25 microseconds;
2.25 microseconds if the division does not take place.

DPA — Double Precision Add (OP CODE 04)—The double-length contents of Y + 1 and Y are algebraically added to the double-length word in the combined Accumulator and Q Register. Y + 1 contains the high-order bits of the double-length operand and Y contains the low-order bits. These two words must have the same sign. The double-length sum is left in the Accumulator and Q Register with the high-order bits in the Accumulator and the low-order bits in the Q Register. The Accumulator and Q Register must have the same sign. The Overflow Indicator will be turned on if an overflow occurs out of the Accumulator. If the result is zero in both registers, the sign of the result is the original sign of the Accumulator.
Operating time:
3.25 or 3.5 microseconds.

SQR - Square Root

| 37 | | 1 | |
|---|---|---|---|
| 0 | 4 5 | 8 9 | 11 12 | 17 |

The single-length square root of the double-length argument in the combined Accumulator and Q Register is put in the Accumulator. The contents of the Q Register are destroyed. If the sign of the argument is negative (sign of the Accumulator), the square root is not performed and the Divide Check Indicator is turned on; the Accumulator and Q Register remain unchanged, and the computer takes the next sequential instruction. The binary point for this instruction is assumed to be located between $A_0$ and $A_1$ or between any other A even and odd bit.
Operating time:
9 microseconds;
1 microsecond if the square root is not performed.

WORD TRANSMISSION OPERATIONS

| OP Code | R | Y |
|---|---|---|
| 0    4 5 | 8 9 | 17 |

CLA — Clear and Add (OP CODE 20)—The contents of the memory location specified by Y and R replace the contents of the Accumulator.
Operating time:
2 microseconds.

STR — Store Accumulator (OP CODE 26)—The contents of the Accumulator are stored in the memory location specified by Y and R. The contents of the Accumulator remain unchanged.
Operating time:
2 microseconds.

LDQ — Load Q Register (OP CODE 21)—The contents of the memory location specified by Y and R replace the contents of the Q Register.
Operating time:
2 microseconds.

STQ — Store Q Register (OP CODE 27)—The contents of the Q Register are stored in the memory location specified by Y and R. The contents of the Q Register remain unchanged.
Operating time:
2 microseconds.

INDEX REGISTER OPERATIONS

| OP Code | R | Y |
|---|---|---|
| 0    4 5 | 8 9 | 10    17 |

INX — Increment Index (OP CODE 10) (Bit 9 = 1)—The Y field is added to the contents of the Index Register specified by R. If R = 0 or 13, no operation will result. If R = 14 or 15, the computer will add the 17 bit $Y^1$ field of the memory location specified by Y to Index Register 1 if $R^1$ is a one. Otherwise no operation will result.
Operating time:
1 microsecond if R = 0 or 13;
3 microseconds if R = 1 through 12;
2 microseconds if R = 14 and $R^1 = 0$;
4 microseconds if R = 14 and $R^1 = 1$;
2.25 microseconds if R = 15 and $R^1 = 0$;
4.25 microseconds if R = 15 and $R^1 = 1$.

DCX — Decrement Index (OP CODE 10) (Bit 9 = 0)—The Y field is subtracted from the contents of the index register specified by R. If R = 0 or 13, no operation will result. If R = 14 or 15, the computer will subtract the 17 bits of the $Y^1$ field of the memory location specified by Y from index register 1 if $R^1$ is a one. Otherwise no operation will result.
Operating time:
1 microsecond if R = 0 or 13;
3 microseconds if R = 1 through 12;
2 microseconds if R = 14 and $R^1 = 0$;
4 microseconds if R = 14 and $R^1 = 1$;
2.25 microseconds if R = 15 and $R^1 = 0$;

4.25 microseconds if R = 15 and R¹ = 1.

TRX — Transfer on Index (OP CODE 13)—If the contents of the Index Register specified by R is zero, the computer takes the next sequential instruction. If the contents of the Index Register specified by R is not equal to zero, the contents are decremented by one and the computer takes its next instruction from the memory location specified by Y which is always relative. If R = 14 or 15, the computer will use the 17-bit indirect address and Index Register 1 if R¹ is a one. If R = 0 or 13, no operation will result and the computer takes the next sequential instruction.

Operating time:
  3 microseconds for transfer;
  2 microseconds for no transfer;
  1 microsecond for R = 0 or 13;
  2 microseconds for R = 14 or 15 and R¹ = 0;
  4 microseconds (transfer) or 3 microseconds (no transfer) for R = 14 or 15 and R¹ = 1.

SXH — Skip on Index High (OP CODE 11)—The contents of the Index Register specified by R are compared to the number in the Y field. If the contents of the Index Register are greater than the value of Y, one instruction is skipped; otherwise, the computer will take the next sequential instruction. If R = 14 or 15, the computer will use the 17-bit indirect address and Index Register 1 if R¹ is a one. If R = 0 or 13, no operation will result and the computer takes the next sequential instruction.

Operation time:
  2 microseconds;
  1 microsecond for R = 0 or 13;
  2 microseconds for R = 14 or 15 and R¹ = 0;
  3 microseconds for R = 14 or 15 and R¹ = 1.

LOGICAL OPERATIONS

| OP Code | R | Y |
|---|---|---|
| 0    4 5 | 8 9 | 17 |

LGA — Logical Add (OP CODE 32)—Bits of the Accumulator corresponding to 1's in the contents of the memory location specified by Y and R are set to 1. All other bits remain unchanged. This is the "Inclusive OR" function.

Operating time:
  2 microseconds.

LGM — Logical Multiply (OP CODE 33)—When corresponding bits of the Accumulator and the contents of the memory location specified by Y and R are both 1's those bits in the Accumulator will remain 1. All other bits in the Accumulator will be set to zero. This is the "AND" function.

Operating time:
  2 microseconds.

LGC — Logical Complement (OP CODE 34)—Bits in the Accumulator corresponding to 1's in the contents of the memory location specified by Y and R are inverted. All other bits remain unchanged. This is the "Exclusive OR" function.

Operating time:
  2 microseconds.

CGC — Convert Gray Code (OP CODE 35)—The contents of the memory location specified by Y and R are converted from Gray Code to sign and magnitude and the result is placed in the Accumulator.

Operating time:
  6 microseconds.

SHIFT OPERATIONS

| 36 | R |  | K |  |
|---|---|---|---|---|
| 0 | 4 5 | 8 9    11 12 | | 17 |

LSA — Left Shift Accumulator (Bits 9–11 = 1)—The contents of the Accumulator are shifted left the number of bits specified by K, Modulo $2^6$. The sign bit is unchanged. Zeros are shifted into the least significant bit; bits shifted out of the most significant bit are lost and will cause an overflow if equal to 1. An overflow will turn on the Overflow Indicator.

Operating time:
  $1.5 + 0.25(n-4)$ microseconds where $n$ is the number in K.*

*Time is 1.5 microseconds for $n \leq 4$; use formula for $n > 4$.

LSB — Left Shift Both (Accumulator and Q Register) (Bits 9–11 = 3) — The double-length word in the combined Accumulator and Q Register is shifted left the number of bits specified by K, Modulo $2^6$. The sign bit of the Q register is unchanged and is always copied into the sign bit of the Accumulator. Zeros are shifted into the least-significant bit of the Q register. Bits shifted out of the most-significant bit (sign not included) of the Accumulator are lost and will cause an overflow if equal to 1. An overflow will turn on the Overflow Indicator.

Operating time:
  $1.5 + 0.25(n-4)$ microseconds.*

*Time is 1.5 microseconds for $n \leq 4$; use formula for $n > 4$.

RSA — Right Shift Accumulator (Bits 9–11 = 0)—The contents of the Accumulator are shifted right the number of bits specified by K, Modulo $2^6$. The sign bit is unchanged. Zeros are shifted into the most-significant bit and bits shifted out of the least-significant bit are lost. Overflow cannot occur.

Operating time:
  $1.5 + 0.25(n-4)$ microseconds.*

*Time is 1.5 microseconds for $n \leq 4$; use formula for $n > 4$.

RSB — Right Shift Both (Accumulator and Q Register) (Bits 9–11 = 4)—The double-length word in the combined Accumulator and Q Register is shifted right the number of bits specified by K, Modulo $2^6$. The sign bit of the Accumulator is unchanged and is copied always into the sign bit of the Q Register. Zeros are shifted into the most-significant bit of the Accumulator. Bits shifted out of the least-significant bit of the Accumulator are shifted into the most-significant bit (sign not included) of the Q Register. Bits shifted out of the least-significant bit of the Q Register are lost. Overflow cannot occur.

Operating time:
  $1.5 + 0.25(n-4)$ microseconds.*

* Time is 1.5 microseconds for $n \leq 4$; use formula for $n > 4$.

RRA — Right Rotate Accumulator (Bits 9–11 = 5)—The entire contents of the Accumulator are shifted circularly to the right the number of bits specified by K, Modulo $2^6$. The sign bit is included in the shift. Bits shifted out of the least-significant bit are shifted into the sign bit. Overflow cannot occur.

Operating time:
1.5 + 0.25 (n–4) microseconds.*
*Time is 1.5 microseconds for n ≤ 4; use formula for n > 4.

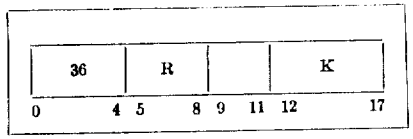

RRQ — Right Rotate Q Register (Bits 9–11 = 6)—This instruction is similar to Right Rotate Accumulator, except that the Q Register is shifted.
Operating time:
1.5 + 0.25 (n–4) microseconds.*
*Time is 1.5 microseconds for n ≤ 4; use formula for n 4.

LRB — Left Rotate Both (Accumulator and Q Register) (Bits 9–11 = 2) — The double-length logical word in the combined Accumulator and Q Register is shifted circularly to the left the number of bits specified by K, Module $2^6$. The sign bits are included in the shift. Bits shifted out of the sign bit of the Accumulator are shifted into the least significant bit of the Q Register. Bits shifted out of the sign bit of the Q Register are shifted into the least significant bit of the Accumulator. Overflow cannot occur.
Operating time:
1.5 + 0.25 (n–4) microseconds.*
*Time is 1.5 microseconds for n ≤ 4; use formula for n > 4.

RRB — Right Rotate Both (Accumulator and Q Register) Parity Generation (Bits 9–11 = 7)—The double-length logical word in the combined Accumulator and Q Register is shifted circularly to the right the number of bits specified by K, Modulo $2^6$. The sign bits are included in the shift. Bits shifted out of the least-significant bit of the Q Register are shifted into the sign bit of the Accumulator. Bits shifted out of the least-significant bit of the Accumulator are shifted into the sign bit of the Q Register. Overflow cannot occur. During the execution of this instruction the ring sum of the bits shifted out of Q17 into the sign bit of the Accumulator is set into Sense Indicator 2. The effect of this is to generate the parity of the field of bits shifted. If odd, Sense Indicator 2 is inverted, and if even, Sense Indicator 2 is not inverted. Sense Indicator 2 should be reset by the program since the sense indicator is not automatically reset before execution of the instruction.
Operating time:
1.5 + 0.25 (n–4) microseconds.*
*Time is 1.5 microseconds for n ≤ 4; use formula for n > 4.

NOTE: Indirect addressing is not allowed for any of the above shift operations. Indexing adds 0.75 microseconds to the specified shift operating times.

OPERATIONS ON ACCUMULATOR AND Q REGISTER

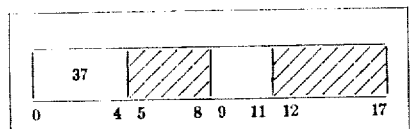

SAP — Set Accumulator Positive (Bits 9–11 = 0)—The sign bit of the Accumulator is set to zero (positive).
Operating time:
1 microsecond.

CSA — Change Sign of Accumulator (Bits 9–11 = 4)—The sign bit of the Accumulator is inverted.
Operating time:
1 microsecond.

XCA — Exchange Accumulator and Q Register (Bits 9–11 = 3)—The contents of the Accumulator and Q Register, including the sign bits, are exchanged.
Operating time:
1 microsecond.

CPA — Two's Complement Accumulator (Bits 9–11 = 5)—If the sign of the Accumulator is negative, the contents of the Accumulator, excluding sign, are replaced with the two's complement of that number. The sign remains unchanged. If the sign of the Accumulator is positive, the Accumulator remains unchanged and the computer takes the next instruction in sequence.
Operating time:
1 microsecond.

OPERATIONS ON INDICATORS AND SWITCHES

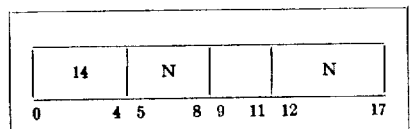

SEI — Set Indicators (Bits 9–11 = 2)—The indicators specified by a 1-bit in the corresponding position in the N fields are set (1). All other indicators remain unchanged. Each of the 10 bits in the N field corresponds to one of the 10 indicators.
Operating time:
1.5 microseconds.

REI — Reset Indicators (Bits 9–11 = 3)—This instruction is similar to Set Indicators, except that the indicators specified by a 1-bit in the corresponding position of the N fields are reset (0).
Operating time:
1.5 microseconds.

SKI — Skip On Indicators (Bits 9–11 = 1)—If all indicators specified by 1 bits in the N field are on (1), one instruction is skipped. If any of the specified indicators are off (0), the next instruction in sequence is taken. Each of the 10 bits in the N fields corresponds to one of the 10 indicators.
Operating time:
1.5 microseconds.

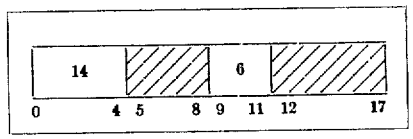

PIA — Place Indicators in Accumulator (Bits 9–11 = 6)—The contents of the Sense Indicators plus the two High-Low Indicators and the Overflow Indicator are placed in the Accumulator as shown below. The remaining bits of the Accumulator are cleared.

CTS — Console Tape Stop (OP CODE 15) (Bits 9-11 = 2)—The clutch of the Paper Tape Reader is de-energized and the forward motion of the tape is stopped. The Tape Reader Interlock is turned off and the Console Not Busy Indicator is turned on. To insure that the tape stops in position to read the next input frame, this instruction must be executed within 100 microseconds after the last tape input interrupt.
Operating time:
1 microsecond.

CTR — Console Tape Rewind (OP CODE 15) (Bits 9-11 = 3)—The tape is rewound onto the supply reel until a start-of-reel frame (a punch in the 7th channel with even parity) is encountered. The tape will stop before the frame preceding the start-of-reel frame. There will be a program interrupt upon completion of the rewind. No operation will occur if the Console Not Busy Indicator is off previous to this instruction, and the computer will continue with the next instruction in sequence.
Operating time:
1 microsecond.

PMO — Punch Motor ON (OP CODE 15) (Bits 9-11 = 4)—The Tape Punch Motor will be turned on. At least one second must elapse before executing an output to the Tape Punch.
Operating time:
1 microsecond.

PMF — Punch Motor Off (OP CODE 15) (Bits 9-11 = 5)—The Tape Punch Motor will be turned off.
Operating time:
1 microsecond.

OPA — Output 6 Bits to Tape Punch (OP CODE 16) (Bits 9-11 = 1)—The least significant 6 bits of the Q Register are output to the Tape Punch through the Console Buffer Register. The computer continues with the next instruction in sequence immediately after the 6 bits in the Q Register are placed in the Console Buffer Register. The Console Not Busy Indicator is turned off and the Tape Output Interlock is turned on and remain so until the frame has been punched. No operation will occur if the Console Not Busy Indicator is off previous to this instruction, and the computer will continue with the next instruction in sequence.
Operating time:
1 microsecond.

OPB — Output 7 Bits to Tape Punch (OP CODE 16) (Bits 9-11 = 2)—This instruction is similar to OPA (Output 6 Bits to Tape Punch) except that the least significant 7 bits in the Q Register are output to the Tape Punch through the Console Buffer Register.
Operating time:
1 microsecond.

APPENDIX C

METHOD OF PROCESSING THE HM-4118 ASSEMBLY PROGRAM

The HM-4118 Assembly Program (HAP-18M) is a subsystem of the HM-4118 software system that affords a means of assembling HM-4118 assembly language programs on the computer. It is intended primarily as an aid to the programmer coding in HM-4118 langauge. The HAP-18M is the HM-4118 computer program which converts HM-4118 assembly language punched on standard tab cards into HM-4118 machine code. The assembler program recognizes and converts mnemonic codes, symbol labels, and operands into machine language instructions or data words. The assembler also recognizes and operates under the control of a set of pseudo operations. The pseudo operations allow the programmer to control memory allocation, define symbols, enter data words, control listings, define macro operations, and provide overall control of the program assembly process. The program includes error listings, side-by-side listings of the symbolic and the machine language code, symbol tables, and relocatable binary tapes for the HM-4118.

The assembler program is loaded in low core memory to assemble another program by executing two passes through the source program. The assembler performs all functions necessary to organize the program by operating on the input data, one line at a time. The new program is assembled and outputted on punched or magnetic tape. The new program is not placed in memory during assembly, thus, it may be assigned memory locations that are also used by the assembler program.

First Pass Through the Source Program (Pass I) — During the first pass, the assembler constructs symbol and macro tables, checks format, and compiles errors. Symbols that appear as labels in the location field, and symbols that appear in the variable field of operation codes, are identified and placed in the symbol table. A location symbol is identified by assigning it the value of the memory location that it represents or the value to which it is equated. Operation codes, excluding all pseudo operations except variable field data (VFD), are checked for symbols and proper format in the variable field for the purpose of compiling error messages. When a macro (MAC) operation is processed, the macro name is placed in the macro name table and defined by the relative location of that macro's skelton, parameter, and line count when this data becomes available. Symbols that appear in the variable field of a macro operation are parameters. As each line following a macro operation is entered into the macro skeleton table, each symbol is checked to see if it is present in the parameter table. If found there, it is assigned that parameter number. If the symbol is not in the parameter table, it is entered, unchanged, into the skeleton table. When an error is detected, the statement in which the error occurred, and the error flag, are printed after the statement is processed. At the end of Pass I, all undefined symbols are assigned locations beginning with the next memory location above the highest location used by the programmer. These symbols and the addresses they were assigned are printed out.

Second Pass Through the Source Program (Pass II) — The final program assembly occurs during Pass II processing. The assembler reads each statement, (one at a time) interpreting the mnemonic operation codes and symbolic operands and expressions, and converting them into machine language. Data-generating pseudo operations are performed and the data generated is printed out. A literal table is constructed during Pass II with each literal assigned a memory location within the memory block specified by the programmer. As each statement is interpreted and assembled, the program listing, data generated, and comments are printed out and

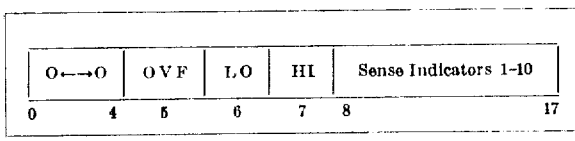

(Note: Both High and Low Indicators on denotes equal.)
Operating time:
 1.5 microseconds.

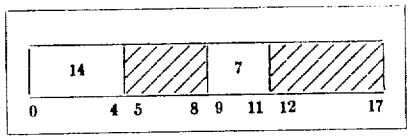

PAI — Place Accumulator in Indicators (Bits 9–11 = 7)—The 13 least significant bits of the Accumulator are used to set or reset the sense indicator plus the two High-Low Indicators and the Overflow Indicator. Indicators 1, 3 and 7 are not changed by the instruction.
The position of bits in the Accumulator is shown under the PIA (Place Indicators in Accumulator) instruction.
Operating time:
 1.5 microseconds.

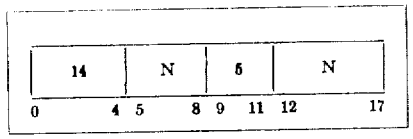

SKW — Skip on Switches (Bits 9–11 = 5)—If all the switches specified by 1 bits in the N fields are on, one instruction is skipped. If any of the specified switches are off, the next instruction in sequence is taken. Each of the 10 bits in the N fields corresponds to one of the 10 switches.
Operating time:
 1.5 microseconds.

BUFFERED INPUT/OUTPUT

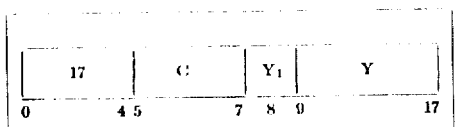

EXF — External Function—If $Y_1 = 0$, the contents of the memory word specified by the absolute value of Y, are sent via the Input/Output Module to the device on the appropriate channel. If $Y_1 = 1$, the contents of the memory word specified by the program counter plus the value of Y are sent. C shall be coded 0 through 7, corresponding to one of the eight channels. Code 0 corresponds to the highest priority channel.
Operating time:
 2 microseconds.

CONSOLE INPUT/OUTPUT INSTRUCTIONS

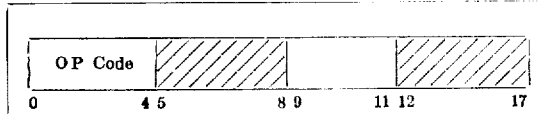

TWA — Input Typewriter Activates (OP CODE 15) (Bits 9–11 = 6)—The Input Typewriter Interlock and the Typewriter Activate Light are turned on; the Console Not Busy Indicator is turned off. This will activate the typewriter to allow inputs from the typewriter keys. No operation will occur if the Console Not Busy Indicator is off previous to this instruction, and the computer will continue with the next instruction in sequence.
Operating time:
 1 microsecond.
TWF — Input Typewriter Off (OP CODE 15) (Bits 9–11 = 7)—The Input Typewriter Interlock and the Typewriter Activate Light are turned off; the Console Not Busy Indicator is turned on. This instruction will inhibit any attempt to input from the typewriter keys.
Operating time:
 1 microsecond.
OTW — Output to Typewriter (OP CODE 16) (Bits 9–11 = 3)—The BCD character in the least significant 6 bits of the Q Register is output to the typewriter through the console Buffer Register. The computer continues with the next instruction in sequence immediately after the character in the Q Register is placed in the Console Buffer Register. The Console Not Busy Indicator is turned off and Output Typewriter Interlock is turned on, and remain so until the character has been typed. No operation will occur if the Console Not Busy Indicator is off previous to this instruction, and the computer will continue with the next instruction in sequence.
Operating time:
 1 microsecond.
IPC — Input from Console (OP CODE 16) (Bits 9–11 = 0)—If the Tape Level Switch on the Processor Control Panel is set to 6, the least significant 6 bits of the Console Buffer Register are placed in the least significant 6 bits of the Q Register. Bit positions 0 through 11 of the Q Register are not altered. If the Tape Level Switch is set to 7, the least significant 7 bits of the Console Buffer Register are placed in the least significant 7 bits of the Q Register. Bit positions 0 through 10 of the Q Register are not altered. The contents of the Q Register are normally saved and restored by console input interrupt subroutines.
Operating time:
 1 microsecond.
CTA — Console Tape Advance (OP CODE 15) (Bits 9–11 = 1)—The clutch of the Paper Tape Reader is energized which initiates forward motion of the Tape Reader is initiated. The tape will advance at the rate of 500 characters per second. The Taper Reader Interlock is turned on and the Console Not Busy Interlock is turned off. No operation will occur if the Console Not Busy Indicator is off previous to this instruction, and the computer will continue with the next instruction in sequence.
Operating time:
 1 microsecond.

recorded on punched or magnetic tape. At the end of Pass II, a list of all symbols and literals used is printed out and recorded on punched or magnetic tape.

Literal Table — A literal consists of a unique machine language (binary) number used in a program. The literal table is assigned to a block of memory locations specified by the programmer. The literal table is made accessible for index register addressing from any point in memory. This is accomplished by assigning the address of the beginning of the literal table to one of the index registers. This particular index register has the same assignment in all banks and is specified by use of the LTL pseudo operations. The LTL pseudo operation must be performed prior to the first use of a literal in a program. A literal is a unique binary number that is derived when the assembler decodes an operand. The operand may be octal, decimal, a constant, a 6-bit alphanumeric code, or an ASCII code. When the assembler encounters a literal, it obtains the equivalent binary number and surveys the literal table for another occurrence of the same number. If a duplicate exists, the location of the duplicate in the literal table is also assigned to this literal. If this is the first occurrence of this specific literal, it is assigned the next available location in the literal table. No duplications are allowed in the literal table. A literal is accessed during program processing by certain general instruction words. The R-subfield in the variable field of the instruction word specifies the index register that contains the literal table address. The Y-subfield in the variable field of the instruction word specifies which literal in the table to use. The number of bits available to the Y-field limits the total number of literals to 512 ($1000_8$).

Memory Location Assignment — The assembler program provides three software counters: (1) main counter, (2) scratch counter, and (3) relocation counter. Memory locations are assigned by the assembler interpreting the location field and assigning values obtained from one of the three counters to the contents of the location field. If column 1 is blank, the location field is assumed to be blank, and that line is assigned to the next higher available memory location in either scratch pad or main memory, depending upon the portion of memory in which the preceding line(s) were placed. If column 1 contains a number the label is interpreted as a constant that designates the memory location to which the instruction or data will be assigned. The constant starts with column 1 and continues to the first blank column (up to six characters). If the constant is greater than $777_8$, the main counter is set to the value of the constant and following instructions, or data, are assigned sequentially higher main memory locations. If the constant equals $777_8$, or less, the scratch counter is set equal to that value, and following instructions, or data, are assigned sequentially higher scratch pad locations. If column 1 contains an alphabetic character, the location field is interpreted as a symbol, or label, and is placed in the memory location specified for that symbol in the symbol table generated during Pass I.

THE HAP-18M LANGUAGE AND PSEUDO OPERATIONS

The HAP-18M symbolic assembly language permits the use of alphanumeric symbols to represent memory locations and operation code mnemonics to represent the equivalent numeric operation codes. Further programming flexibility is afforded by the use of pseudo operations.

HAP-18M Symbolic Assembly Language — Characteristics of the HAP-18M language are described in the following paragraphs.

Symbols — HAP-18M symbols consist of six or less alphanumeric characters with the first character being alphabetic. An asterisk (*) may be substituted for a symbol in an arithmetic expression in an instruction variable field. If the asterisk appears as a substitute for a term, that term is assigned the current value of the location counter during assembly. A line that begins with an asterisk is defined as being entirely in the comments field. Symbols may be used to define memory locations.

Constants — All HAP-18M constants are considered decimal integers except for those used in operands of switch instructions, in Boolean expressions, and in certain data generated during pseudo operations. Constants that are not decimal integers are considered octal integers. If an octal integer is used where it could be interpreted as decimal, the octal integer must be followed by the letter B (Boolean) to indicate that it is an octal integer.

Memory Nomenclature — Nearly all of the memory locations from $0_8$ through $212_8$ have been assigned to specific functions such as interrupt entrance register, index registers, etc. These locations are referred to as assigned memory.

The assembler program uses memory address 0 through $777_8$ (first 512 decimal locations) for scratch pad memory. When developing an operational program, the locations $213_8$ through $777_8$ should be utilized for storage of data that is used frequently because these locations can be addressed directly from any location in memory and thus accessed in a minimum time.

The memory locations with addresses greater than $777_8$ are referred to as main memory.

Expressions — An arithmetic or Boolean expression is any meaningful, parenthesis-free combination of symbols, constants, and operators appearing in the variable field of an instruction. The facing table shows the allowable operators and their definitions. The value of an expression is obtained by performing each multiplication (*) and division (/) operation as it occurs from left to right. The expression is evaluated a second time, performing the addition (+) and subtraction (−) operations.

When evaluating a / operation in an arithmetic expression, only the quotient is used. In a Boolean expression, A/B is evaluated as A*(/B).

The above expressions will be evaluated as integers using 17 bits and two's complement arithmetic.

Pseudo operations — A list of pseudo operations available to the programmer for additional flexibility is listed on the facing page. A functional list of the pseudo operations is given in Appendix E.

OPERATORS AND DEFINITIONS

| Symbol | Arithmetic Definition | Boolean Definition |
|---|---|---|
| + | Addition | Inclusive OR |
| x | Subtract | Exclusive OR |
| * | Multiplication | AND |
| / | Division | Complement |

PROGRAMMER OPERATIONS PROVIDED BY PSEUDO OPERATIONS

- Controlling memory allocation
- Defining or relating symbols
- Forming data
- Defining macro operations
- Specifying output and control listings
- Controlling assembly processes.

PROGRAMMING AND PROCESSING THE COMPUTER INSTRUCTIONS

A statement or line on the program coding sheet that defines a computer instruction is processed by the assembly program to generate a program instruction word in machine language and assign it a memory location.

The computer instructions are programmed and processed by the assembler according to operation and variable field formats defined in the following paragraphs.

General Instructions — General instructions must have entries in the operation field and the variable field. Each of the subfields in the variable field may contain a symbol, constant, or arithmetic expression. This group of instructions uses no operation code augmentors and may use absolute or relative addressing. All instructions that may utilize literals are included in this group.

The characters in the variable field are arranged with the Y-subfield first, separated by a comma from the R-subfield. If an asterisk appears in column 12 of the operation field, the assembler program assigns the correct R value for indirect addressing. If one of the index registers is to be directly specified, the R-subfield must be equal to a value of 1 through 12 ($14_8$). Any expression or symbol may be used in the R-subfield, provided the value represented is less than 13. A value greater than 12 results in an error flag. Indirect addressing cannot be specified by writing 14 ($16_8$) or 15 ($17_8$) in the R-subfield. Indirect addressing can only be specified by an asterisk in column 12. When developing a TRX of SXH instruction, the R-subfield must not be equal to zero; if the R-subfield is equal to zero for these instructions, the assembler program generates an error flag.

Shift Instructions — Shift instructions consist of an operation field, and a variable field with a K-subfield and an R-subfield. The variable field may contain a symbol, constant, or arithmetic expression. The characters in the first subfield of the variable field provide the K-subfield, which specifies the shift count. The second subfield begins in the column immediately following the first comma in the variable field and is the R-subfield. The R-subfield specifies an index register. If the R-subfield is zero, (no characters in the subfield), the K-subfield shift count is not changed. If the R-subfield is 1 through 12 ($14_8$), the contents of the specified index register are added to the K-subfield when the instruction is executed, and the resultant sum is the shift count. The R-subfield may not be set equal to 13 ($15_8$), 14 ($16_8$), or 15 ($17_8$). Notice that the K-subfield may be defined by a label or symbol that decodes into as many as 17 bits. In any case, only the six least significant bits are used. This convention also applies when the contents of an index register are added to the K-subfield.

Indicator and Switch Instructions — These instruction words consist of an operation field and variable field. The instruction is decoded by the assembler from the mnemonic codes in the operation and variable field. The variable field contains a symbol, constant, or Boolean expression that defines the required 10-bit N-field. For these instructions constants are assumed to be octal. Each of the 10 bits corresponds to one of the indicators or switches. If the variable field characters decode into more than 10 bits, only the 10 least significant bits are used.

Operations on A and Q Registers and Console I/O Instructions — Operations on the accumulator and Q register and the console I/O instructions require an entry only in the operation field. The machine instruction is decoded from the mnemonic code in the operation field. This group of computer instructions includes all of those that never have a variable field.

PROGRAM CODING FORM

PREPARED BY _____  DATE _____

PHONE _____  PROBLEM NO. _____  PAGE ____ OF ____

| LOCATION (LABEL) | OP CODE | | VARIABLE AND COMMENTS FIELD | SEQ NO. |
|---|---|---|---|---|
| | R S A | 4 | | |
| | R S A | 2 5 | | |
| | S E I | 5 2 5 | | |
| | R E I | 5 2 5 | | |
| | S A P | | | |

NOTES

1. LINE 1: SHIFT THE A REGISTER RIGHT 4 PLACES
2. LINE 2: SHIFT THE A REGISTER RIGHT THE NUMBER OF PLACES INDICATED BY THE CONTENTS OF INDEX REGISTER 6, +2
3. LINE 3: SET THOSE INDICATORS WITH A ONE IN THE CORRESPONDING POSITION OF THE BOOLEAN EXPRESSION DEFINED BY $525_8$
4. LINE 4: RESET THOSE INDICATORS WITH A ONE IN THE CORRESPONDING POSITION OF THE BOOLEAN EXPRESSION DEFINED BY $525_8$
5. LINE 5: SET THE A REGISTER SIGN BIT POSITIVE

Examples of Computer Instructions

PROVIDE GREATER FLEXIBILITY IN THE ADDRESSING FUNCTION

The combination of the subfields in the variable field can define the type of addressing or instruct the assembler to assign a type of addressing for the operation. Since the 18-bit general instruction word requires 5 bits to specify the operation code, only 13 bits are available to indicate operand addresses. This limitation would permit direct addressing in the instruction word itself of only 8,192 addresses. To avoid such a limitation, the computer provides index and indirect addressing options that permit accessing of any memory location from any instruction location. These options divide the addressing indicator bits into two fields. One field (the R-field) indicates the type of addressing to be performed and the other field (the Y-field) provides basic information for the addressing function. The R-field can indicate four basic methods of addressing, Absolute Addressing (Scratch Pad), Absolute Addressing (Indexed), Relative Addressing, and Indirect Addressing.

Absolute-Scratch-Pad — This type of addressing is limited to accessing memory locations 0 through $777_8$. These locations provide easily accessible storage for frequently used data. An absolute address in scratch pad memory is designated on the coding form when the R-subfield in the variable field is zero. When this entry is made, the Y-subfield designates the absolute address for that operand.

Absolute Addressing-Indexed — For indexed addressing, the R-field is used in conjunction with sense indicators F5 and F6 to modify the base address indicated in the Y-field. There are four groups of 12 addresses in memory that are reserved for index registers. The word position within the group is specified by an R-field in the instruction word equal to 1 through 12 ($14_8$). Sense indicators F5 and F6 identify the group or bank of registers. By combining the R-field and the configuration of F5 and F6, the absolute memory location for the index register is defined for the addressing function. Then the contents of the specified index register are added algebraically to the contents of the Y-subfield to define the actual memory location of the operand.

Relative Addressing — The assembler program develops a relative address for the instruction when the operand word is located within +255 or −256 addresses of the location of the instruction being generated. If the operand is located out of this range (beyond +255 or −256 addresses), an address must be generated by using indirect addressing. If the operand address is within range, the assembler will develop a Y-field to add to or subtract from the contents of the program counter for the relative address of the operand. The programmer must know that the required operand lies within range. If the operand is not within range, an error flag is set.

A relative address can be entered directly on the coding form by placing an asterisk in column 13 followed by a + or − operator and a number. This convention instructs the assembler to develop an address relative to the address of the instruction being performed.

In general, when a label is used in the variable field, the assembler will first determine if it can be reached by absolute addressing. If not, relative addressing is checked. If neither type of addressing can reach the indicated location, an error flag is generated.

Indirect Addressing — When the desired operand is beyond the range of absolute or relative addressing, the assembler must be instructed to indirectly address the operand. The assembler cannot generate indirect address words itself. This is achieved by entering an asterisk in column 12 on the coding form and entering a scratch pad address or symbolic address that contains the actual memory address or a further indexed address for the operand.

In the illustrated example of indirect addressing, the following conditions apply: If bit 0 is AAK2 (which must be previously set by the programmer) is a one, the contents of index register 1 (which must be set previously by the programmer) is algebraically added to the contents of AAK2. This sum defines the actual operand address when bit 0 of the index register 1 is zero. However, a further indexing level is available to the programmer. By previously setting bit 0 of index register 1 and bit 0 of AAK2 to one, the contents of the summed address are treated as containing another address that contains the actual address for the operand. An example is shown in the table.

EXAMPLE OF INDIRECT ADDRESSING WITH INDEXING OPTIONS
(Instruction is TRU* AAK2)

| Address | Contents | |
|---|---|---|
| AAK2 | $400337_8$ | bit 0 = 1 indexed address |
| add. INDEX 1 | $400007_8$ | bit 0 = 1 indirect address |
| | $346_8$ | |
| $346_8$ | $401000_8$ | bit 0 = 1 indexed address |
| add. INDEX 1 | $400007_8$ | bit 0 = 1 indirect address |
| | $1007_8$ | |
| $1007_8$ | $024212_8$ | bit 0 = 0 effective address |

PROGRAM CODING FORM

PREPARED BY _____   PROBLEM NO. _____   DATE _____
PHONE _____                                PAGE _____ OF _____

| LOCATION (LABEL) 1-8 | OP CODE 9-12 | 13 | 14 | 15 | 16 | 17 | VARIABLE AND COMMENTS FIELD 18-72 | SSO NO. 73-80 |
|---|---|---|---|---|---|---|---|---|
| | C L A D | 1 | 1 0 | 0 0 | 1 | 2 | | |
| | I N X | 7 | 4 | | | | | |
| | M L T | A | A + | 0 5 | | | | |
| | L R U | | − | | | | | |
| | C L A | * | A | A | K | 2 | | |

NOTES:
1. LINE 1: ABSOLUTE ADDRESSING. CLEAR THE A REGISTER AND ADD THE CONTENTS OF ADDRESS 100.
2. LINE 2: INDEXED ADDRESSING. TAKE THE CONTENTS OF INDEX REGISTER 12 AND ADD 10. THE SUM IS THE ADDRESS OF THE NUMBER THAT WILL BE ADDED TO THE A REGISTER CONTENTS.
3. LINE 3: INDEX ADDRESSING. INCREMENT INDEX REGISTER 4 BY 7.
4. LINE 4: RELATIVE ADDRESSING. CONDITIONS: 1. INSTRUCTION IS LOCATED IN 10000.
   2. AAOT IS LOCATED IN 10255.
   RESULTS: IN THE FINAL COMPUTER WORD, THE Y FIELD WILL CONTAIN *255 (377₈) AND THE R FIELD WILL CONTAIN 13 (15₈).
5. LINE 5: RELATIVE ADDRESSING: CONDITIONS: 1. PRESENT INSTRUCTIONS ADDRESS IS 10003.
   2. TRANSFER IS REQUIRED TO ADDRESS 10010.
   THE OPERATOR MUST KNOW THAT THE NEXT REQUIRED ADDRESS IS LOCATED IN ADDRESS 10010.
   RESULTS: IN THE FINAL COMPUTER WORD, THE Y FIELD WILL CONTAIN 5 AND THE R FIELD WILL CONTAIN 13 (15₈).
6. LINE 6. INDIRECT ADDRESSING. CLEAR AND ADD THE CONTENTS OF THE MEMORY LOCATION SPECIFIED BY THE CONTENTS OF THE ADDRESS DESIGNATED BY SYMBOL AAK2.

Examples of Addressing. Four basic methods of addressing are indicated by the R-field.

SUMMARY OF PROGRAM CONTROL REQUIREMENTS

The program control requirements are fulfilled by the operator furnishing information in answer to typed data messages each time a program coded in symbolic language is to be assembled.

The HM-4118 Assembly Program (assembler) is one of a group of component programs (utility programs) comprising the Utility Library Tape. Therefore, when a program coded in symbolic language is to be assembled, the operator must select the assembler from among these utility programs. Selection involves the operator providing information in answer to data requests which are controlled by the monitor program, another of the utility programs.

The monitor program performs as an executive program for the utility programs and controls overall operation during compilation or modification of programs. The monitor program provides interface with the operator through the console channel keyboard. Operator input requests are analyzed by the monitor program and action is initiated for processing. If the program required to process the request is not in memory, the monitor program loads it from the Utility Library Tape and then transfers control to the proper portion of the newly loaded program for execution of the requested action. Upon completion of processing, control is returned to the monitor program in readiness for subsequent requests.

The monitor program notifies the operator that it is ready for input by typing the message ENTER REQUEST. The operator then enters a request code which, if he is requesting the assembler, will be ASSEM, followed by a space.

Transfer of control to the assembler is indicated to the operator by the message "HM-4118 ASSEMBLY PROGRAM" being typed. (See facing table). At this point, there are still several parameters which must be furnished by the operator prior to execution of the assembly process. These parameters, which are entered one by one in response to typed messages, involve the program name, process mode, input mode, list mode, output mode, and COMID tape name. These messages are described as follows:

- Program Name — the program name (six or more alphanumeric characters) is placed in a 2-word storage area for later usage.
- Process Mode — this entry specifies whether the assembly is to be a normal or a system macro assembly.
- Input Mode — the input mode indicates the type of symbolic input (i.e., punched or magnetic tape, or punched cards).
- List Mode — the list mode indicates whether or not a listing is desired.
- Output Mode — the output mode specifies the type of output desired.
- COMID Tape Name — the COMID tape name is comprised of six or less alphanumeric characters and is used to identify the COMID tape being written or read. After the operator has entered a parameter at the keyboard, the termination of the parameter is indicated by entering a space. An erroneous entry can be cancelled by entering a slash (/). A zero or no parameter can be entered by a space. For a COMID assembly, a zero is entered in the output mode parameter. After entering all parameters, printout will be as shown in the following table, together with sample operator entries.

SAMPLE ASSEMBLY ENTRY PARAMETER PRINTOUT

| Printout | Operator Entry |
| --- | --- |
| HM-4118 ASSEMBLY PROGRAM | |
| ENTER PROGRAM NAME | SKA010 |
| ENTER PROCESS MODE, 0 FOR SYSTEM MACRO, 1 FOR NORMAL ASSEMBLY | 1 |
| ENTER INPUT MODE, 1 FOR MT, 2 FOR PT, 3 FOR CR INPUT | 1 |
| ENTER LIST MODE, 0 FOR NO LIST, 1 FOR LIST | 1 |
| ENTER OUTPUT MODE, 0 FOR NONE, 1 FOR MT, 2 FOR PT | 1 |
| ENTER COMID NAME | OPS200 |
| ENTER COMID I/O MODE, 1 FOR MT, 2 FOR PT | 1 |

DESCRIPTION OF INPUT FORMATS

A symbolic instruction, or line, consists of four major divisions: location field, operation field, variable field, and comments field.

The location field may contain a symbol by which other instructions can refer to this location. The operation field contains the mnemonic operation code. The variable field normally contains the operand of the instruction. The comments field exists for the convenience of the programmer and does not affect the assembly process.

Location Field — the contents of the location field, also called the label field, may be a symbol, constant, or blank. The function of the location field is to specify the memory location of the instruction of this line. Memory locations 0 through $212_8$ have preassigned specific functions such as index registers, interrupt entrance register, etc. and are not available to the programmer for any other purpose. The assembler uses addresses 0 through $777_8$ for scratch pad memory. When developing an operational program, the locations $213_8$ through $777_8$ should be used for storage of data that is frequently used because these locations can be addressed directly from any location in memory and thus accessed in a minimum time.

Location Field Symbols — When a symbol appears in the location field, that symbol's (or label's) unique function is to define a specific memory location. Symbols are normally assigned a value derived from the main counter, and are addresses greater than $777_8$. If a symbol is to be assigned a memory location in scratch pad memory, it is assigned a value derived from the scratch counter and is denoted by adding a "comma S" (,S) at the end of the symbol. The instruction data generated by the remainder of the line on which the symbol appears is placed in the memory location specified by the symbol. Unless the symbol is defined otherwise by the use of an EQU or other pseudo operation, the address assigned for the symbol is the next sequential address in main memory or in scratch pad memory.

Location Field Constants — A constant in the location field indicates the storage location for the instruction or data generated by that line. Constants are assumed to be decimal numbers unless the number has a suffix B, in which case it is read as octal. If the constant is less than 512 ($1,000_8$), the scratch counter is set its' value, if it is greater than scratch pad memory location numbers, the main counter is set.

Blank Location Fields — If the location field is blank, the instruction, or data generated on that line, is assigned the next higher available location in either scratch pad or main memory, depending upon whether the preceding line was assigned to scratch pad or main memory.

Operation Field — The operation field will contain an operation code mnemonic, a pseudo operation code, or a macro operation code. If the operation code is followed by an asterisk (*), that instruction is to use an indirect address.

Variable Field — The variable field may be blank or contain one or more subfields which are separated by commas. The number of subfields within the variable field is dependent upon the operation code. The formats used by the various classes of instructions are given in Table 1. If the programmer specifies the R (index) field for an instruction, the assembler will interpret the Y-field as absolute or relative depending on the value of R. Table 2 shows the fields for the various values of R. If no R subfield is present, the assembler will generate a 0 or 13 for R, depending on the location of the Y subfield (in scratch pad or main memory). If an asterisk (*) is placed after the operation code and no R field is present, indirect addressing is assumed and the assembler will generate a 14 or 15, depending on the value of the Y subfield.

The value assigned to the Y subfield, for general instructions specifying absolute addressing, is formed by using the least significant nine bits of the final result of the arithmetic expression appearing in the Y-subfield. The value assigned to the Y-subfield, for general instructions specifying relative addressing, is formed by subtracting the current value of the specified location counter from the final value of the arithmetic expression appearing in the Y-subfield. If the result is greater than +255 or less than −256, an error flag is set. Otherwise, if the result is positive, the least significant eight bits are placed in the Y field of the instruction. If the result is negative, the least significant eight bits of the two's complement of the number are placed in the Y field of the instruction.

The value given to K for shift Instructions is the least significant 6 bits of the final result of the arithmetic expression appearing in the K subfield. The value given to C is the I/0 channel number. The format of the variable field of the various pseudo-operations are described in the sections which discuss the pseudo-operations.

Comments Field — The programmer may write notes or any information desired into the comments field. The assembler does not process this field but retains the comments for later printout as a side-by-side listing after Pass II. Additionally, when the first column in the location field contains the operator *, the entire line is printed out as a comment and does not appear in the final assembled program. If the line is blank after the *, an asterisk will be printed in the first column and a space will result for that line in the final printout.

TABLE 1

FORMAT FOR VARIABLE FIELD INSTRUCTIONS

| Class of Instruction | Format |
| --- | --- |
| •General Instructions | Y, R |
| •Shift Instructions | K, R |
| •Indicators and Switch Instructions | N(Octal) |
| •Buffered I/O | Y, C |
| •Operations on A and Q | Blank |
| •Console I/O Instructions | Blank |

TABLE 2

RELATIONSHIP OF Y-FIELD AND INDEX FIELD (R)

| R | | Y-Field |
| --- | --- | --- |
| 0 | | Absolute - Scratch Pad |
| 1-12 | $(14_8)$ | Absolute - Indexed |
| 13 | $(15_8)$ | Relative |
| 14 | $(16_8)$ | Indirect/Absolute |
| 15 | $(17_8)$ | Indirect/Relative |

Figure A. Punched Card/Coding Sheet Format. The Variable Field extends from column 13 through the first blank column. Comments filed may use full 72 columns if entire line is a comment (i.e. * in column 1)

PROGRAM CODING FORM

PREPARED BY _____   DATE _____

PHONE _____   PROBLEM NO _____   PAGE _____ OF _____

| LOCATION (LABEL) 1 ... 5 | OF CODE 10 | VARIABLE AND COMMENTS FIELD 15 ... 72 | SEQ. NO. 80 |
|---|---|---|---|
| 1 A A K 2 4 0 | | | |
| 2 A A K 2 4 0 . S | | | |
| 3 7 7 7 | | | |
| 4 7 7 7 8 | | | |
| 5 | T R U | | |
| 6 | T R | | |
| 7 . D E N O T E D | | | |
| 8 | | | |
| 9 | | | |

KEY:

LINE 1: ASSIGN THE VALUE OF THIS LINE TO MAIN MEMORY ( 1000$_8$)
LINE 2: ASSIGN THE VALUE OF THIS LINE TO SCRATCH PAD MEMORY (0 TO 1000$_8$)
LINE 3: ASSIGN THIS LINE TO MEMORY LOCATION 777$_{10}$
LINE 4: ASSIGN THIS LINE TO MEMORY LOCATION 777$_8$
LINE 5: TRANSFER UNCONDITIONALLY TO THE ADDRESS SPECIFIED IN THE VARIABLE FIELD
LINE 6: TRANSFER UNCONDITIONALLY TO AN INDIRECT ADDRESS SPECIFIED BY THE WORD LOCATED IN THE ADDRESS SPECIFIED BY THE VARIALBE FIELD
LINE 7: PRINT AN ASTERISK AND PRINT THIS LINE AS A COMMENT DURING FINAL PRINTOUT
LINE 8: PRINT AN ASTERISK AND LEAVE REST OF LINE BLANK ON FINAL PRINTOUT

Figure B. Examples of Input Formats. The first four examples (lines 1–4) are location field formats, the next two (lines 5–6), operation fields, and the last two (lines 7–8), comments fields.

FORMATTING SUBFIELDS WITHIN VARIABLE FIELDS

When subfields are permitted within variable fields, the subfields must be formatted according to certain rules.

The variable field is left justified and is assigned colums 13 through the first blank column on the program coding form. The number of subfields permitted within the variable field is dependent upon the operation code. Examples of subfields within the variable field are shown on the facing page. When expressions (subfields) are permitted within the variable field, they must be formatted by the programmer according to set rules. If the assembler detects a variable field which violates one or more of these rules, then the statement line containing the error(s) is printed out. The following rules are applicable when formatting expressions within the variable field.

(1)
Each subfield may contain from 1 to 25 elements, consisting of symbols and/or constants separated by arithmetic or Boolean operators. Each subfield is terminated by a comma and the variable field is terminated by a blank. Each item, including operators, is an element. In the first illustrated example, the variable field has only one subfield, which in ended by the blank in column 19. In the second example, the variable field has two subfields separated by a comma. The variable field is ended by the blank in column 22.

(2)
For instructions or pseudo operations, SEI, REI, SKI, SKW, and BOL, the variable field in interpreted as a Boolean expression and constants are assumed to be octal. The third illustrated example illustrates a variable field for an SEI instruction.

3
Each symbol must be defined. For symbols used in the BOL, EQU, SSC, SMC, SRC, TBL, ITM, and BSS pseudo operations, the symbol must be defined prior to use.

4
Expressions may not contain parentheses, but will use the +, −, *, and / operators. The expression is evaluated from left to right in two passes. The first pass evaluates the * and / operators, and the second pass evaluates the + and − operators.

5
If the + operator is not preceded by a symbol or constant, it is ignored.

6
If the − operator is not preceded by a symbol or constant in Boolean expressions, an error flag is set.

7
In arithmetic expressions, if the / operator is not preceded by a symbol or constant, an error flag is set. In arithmetic division, only the quotient is retained.

8
In arithmetic operations when the Y-subfield is in 2's complement form, only the low order 8 bits (to −256) are retained.

9
In Boolean operations, only the low order 17 bits are retained.

10
The operand of certain instructions may be a literal. (Literal initialization is described in a previous paragraph.) Literals may be used in the operand field of ADD, CLA, CMA, CML, DIV, LDQ, LGA, LGC, LGM, MLY and SUB. There are five types of literals:
a. Octal (O)
b. Decimal (D)
c. Value (V)
d. 6-bit alphanumeric characters (H)
e. ASCII code (A)

Column 13 of the variable field must contain an equal (=) sign (this flags the assembler program that a literal is assigned). Column 14 will contain the type designator, and column 15 will be the first character of the literal. Coding of decimal (D) literals is the same as for the DEC pseudo operation. 6-bit alphanumeric (H) literals allow three or less characters that are left-justified with trailing blanks if less than three characters are used. ASCII (A) literals allow a maximum of two characters with the first character in bits 1 through 8, and the second bits 10 through 17. Examples of literals are illustrated in lines 4 through 8 of the following table.

PROGRAM CODING FORM

PREPARED BY _____  DATE _____

PHONE _____  PROBLEM NO. _____  PAGE _____ OF _____

| LOCATION (LABEL) | OP CODE | VARIABLE AND COMMENTS FIELD | SEQ NO. |
|---|---|---|---|
| 1 | | | |
| | CLA | AAK240 | |
| | CLA | AAK240.12 | |
| | SEI | 1777 | |
| | CLA | =0777777 | |
| | ADD | =D125-31E-28-1 | |
| | SUB | =VLABEL+3 | |
| | CML | =HTR1 | |
| | LDQ | =AT1 | |

Examples of Variable Field Formats

SUMMARY OF PSEUDO OPERATIONS

The pseudo operations provided by the HM-4118 assembly program relieve the programmer of the task of coding subroutines for certain operations not included in the HM-4118 machine instruction repertoire.

The pseudo operations provided by the HM-4118 assembly program enable the programmer to specify, by an entry on the program coding form, certain operations not contained in the HM-4118 machine instruction repertoire. Since such operations occur in many programs, this feature relieves the programmer of the task of coding a subroutine when he specifies an operation defined by one of the pseudo operations. A pseudo operation may be used whenever desired in the program, except when a macro operation is being defined. In a macro operation, the GAD, NOP, HLT, or FIN pseudo operation are the only pseudo operations allowed within the macro definition. A pseudo operation is indicated by placing the threecharacter mnemonic corresponding to the desired operation in the operation field. There are certain restrictions placed on entries in the location field and the variable field; these restrictions are noted when the specific pseudo operations are discussed. The pseudo operations included in the assembler may be used by the programmer to control memory allocation, form data, and to control the output assembly.

Controlling Memory Location — A group of pseudo operations is provided to allow the programmer to control memory allocation. By using these pseudo operations, the programmer can specify the values to be loaded into the assembler main, scratch, or relocation counters. The programmer may also reserve a block of sequential memory address beginning with a specified location. A pseudo operation which allows the programmer to specify the starting address of a literal table is also included within this group.

Entering Data — A second group of pseudo operations is provided which allows the programmer to enter data in a variety of formats. The programmer may enter data in units smaller than a complete computer word by using the variable field data (VFD) pseudo operation. Pseudo operations are provided which allow the programmer to enter decimal data in either a single precision or a double precision format. This group of pseudo operations also includes operations which allow the programmer to enter octal and binary data.

Controlling Output Assembly — The programmer may control the output assembly by using one or more of the pseudo operations included within this group. The normal output assembly consists of printing out a side-by-side listing of the assembled program and data generated, and placing the program on punched or magnetic tape. This output assembly may be varied as desired by the programmer by use of the pseudo operations included within this group.

FUNCTIONAL LIST OF PSEUDO-OPERATIONS

| Pseudo-Operation | Function |
| --- | --- |
| Control Memory Location | |
| BSS | Block Starting with Symbol |
| LTL | Literal Initialization |
| SMC | Set Main Counter |
| SRC | Set Relocation Counter |
| SSC | Set Scratch Counter |
| BOL | Boolean Equate |
| EQU | Equate |
| Process Variable Field Data | |
| VFD | Variable Field Definition |
| Entering Decimal Data | |
| DEC | Decimal Data, Single Precision |
| DCD | Decimal Data, Double Precision |
| Entering Octal and Binary Coded Data | |
| OCT | Octal Integers |
| BCI | Binary Coded Information |
| BCP | Binary Code for Printer |
| Generating Addresses | |
| GAD | Generate Address |
| Control Output Assembly | |
| EJI | Eject to top of Page |
| SLT | Suppress Listing |
| LST | Resume Listing |
| SDL | Suppress Detail |
| END | End of Assembly |
| WST | Write Symbol/COMID Table |
| RST | Read Symbol/COMID Table |
| CKS | Generate Checksum |
| REL | Relocatable Output |
| ABS | Absolute Output |
| FUL | Full Card |
| NOP | No Operation |
| HLT | Halt |
| Operations on Tables | |
| TBL | Table Definition |
| ITM | Item Definition |
| XTR | Extract an Item |
| RPL | Replace an Item |
| POS | Position Item in Accumulator |
| Macro Generation | |
| MAC | Macro Definition |

PSEUDO OPERATIONS TO CONTROL MEMORY LOCATION

This group of pseudo operations allows the programmer to specify initial memory addresses for both data to be entered into main memory or scratch pad memory and relocatable data.

Certain pseudo operations affect location assignments by operations that set main, scratch, or relocation counter values equal to values contained in the variable field. These pseudo operation codes appear in the operation field and are described individually in the following paragraphs.

SMC (Set Main Counter) — The SMC pseudo operation sets the assembler main counter to the value specified by the variable field. The variable field may contain a symbol, constant, or arithmetic expression that is equal to a value greater than $777_8$ ($512_{10}$). Any symbol used in the variable field must have been previously defined. The location field may be blank or contain a symbol or label that, if present, is assigned to identify the memory location specified by the variable field. If the SMC pseudo operation is not used prior to the first main memory assignment, the assembler will begin assigning memory locations at $1,000_8$. The subsequent data and/or instruction words are assigned sequentially higher locations until one of the set counter instructions appear. The SMC pseudo operation should not be used between a REL and an A B S pseudo operation. If the location field contains a symbol, it is assigned the value of the variable field. Constants are not allowed in the location field.

SSC (SET Scratch Counter) — The SSC pseudo operation sets the assembler scratch counter to the value specified by the variable field. The variable field may contain a symbol, constant, or arithmetic expression that is equal to a value less than $1,000_8$. Any symbol in the variable field must have been previously defined. The location field may be blank or contain a symbol or label that, if present, is assigned to identify the memory location specified by the variable field. Symbols assigned to scratch pad locations by the SSC pseudo operation do not require the "comma S" (,S) suffix. If the SSC pseudo operation is not used prior to the first scratch pad memory assignment, the assembler will begin assigning memory locations at $213_8$. The subsequent instructions or data words are assigned sequentially higher locations until one of the set counter instructions occur.

SRC (Set Relocation Counter) — The SRC pseudo operation sets the assembler relocatable main memory counter, or relocation counter, to the value specified by the variable field. The variable field may contain a symbol, constant, or arithmetic expression. Any symbol used in the variable field must have been previously defined. The location field may be blank or contain a symbol or label that, if present, is assigned to identify the memory location specified by the variable field. If the SRC pseudo operation is not used prior to the first main memory assignment, the assembler begins assigning memory locations at 000. The subsequent instructions or data words are assigned sequentially higher locations until one of the set counter instructions occur. The assignment to 000 and higher locations is not the final assignment as these would conflict with assigned memory. This pseudo operation allows the programmer to assemble a program sequence that is later relocated (in a unit) to scratch pad or main memory. Actual relocation occurs during object program loading.

BSS (Block Starting with Symbol) — The BSS pseudo operation allows the programmer to reserve a sequential block of memory locations equal to the value of the variable field. The variable field may contain a symbol, constant, or arithmetic expression. Any symbol used in the variable field must have been previously defined. The block of memory locations being reserved begins with the location at which the BSS pseudo operation occurs.

LTL (Literal Initialization) — The LTL pseudo operation specifies to the assembler the beginning address of the literal table and the literal table base address index register. The variable field of this pseudo operation contains two subfields. The first subfield defines the starting address of the literal table. The second subfield denotes the index register to use. This pseudo operation must be performed before the first use of an instruction that uses a literal.

EQU (EQUate) —The EQU pseudo operation assigns the value of the contents of the variable field to the symbol in the location field. The value equated with the symbol by this operation is placed in the symbol table. The variable field may contain a symbol, constant or arithmetic expression. Any symbol used in the variable field must have been previously defined.

BOL (BOoLean Equate) —The BOL pseudo operation is identical to the EQU pseudo operation; however, constants or arithmetic expressions appearing in the variable field are assumed to be octal.

PROGRAM CODING FORM

PREPARED BY _____    DATE _____

PHONE _____    PROBLEM NO. _____    PAGE ____ OF ____

| LOCATION (LABEL) | OP CODE | VARIABLE AND COMMENTS FIELD | SEQ NO. |
|---|---|---|---|
| 1......5 | 10 | 15......20......25......30......35......40......45......50......55......60......65......70  72 | 80 |
| 1 | SMC | 3777 | |
| 2  AAK30 | SMC | 4376 | |
| 3 | BSS | 15 | |
| 4  AAV | EQU | 77 | |
| 5 | | | |

NOTES

1. LINE 1:  SET THE MAIN COUNTER TO 3777
2. LINE 2:  SET THE MAIN COUNTER TO 4376 AND IDENTIFY THAT ADDRESS AS AAK30
3. LINE 3:  DO NOT ASSIGN THE FOLLOWING 15 ADDRESSES
4. LINE 4:  PLACE AAY IN THE SYMBOL TABLE AND IDENTIFY AS 77

Examples of Typical Memory Location Central Pseudo Operations

PSEUDO OPERATION FOR PROCESSING VARIABLE FIELD DATA

This pseudo operation allows the programmer to specify data to be entered into the program in field lengths less than a complete computer word. The assembler provides this pseudo operation to allow the programmer to specify the format and the field length of data to be entered into the program. The programmer may specify octal, decimal, or hollerith (alphanumeric) information as the data to be entered. The programmer may define more than one field each time the pseudo operation is specified so long as the combined length of all fields included does not exceed 18 bits (one computer word).

VFD (Variable Field Definition) —The VFD pseudo operation allows the programmer to enter data in units smaller than a complete computer word (18 bits). The variable field (on the program coding form) contains one or more subfields that are separated by commas and is terminated by a blank. There is one subfield in the variable field for each field of data in the machine word. The format of each subfield is given on the facing page. Each subfield will specify the type of information to be entered, the number of bits to be used by the subfield and the data to be entered. The first character of each subfield specifies the format. This character will be alphabetic (D, B, or H) to specify decimal, octal, or hollerith data, respectively. The alphabetic character will be followed by a decimal number specifying the number of bits in the subfield of the machine word. The bit count is followed by a slash (/) and then the data to be entered. Data will be right justified in its subfield. If the amount of data-generated is greater than the number of bits specified, the leading bits are lost and an error printout results. If combined data length of the subfields is less than 18 bits, the data is right justified in the machine word. If the data requires the use of more than 18 bits, the machine word is assigned a value of zero and an error flag printout results. Examples of the computer data word generated for sample variable fields, using the VFD pseudo operation, are given below.

FORMAT OF VFD

F$n$/X where:
F = format code;
and if:
   F = B = octal
   F = D = decimal
   F = H = alphanumeric
$n$ = decimal integer specifying the number of bits allotted to this subfield
/ = end of bit count
X = symbol, constant or arithmetic expression if F = B or D
if F = H, it is an alphanumeric symbol
if F = B, all constants are octal and all expressions are arithmetic

EXAMPLES OF VFD

| Variable Field | Data Word |
|---|---|
| B1/1,B14/31600,B3/5 | 716005 |
| B1/1,B8/377,B1/0,B8/357 | 777357 |
| D9/364,D6/02,D3/5 | 364025 |
| H12/TO,B6/21 | 635621 |

PSEUDO OPERATIONS FOR ENTERING DECIMAL DATA

By using these pseudo operations the programmer can specify decimal data to be entered directly into the program. This group of pseudo operations allows the programmer to enter decimal data directly into the program without converting to a format suitable for storage in binary form. The conversion is provided as one of the functions of these pseudo operations. The types of data which may be entered by the programmer include: • Decimal integers • Fixed point numbers (single and double precision) • Floating point numbers The data words generated are addressed in the same manner as instruction words. Succeeding data words, designated by the presence of more than one subfield, are assigned the next sequentially higher memory locations.

DEC (DECimal Data, Single Precision) —The DEC pseudo operation allows the programmer to enter single precision decimal data into the program. The variable field contains one or more decimal numbers, read from left to right, separated by commas and is terminated by a blank. The decimal numbers are converted to octal equivalents for storage in binary form. The decimal numbers, when converted, are stored in consecutive, increasing memory locations. Each decimal number, if more than one appears, forms a subfield. Two commas in succession are assumed to be the integer zero. Each subfield is decoded using the following coded format:

$$S_N I_N \cdot F_N E S_E V_E B S_B V_B$$

Each component of the subfield is defined in Table 1. Rules for forming the decimal numbers are given on the facing page. Examples of data words generated by the DEC pseudo operation for various subfield values are given in Table 2.

DCD (DeCimal Data, Double Precision) —The DCD pseudo operation allows the programmer to enter decimal, double-precision, or floating-point data into the program. The basic subfield format is the same as for DEC pseudo operation, except certain rules that supplement DEC rules. These are given on the following page. Examples of data words generated by the DCD pseudo operation for various variable field values are given in Table 3.

TABLE 1

DEFINITION OF DEC SUBFIELD COMPONENTS

| | | |
|---|---|---|
| $S_N$ | = | sign of number (+ or −) |
| $I_N$ | = | integer portion of number |
| . | = | decimal point |
| $F_N$ | = | fractional portion of number |
| E | = | beginning of exponent portion indicating multiplication by powers of 10 |
| $S_E$ | = | sign of exponent |
| $V_E$ | = | value of exponent |
| B | = | denotes beginning of binary scale factor indicating number of bits allowed for integer portion of number |
| $S_B$ | = | sign of scale factor |
| $V_B$ | = | value of scale factor |

RULES FOR FORMING DECIMAL SUBFIELDS

1. If $S_N$ or $S_E$ is not specified, it is assumed to be positive.

2. If $I_N$ is not specified, there must be a decimal point.

3.
   If $F_N$ is not specified, the decimal point may be omitted.
4.
   If a decimal point is present, B and $V_B$ must be specified or the fractional portion of the number is lost.
5.
   If B is specified, it must be restricted to a value which will allow the most significant bits to be retained.
6.
   If B is not specified, it is assumed to be 17.
7.
   The value represented by $I_N$, $F_N$, E, $S_E$, and $V_E$ may not exceed $2^{17} - 1$.
8.
   The fractional portion of a number is truncated according to the number of bits provided by the scale factor.

PSEUDO OPERATIONS FOR ENTERING
DECIMAL DATA (Continued)

TABLE 2

EXAMPLE OF DEC DATA WORDS GENERATED

| Variable Field | Data Words |
|---|---|
| 131071,−131071 | 377777 |
|  | 777777 |
| .512E+3,−512000E−3 | 001000 |
|  | 401000 |
| 512B17, 512B11 | 001000 |
|  | 100000 |
| ,,1234.567E+1B16 | 000000 |
|  | 060163 |

SUPPLEMENTARY RULES FOR DCD SUBFIELDS

1.
   Floating-point numbers are denoted by a decimal point, but no scale factor ($BS_B V_B$).
2.
   If B is specified, it must be restricted to a value that allows the most significant bits to be retained.
3.
   If a decimal point and B are both omitted, the scale factor is assumed to be 34.
4.
   Double-precision non-floating-point data is assigned two successive memory locations with the least significant bits placed in the first location.
5.
   Floating point data is assigned three successive memory locations. The first two locations will contain the mantissa with the least significant bits in the first location. The third location will contain the exponent.

TABLE 3

EXAMPLES OF DCD DATA WORDS

| Variable Field | Data Words |
|---|---|
| 17179869183,−17179869183 | 377777 |
|  | 377777 |
|  | 777777 |
|  | 777777 |
| 512B34,512B17,512B11 | 001000 |
|  | 000000 |
|  | 000000 |
|  | 001000 |
|  | 000000 |
|  | 100000 |
| .512E+3,−512000.E−3 | 000000 |
|  | 200000 |
|  | 000012 |
|  | 400000 |
|  | 600000 |
|  | 000012 |

TABLE 3 — Continued

EXAMPLES OF DCD DATA WORDS

| Variable Field | Data Words |
|---|---|
| ,,1234.567E+3B25 | 000000 |
|  | 000000 |
|  | 000000 |
|  | 000000 |
|  | 207000 |
|  | 011326 |
| .00512,5.12,512000. | 130431 |
|  | 247613 |
|  | 400007 |
|  | 024364 |
|  | 243656 |
|  | 000003 |
|  | 000000 |
|  | 372000 |
|  | 000023 |
| 1234.567E−512,−1234.567E+512 | 026131 |
|  | 255753 |
|  | 403232 |
|  | 622152 |
|  | 610714 |
|  | 003260 |

PSEUDO OPERATIONS FOR ENTERING OCTAL
AND BINARY CODED DATA

The programmer may enter octal and binary coded data directly into the program by use of these pseudo operations. This group of pseudo operations allows the programmer to enter octal data and binary coded data in either ASCII or a 6-bit alphanumeric (hollerith) format directly into the program. Without the availability of these pseudo operations the programmer would be faced with the task of converting the input data to a format suitable for storage in binary form. The data conversion is performed by these pseudo operations prior to storage. The types of data which may be entered by the programmer include:
• Octal integers
• Alphanumeric codes The data words generated are addressed in the same manner as instructions. Succeeding data words, subject to the restrictions noted in the discussions of the individual pseudo operations, are assigned to the next sequentially higher memory locations.

OCT (OCTal Integers) — The OCT pseudo operation allows the programmer to enter octal data into the program. The variable field consists of one or more octal constants, read from left to right. Successive octal constants are separated by commas, and terminated by the first blank. Successive subfields are assigned to successive higher memory locations. Each octal constant is right justified when converted to a binary number with leading zeroes. If more than six digits are specified for a number, the leading bits are lost and an error is indicated.

BCI (Binary Coded Information) — The BCI pseudo operation allows the programmer to enter ASCII format binary coded data into the program. The variable field contains characters that are converted into ASCII code. Data words, consisting of two of the ASCII 7-bit codes, plus one odd parity bit character per code, are assigned bits 1 through 8 and 10 through 17 of a memory location. An example is given in Table 1. Characters are decoded, two at a time, and assigned to successively higher memory locations starting with the location of the BCI pseudo operation. If the number of variable field characters is not a multiple of two, trailing zeros are supplied for the last character. The variable field character conversion is terminated by an equal (=) sign. If no equal sign appears, all characters on that line (through column 72) are converted and an error flag is output.

BCP (Binary Code for Printer) — The BCP pseudo operation allows the programmer to enter (in octal format) binary coded data into the program. An example is given in Table 1. The variable field contains characters that are converted into a 6-bit octal code. Data words consisting of three of the octal-coded characters are assigned to successively higher memory locations starting with the location of the BCP pseudo operation. If the characters do not occur in multiples of three, trailing zeros are supplied. The variable field character conversion is terminated by an equal (=) sign. If no equal sign appears, all characaters in that line, (through column 72), are converted and an error flag is output. Appendix E lists the codes used for this pseudo operation.

PROGRAM CODING

PREPARED BY _____   DATE _____

PHONE _____   PROBLEM NO. _____   PAGE ____ OF ____

| LOCATION (LABEL) 1   5 | OP CODE 10 | VARIABLE AND COMMENTS FIELD   15   20   25   30   35   40   45   50   55   60   65   70  72 | SEQ NO. 80 |
|---|---|---|---|
| 1 | BCI | CR0004,= |  |
| 2 | BCP | TO RETURN TO- |  |
| 3 | | | |
| 4 | | | |

NOTES

1. THIS EXAMPLE OF THE BCI PSEUDO OPERATION GENERATES THE FOLLOWING THREE DATA WORDS:
   103122
   117260
   260064

2. THIS EXAMPLE OF THE BCP PSEUDO OPERATION GENERATES THE FOLLOWING DATA WORDS:
   206356
   206144
   636461
   552063
   560000

PSEUDO OPERATION FOR GENERATING ADDRESSES

This pseudo operation allows the programmer to specify the contents of memory locations to be used subsequently in an indirect addressing mode.

This pseudo operation allows the programmer to specify words in the indirectly addressed word format. This means that the programmer can, by a single entry on the program coding form, specify the contents of memory locations which may be used subsequently in an indirect addressing mode. The pseudo operation is treated as a machine instruction by the assembler and may be used, but is not restricted to, macro operations.

GAD (Generate ADdress) — The GAD pseudo operation is recognized by the assembler and may be used in macro operations. When written on the coding form, this pseudo operation will develop the binary equivalent of the alphanumeric term or the address of the label in the variable field and place the results in the address designated in the location field or in the next available memory address if no location field is specified. The variable field is written in two subfields separated by a comma. The first subfield may be a symbol, constant, or arithmetic expression. The second subfield may be a 1 or blank. If the second subfield is blank, the address of the label in the first variable field, or the binary equivalent of the alphanumeric term or arithmetic expression is placed in the specified location. If the second subfield is a 1, the contents of index register 1 are added to the binary equivalent to obtain an indexed address when the instruction using the generated address is executed.

PROGRAM CODING FORM

PREPARED BY _____     DATE _____
PHONE _____   PROBLEM NO. _____   PAGE ___ OF ___

| LOCATION (LABEL) | OP CODE | VARIABLE AND COMMENTS FIELD |
|---|---|---|
| 1 5 | 10 | 15  20  25  30  35  40  45  50  55  60  65  70 72  SEQ NO. 80 |
| 1. | GAD | AA4 |
| 2. 1001 | GAD | A+B/2 |
| 3. AA4 | GAD | AA4,1 |
| 4. | | |

NOTES

1. LINE 1: PLACE THE ADDRESS OF LABEL AA4 IN THE NEXT AVAILABLE MEMORY ADDRESS
2. LINE 2: PLACE THE BINARY RESULTS OF THE ARITHMETIC OPERATION IN MEMORY ADDRESS 1001
3. LINE 3: PLACE THE ADDRESS DESIGNATED BY AA4 IN ADDRESS AA4 WITH BIT 0 TRUE TO INDICATE AN INDEXED INDIRECT ADDRESS

Examples of Typical GAD Pseudo Operations

PSEUDO OPERATIONS TO CONTROL OUTPUT ASSEMBLY

This group of pseudo operations allows the programmer to control the output assembly as desired.

Output assembly consists of printing out a side-by-side listing of the assembled program and the data generated, and placing the program on punched or magnetic tape. The normal printout operation consists of a heading and page number at the top of each page followed by a blank line that, in turn, is followed by as many as 51 data lines. If a program operation (usually a pseudo or macro operation) generates more than one word, each word is printed on a separate line. The operation columns, for the additional lines, are blank. The output assembly may be varied as desired by the programmer by use of the pseudo operations described in the following paragraphs. Pseudo operations in this group (except CKS, WST, RST, and END) do not appear in the Pass II listing.

EJT (EJecT to Top of Page) — The EJT pseudo operation directs the next line decoded to be printed at the top of the next page, following the heading. If an EJT appears concurrently with an automatic eject (the assembler makes a line count and performs an automatic eject at 51 lines), or an EJT appears with a zero line count, it is ignored.

SLT (Suppress LisTing) — The SLT pseudo operation inhibits a Pass II side-by-side listing until an LST pseudo operation is encountered.

LST (Resume LiSTing) — The LST pseudo operation cancels previously used SLT and SDL pseudo operations and directs normal side-by-side listing to resume.

SDL (Suppress Detail) — The SDL pseudo operation inhibits the printout of additional lines produced by data-generating and macro operations. The first word generated by a coded line and the symbolic statement are printed.

SPC (SPaCe) — The SPC pseudo operation directs the assembler printout to space the side-by-side listing by the number of lines specified in the variable field. The space count in the variable field may be specified by a symbol, constant, arithmetic expression, or a blank. If the variable field is blank, one space is assumed.

END (END of Assembly) — The END pseudo operation indicates to the assemblier that the end of the program being assembled has been reached. This pseudo operation contains a variable field in which the start address of the program is entered as a symbol, constant, arithmetic expression, or blank. If the program is being assembled and output on punched tape, the last data word punched is equal to the value of the variable field, and then a stop code is punched. If a magnetic tape output is used, the value of the variable field is the address at which execution of the program is initiated after the program is loaded. If the variable field is blank, address 000 is generated. A symbol in the location field is assigned the value of the location counter under rules specified in the Section on Formats. WST (Write Symbol/COMID Table) LABEL — The WST pseudo operation directs the assembly to dump the present contents of the symbol/COMID table onto magnetic or punched tape during Pass I. The WST pseudo operation is allowed anywhere in the program. LABEL must be a six-character symbol and identifies the tape.

RST (Read Symbol/COMID Table) — The RST pseudo operation directs the assembler to read the symbol data from magnetic tape and place it into the symbol/COMID table of the assembler. The RST pseudo operation must appear before the first use or definition of a unique program symbol. A checksum of the magnetic tape data transfer is made, and an error message is printed out if an error occurs.

CKS (Generate ChecKSum) — The CKS pseudo operation directs the assembler to generate a data word that is the logical complement of the data and instruction words generated since the last CKS pseudo operation, or since the first word, which ever occurred last. The execution of this pseudo operation performs an exclusive-or function on the contents of the computer words involved. The octal value of the checksum is printed in the Pass II listing.

REL (RELocatable Output) — The REL pseudo operation directs the assembler to output following lines in a relocatable mode. The REL mode is terminated by an ABS pseudo operation.

ABS (ABSolute Output) — The ABS pseudo operation directs the assembler to print out in the absolute, or normal, mode. Absolute mode is assumed unless a REL or FUL pseudo operation has occurred, and is terminated by the use of either REL or FUL.

FUL (FULl Card) — The FUL pseudo operation directs the assembler to printout during Pass II the following lines without editing or making any address assignment. The first 72 columns of the card are available to the programmer with the restriction that symbols may not be used in the location field. The FUL mode of operation is maintained until terminated by a REL or ABS pseudo operation.

NOP (No OPeration) — The NOP instruction is a pseudo operation that is treated as a computer instruction and may be used in macro operations. The NOP pseudo operation consists of only the mnemonic code (NOP) in the operation field. This instruction generates a transfer to the present location plus one.

HLT (HaLT) — The HLT instruction is a pseudo operation on which the assembler operates as a computer instruction and may be used in macro operations. The HLT instruction consists of only the mnemonic in operation field. This instruction generates a transfer to the present location that results in a program halt at this point.

PSEUDO OPERATIONS TO DEFINE AND MANIPULATE TABLES

There are five pseudo operations which allow the programmer to define and manipulate tables and items. Five pseudo operations enable the programmer to define tables, define items within the tables, and to manipulate these items; Table Definition (TBL), Item Definition (ITM), Extract on Item (XTR), Replace an Item (RPL), and Position Item in Accumulator (POS).

TBL (TaBLe Definition) — The TBL pseudo operation in written with a symbol in the location field, TBL in the operation field, and four parameter subfields in the variable field. The symbol used in the location field becomes the label, or table name, and is assigned the current value of the main or relocation counter. The counter is incremented from the starting location by the number of words used in the table. The four parameters that appear in the variable field may be a symbol, constant, or arithmetic expression with the restriction that any symbol used must have been defined previously. The four parameter subfields are designated C, T, E, and W. The C (class) subfield appears first and indicates a serial table if equal to 1, or a parallel table if equal to 2. The T (type) subfield appears second and indicates a null type if equal to 0, a rigid type if equal to 1, a variable type if equal to 2, and a cyclic type if equal to 3. The E (entries) subfield appears third and indicates the number of entries within the tables, which may range from 1 through 512. The W (words) subfield appears last and indicates the number of words per entry, which may range from 1 through 512.

ITM (ITeM Definition) — The ITM pseudo operation enables the programmer to define the items within a table. This pseudo operation defines from 1 to 18 bits or a word contained in an entry within a table. The ITM pseudo operation is written with a symbol in the location field that becomes the item label or name, ITM in the operation field, and six parameters in the variable field. Each parameter may be a symbol, constant, or arithmetic expression with the restriction that any symbol used must have been defined previously. The parameters are designated, T, L, A, F, S, and B, respectively, for explanatory purposes, and are defined in the table on the facing page.

XTR (EXTRact an Item) — The XTR pseudo operation generates instructions that will obtain an item, position the binary point of the item, and transfer the item into the accumulator. This pseudo operation is written with XTR in the operation field and three parameters designated ITEM NM, XR, and $BP_{acc}$ in the variable field. ITEM NM is defined as the item name or label as it appears in the location field on this item (nust have been defined previously), XR as the Index register that has been set, prior to the XTR, equal to the address of the first word of the entry in which this item appears, and the $BP_{acc}$ as the Binary point of the item as it is desired in the accumulator.

RPL (RePLace an Item) — The RPL pseudo operation generates instructions that place an item in the accumulator back into the correct table. The assembler generated instructions determine the placing of the binary point and select the proper data by masking as necessary if this item is a partial word. This pseudo operation is written with RPL in the operation field and three parameters designated ITEM NM, SR, and $BP_{acc}$ in the variable field. For this pseudo operation, ITEM NM is defined as an item name or label as it appears in the location field of this item (must have been defined previously), XR as an index register that has been set, prior to this RPL, equal to the address of the first word of the entry in which this item appears, and $BP_{acc}$ as the Binary point of this item as it appears in the accumulator prior to this RPL. The instructions generated by the assembler to implement the RPL pseudo operation destroy the contents of the Q register. The programmer must save the contents of the Q register before use of the RPL pseudo operation if Q register data is to be retained.

POS (POSition Item in Accumulator) — The POS pseudo operation generates the instructions necessary to shift an item in the accumulator from one binary point position to another. This pseudo operation is written with POS in the operation field and two parameters designated FROM, TO in the variable field. These parameters define the beginning binary point position (FROM) and the final binary point position (TO) according to certain rules: If alphanumeric symbol is used, the value of the symbol is used as the binary point. If a signed number is used, the value of the number is used as the binary point. If a previously defined item is used, the binary point position of this item is used as the binary point in the accumulator. For certain combinations of parameters the XTR, RPL, and POS pseudo operations may cause the overflow indicator (FV) to set. Care must be exercised in using FV for logical control when these operations are used.

DESCRIPTION OF ITEM DEFINITION PARAMETERS

| Parameter | Value | Description |
| --- | --- | --- |
| T (type) | 0 | Null |
|  | 1 | Boolean |
|  | 2 | Octal |
|  | 3 | Integer |
|  | 7 | Decimal |
|  | 11 | Hollerith |
|  | 12 | ASCII 1 character |
|  | 13 | ASCII 2 character |
|  | 14 | IBM Selectric typewriter, 6-bit code |
|  | 15 | Alphanumeric, 6-bit code |
| L (location) | 0 - 511 | Defines location of this word with respect to first word of the entry. May range from 0 (if first word) to 511 (if last word is maximum loaded entry) |
| A | 0 - 17 | Defines bit location of first significant bit of this field. |
| F (field size) | 1 - 18 | Defines number of bits within this item. Includes sign bit |
| S (sign) | 0 | Unsigned |
|  | 1 | Signed |
|  | 2 | Detached |
|  | 3 | Two's complement |
| B (binary point) | −31 to +31 | Defines binary point of this item with respect to left end of word. |

DEFINITION OF MACRO OPERATIONS

Macro operations are special operations which the programmer may want to use in his program but are not contained in the HM-4118 instruction repertoire.

Macro operations provide the programmer with the capability to perform a specific sequence of operations with a single instruction entry on the program coding form. A macro operation may be used throughout the program by placing the specific macro mnemonic in the operation field, and the parameters to be operated on in the variable field. A macro operation is written by placing a three-character alphanumeric label in the location field. The label must have an alphabetic character is position 1, and normally consists of three letters selected by the programmer.

MAC (MACro Definition) — The operation field contains the letters MAC to specify a macro operation. The variable field contains from 0 to 31 parameters that are used in the macro definition. All parameter designators must be symbols only; constants or expressions are not allowed. Each symbol used as a parameter must be used only one time on the line on which it appears, however, normal program symbols and previously used parameter symbols may be used. The lines following the first line of the macro operation consist of one of the computer instructions or a GAD, NOP, HLT, or FIN pseudo operation, which are the only pseudo operations allowed within macro operations. These instructions are written in the operation field with the designated operation being performed on the parameters and program symbols that appear in the variable field of the same line. The parameters must appear on the first line of the MAC pseudo operation and may further define the operation by using operators (+, −, *, or /) between parameters and program symbols.

The MAC pseudo operation is terminated by using the finish (FIN) pseudo operation. During Pass I of the assembly, each macro operation is entered into a macro name table with the location of that macro's skeleton, parameter count, and skeleton line count. A parameter table is constructed by the assembler when the first line of the macro pseudo operation is decoded. As the assembler decodes each line of the macro operation, the line is placed in position in that macro's skeleton with each symbol checked to verify that it is present in the parameter table. If a symbol appears in the parameter table, it is assigned a parameter number. If a symbol is not present in the parameter table, it is entered into the skeleton table unchanged. Once a macro operation is defined, it may be used by writing the macro's assigned label in the operation field and the values to be operated on in the variable field. When the assembler encounters a macro operation, it inserts the instructions contained in that macro's definition into the program. When the program is printed out during Pass II of the assembly process, macro operations appear with the label of the macro in the operation field and the parameters in the variable field. The lines following correspond with the macro's skeleton and contain the data acquired; however, the operation codes performed within the macro are not printed out.

Macro operations that have been defined are used according to the following rules:

1. The location field may be blank, a constant, or a symbol. Memory location assignment of a macro operation is performed in the same manner as for other program instructions.
2. The operation field contains the name of the macro operation.
3. The variable field contains a symbol, constant, or arithmetic expression in each parameter subfield. These values are substituted for the parameters they replace in the macro operation.
4. An asterisk (*) in the variable field is interpreted as having a value equal to the location of the first instruction generated.
5. Variable field evaluation is normally arithmetic. If an instruction that normally has an octal variable field is used, octal interpretation of a parameter may be directed by placing the letter B immediately following the last character in the parameter.
6. The number of subfields that appear in the variable field is equal to the number of parameters specified for that particular macro operation.

RULES FOR MACRO PROGRAMMING

1. The location field of a macro operation contains the name of the macro being defined.
2. Parameters are defined by symbols only.
3. Parameters must be unique within the line on which they appear.
4. Parameters must be separated by commas.
5. The variable field specifying parameters used by a macro operation is terminated by the first blank column.
6. A symbol used in the macro skeleton which does not appear in the parameter table is interpreted as a normal program symbol.
7. GAD, HLT, NOP, and FIN are the only pseudo operations allowed within macro operations.
8. The location field of each line of a macro skeleton must be blank.
9. Macro definitions are terminated by use of a FIN pseudo operation. (notice that the FIN pseudo operation is a program flag and is used only to end the macro definition.)
10. A maximum of 50 lines, all following the MAC line, may be used for one macro definition.

EXAMPLES OF TYPICAL MACRO OPERATIONS

These examples are presented to illustrate typical definitions of macro operations.

These examples are provided as illustrations to the programmer of the format to be followed when he is defining a macro operation. The examples, although they could be used in an actual program, are presented as typical macro definitions. The range of macro operations which the programmer may define is limited primarily by the exigencies of a specific program. The first example defines a macro operation which may be used to move a variable number of items from any area of memory to a specific working area. The second example defines a macro operation which is equivalent to a left-shift-Q-register instruction (does not exist as an HM-4118 machine instruction).

Line 1 of FIG. A on the facing page describes a macro operation which may be used to move a variable number of items from any area of memory to a specific working area. This macro operation will use the following three symbols: LOCCNT, the location of the number of items to be moved; INDEX, the index register to be used; AREA, the starting location of the area to be moved. The symbol WORK is used in the macro definition but is not listed as a special symbol. Therefore, it will be treated as a general program symbol and must be defined elsewhere in the program.

The programmer may use the MVW macro operation at any point in the program following the definition. If the the number of items is in location MOVE, the starting location of the items to be moved is TABLE +3, and index register 2 is available, the programmer could write the code shown in line 13 of FIG. A. Line 19 is an example of the symbolic representation of the code which is generated. Only the macro instruction line will appear in the side-by-side listing. However, all generated machine instructions will be printed. If a symbol appears in the location field of the macro operation, it is assigned to the first instruction generated by the macro definition.

FIG. B describes an instruction group that is equivalent to a left-shift-Q-register instruction. (This instruction is not available in the computer hardware.) The format for use of the macro is defined the same as for hardware shift instructions. Once the macro definition has been made in the program, the programmer may use the macro whenever a left-shift of the Q-register is desired. The figure shows first, the definition of the macro operation following with a subsequent use of the macro in the program.

What is claimed is:

1. In a moving-target-indication (MTI) radar system for tracking targets, said system having a transmitter for transmitting radar pulses at a selected transmitting frequency, F, a receiver for receiving radar return signals, and a signal processor for cancelling all radar return signals except those having a doppler shift due to a moving target, apparatus for automatically selecting a pulse repetition frequency, PRF, within a given range of PRF's for optimum range and doppler visibility, comprising computer means for selecting said transmitting frequency, computer means for finding a band of PRF's between velocity blind regions in said range of PRF's, where a velocity blind region is a small band of PRF's centered on a PRF which happens to be the same as the doppler frequency of the target being tracked, or a multiple thereof, computer means for finding a particular PRF within said band of PRF's which does not have a range blind zone spanning the predicted range of a target being tracked, and radar synchronizing means for timing transmission of radar pulses at said particular PRF by said transmitter, each pulse consisting of electromagnetic energy at said transmitting frequency.

2. Apparatus as defined in claim 1 wherein, said computer means for finding said particular PRF includes means for causing said computer means for finding a band of PRF's to find another band of PRF's between velocity blind regions in said range of PRF's upon failing to find a PRF within said band of PRF's which does not have a blind zone spanning the predicted range of a target being tracked, and said computer means for finding a band of PRF's includes means for thereafter causing said computer means for finding said particular PRF to search the new band of PRF's for said particular PRF, and further includes means for terminating the resulting iterative search for a band of PRF's and a particular PRF within said band when a particular PRF is found which does not have a blind zone spanning the predicted range of a target being tracked.

3. Apparatus as defined in claim 2 including means for selecting said frequency, F, from a plurality of predetermined frequencies, comprising clear channel sensing means connected to said receiver for sensing the magnitude of electromagnetic energy received by said receiver in a plurality of frequency channels, each of predetermined bandwidth spanning a different one of said predetermined frequencies, means for converting said magnitude of energy in each channel to a value in digital form, computer means for sorting said values in digital form in order of magnitude, and computer means for selecting a transmitting frequency corresponding to that frequency of a channel having the lowest of said values of sensed electromagnetic energy.

4. Apparatus as defined in claim 3 wherein, said computer means for selecting a transmitting frequency includes means for selecting a frequency corresponding to that frequency of a channel having the next lowest of said values of sensed electromagnetic energy during the next iteration of an iterative search for a band of PRF's and a particular PRF within said band upon said computer means for selecting a transmitting frequency, failing to find a particular PRF within said band of PRF's which does not have a blind zone spanning the predicted range of a target being tracked in any band of PRF's between velocity blind regions in said range of PRF's.

5. Apparatus as defined in claim 4 wherein said computer means for finding a band of PRF's between velocity blind regions includes means for finding a band of PRF's by determining blind regions in accordance with the equation $$(PRF) = 2\dot{R}_pF/cn \pm \Delta(PRF)$$

where $n = 1,2,3. . . ,c$ is the speed of light, and $\Delta(PRF)$ is a predetermined value included to allow for half widths of velocity blind regions for a predicted radial velocity, $\dot{R}_p$, of a target being tracked and said selected frequency, F, a different velocity blind regions resulting for each value of $n$, and a different band of PRF's allowable for tracking falling between successive velocity blind regions.

6. Apparatus as defined in claim 5 wherein said computer means for finding a particular PRF within said band of PRF's which does not have a range blind zone spanning the predicted range, $R_p$, of a trarget being tracked includes means for determining the range blind zone for each PRF within said band of PRF's until one is found not having a range blind zone spanning said target at said predicted range in accordance with the following equation $$R_n = cn/2(PRF)$$

where $n$ is an integer $1,2,3. . . ,c$ is the speed of light, and $R_n$ is the beginning of a blind range zone of predetermined width, $\delta$.

7. Apparatus as defined in claim 6 wherein said means for determining a band of PRF's by determining blind regions includes means for determining an approximation $$(PRF) \approx \dot{R}_pF/[2.94(10)^8 \pm \Delta F]n$$

where $\Delta F$ is a percentage factor to allow for the half width, $\Delta(PRF)$, of each velocity blind region.

8. Apparatus as defined in claim 6 wherein said means for determining the range blind zone for finding range blind zones for each PRF within said band of PRF's includes means for determining an approximation $R_n \approx 81 (10)^3 n/(PRF)$ of the equation $R_n = cn/2(PRF)$ and the half width, $\delta$, of each range blind zone is as predetermined.

9. In a radar system having a transmitter and a receiver for tracking targets, apparatus for automatically selecting a pulse repetition frequency, PRF, at a transmitting frequency to use for the next dwell in updating track data of a selected target, said data including predicted range, $R_p$, and radial velocity, $\dot{R}_p$, and said PRF being selected to assure target visibility in range and doppler shift of radar return signals in order to be able to update said target data, said apparatus comprising computer means for calculating possible bands of PRF's between adjacent velocity blind regions which are within upper and lower limits of PRF for said radar system using the equation $(PRF) = 2\dot{R}_p F/cn \pm \Delta(PRF)$ where $n=1,2,3\ldots,c$ is the speed of light, and $\Delta(PRF)$ is a predetermined value included to allow for half widths of velocity blind regions resulting from lack of target visibility in doppler shift for said predicted radial velocity, $R_p$, and said selected transmitting frequency, F, a different velocity blind region resulting for each value of $n$, computer means for calculating the highest PRF within the highest of said bands of PRF's which places said selected target outside of range blind zones at ranges between $R_n$ and $R_n+\delta$, where $\delta$, a constant known width of each blind zone, is a function of radar receiver dead time which commences concurrently with each radar pulse transmission, and $R_n$ is the range to the nth blind zone calculated by said computer means from the equation $R_n = cn/2(PRF)$ where $n=1,2,3\ldots$, and $c$ is the speed of light, signal generating means for generating a transmitting signal at said selected transmitting frequency, and radar synchronizing means for timing transmission of radar pulses at said pulse repetition frequency by said transmitter, each pulse consisting of electromagnetic energy at said selected transmit frequency.

10. Apparatus as defined in claim 9 including means for selecting said frequency, F, from one of a plurality of predetermined frequencies comprising means for sensing the magnitude of electromagnetic energy received by said receiver in a plurality of frequency channels, one channel for each of said predetermined frequencies, means for converting said magnitude of energy in each channel to a value in digital form, computational means for sorting said values in digital form in order of magnitude, and computer means for selecting said transmitting frequency, F, to be that frequency of a channel having the lowest of said values of electromagnetic energy sensed.

11. Apparatus as defined in claim 10 wherein said signal generating means comprises means for generating a plurality of signals, one for each of said predetermined frequencies, and means for gating out to said transmitter the one transmitting signal at said selected frequency.

12. Apparatus as defined in claim 11 wherein said radar synchronizing means comprises a source of clock pulses, and a counter for counting a predetermined number of clock pulses directly proportional to the reciprocal of PRF to time transmission of said radar pulses during a tracking swell, one radar pulse for each predetermined number of clock pulses.

* * * * *